(12) United States Patent
Yuan et al.

(10) Patent No.: US 9,366,396 B2
(45) Date of Patent: Jun. 14, 2016

(54) OPTICAL WAVEGUIDE AND LAMP INCLUDING SAME

(71) Applicant: Cree, Inc., Durham, NC (US)

(72) Inventors: Zongjie Yuan, Grayslake, IL (US); Jiayin Ma, Newtonville, NY (US); Kurt S. Wilcox, Libertyville, IL (US); Eric J. Tarsa, Goleta, CA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/101,051

(22) Filed: Dec. 9, 2013

(65) Prior Publication Data

US 2014/0211497 A1   Jul. 31, 2014

Related U.S. Application Data

(63) Continuation-in-part of application No. 13/842,521, filed on Mar. 15, 2013, and a continuation-in-part of application No. 13/839,949, filed on Mar. 15, 2013, and a continuation-in-part of application No.

(Continued)

(51) Int. Cl.
*F21V 7/04* (2006.01)
*G02B 6/00* (2006.01)
(Continued)

(52) U.S. Cl.
CPC . *F21K 9/52* (2013.01); *F21K 9/137* (2013.01); *F21V 29/773* (2015.01); *G02B 6/002* (2013.01); *G02B 6/0035* (2013.01); *F21Y 2101/02* (2013.01); *F21Y 2113/005* (2013.01)

(58) Field of Classification Search
CPC ......... F21K 9/52; F21K 9/137; F21V 29/773; G02B 6/0035; G02B 6/002; F21Y 2113/005; F21Y 2101/02
See application file for complete search history.

(56) References Cited

U.S. PATENT DOCUMENTS

| 615,108 A | 11/1898 | De Segundo |
| 766,515 A | 8/1904 | Northrup |

(Continued)

FOREIGN PATENT DOCUMENTS

| DE | 20014114 | 12/2000 |
| DE | 20107425 | 7/2001 |

(Continued)

OTHER PUBLICATIONS

Web page at http://www.fusionoptix.com/lighting/components/array-optics.htm, printed May 9, 2013 (2 pages).

(Continued)

*Primary Examiner* — Donald Raleigh
(74) *Attorney, Agent, or Firm* — McCracken & Gillen LLC

(57) ABSTRACT

An optical waveguide includes a body of optically transmissive material defined by outer edges and having a width substantially greater than an overall thickness thereof. The body of optically transmissive material includes a first side and a second side opposite the first side. An interior coupling cavity is defined by a surface intersecting the second side and extends from the second side toward the first side. The interior coupling cavity is disposed remote from edges of the body and is configured to receive an LED element. The body of optically transmissive material further includes a first array of light mixing cavities surrounding the interior coupling cavity and an extraction feature disposed on one of the first and second sides. The light extraction feature at least partially surrounds the interior coupling cavity.

23 Claims, 55 Drawing Sheets

Related U.S. Application Data

13/841,074, filed on Mar. 15, 2013, and a continuation-in-part of application No. 13/840,563, filed on Mar. 15, 2013, and a continuation-in-part of application No. 13/938,877, filed on Jul. 10, 2013.

(60) Provisional application No. 61/758,660, filed on Jan. 30, 2013.

(51) Int. Cl.

| | | |
|---|---|---|
| G09F 13/00 | (2006.01) | |
| F21V 21/00 | (2006.01) | |
| F21K 99/00 | (2016.01) | |
| F21V 8/00 | (2006.01) | |
| F21V 29/77 | (2015.01) | |
| F21Y 101/02 | (2006.01) | |
| F21Y 113/00 | (2016.01) | |

(56) References Cited

U.S. PATENT DOCUMENTS

| | | |
|---|---|---|
| D67,806 S | 7/1925 | Hoyt et al. |
| 2,043,951 A | 6/1936 | Eksergian |
| 2,992,587 A | 4/1958 | Hicks, Jr. et al. |
| 3,532,871 A | 10/1970 | Shipman |
| D219,546 S | 12/1970 | Kaiser et al. |
| 4,146,297 A | 3/1979 | Alferness et al. |
| 4,441,787 A | 4/1984 | Lichtenberger |
| 4,714,983 A | 12/1987 | Lang |
| D298,861 S | 12/1988 | Ewing et al. |
| 4,954,930 A | 9/1990 | Maegawa et al. |
| 4,977,486 A | 12/1990 | Gotoh |
| 5,005,108 A | 4/1991 | Pristash |
| 5,009,483 A | 4/1991 | Rockwell, III |
| 5,026,161 A | 6/1991 | Werner |
| 5,040,098 A | 8/1991 | Tanaka et al. |
| 5,047,761 A | 9/1991 | Sell |
| 5,061,404 A | 10/1991 | Wu et al. |
| 5,097,258 A | 3/1992 | Iwaki |
| 5,113,177 A | 5/1992 | Cohen |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,624,202 A | 4/1997 | Grierson |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,002,079 A | 12/1999 | Shin et al. |
| 6,002,829 A | 12/1999 | Winston et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,134,092 A | 10/2000 | Pelka et al. |
| 6,139,163 A | 10/2000 | Satoh et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| D446,333 S | 8/2001 | Fröis |
| 6,304,693 B1 | 10/2001 | Buelow, II et al. |
| 6,310,704 B1 | 10/2001 | Dogan et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang et al. |
| 6,485,157 B2 | 11/2002 | Ohkawa |
| 6,508,563 B2 | 1/2003 | Parker et al. |
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |

(56) References Cited

U.S. PATENT DOCUMENTS

| | | | |
|---|---|---|---|
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,637,924 B2 | 10/2003 | Pelka et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,854,857 B2 | 2/2005 | Hara et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| D511,221 S | 11/2005 | Zucker |
| 6,971,758 B2 | 12/2005 | Inui et al. |
| 6,974,241 B2 | 12/2005 | Hara et al. |
| 6,992,335 B2 | 1/2006 | Ohkawa |
| 7,008,097 B1 | 3/2006 | Hulse |
| 7,010,212 B2 | 3/2006 | Emmons et al. |
| D518,911 S | 4/2006 | Lee |
| 7,021,805 B2 | 4/2006 | Armano et al. |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| D532,532 S | 11/2006 | Maxik |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston et al. |
| 7,218,830 B2 | 5/2007 | Iimura |
| 7,222,995 B1 | 5/2007 | Bayat et al. |
| 7,223,004 B2 | 5/2007 | Chen et al. |
| D544,110 S | 6/2007 | Hooker et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,290,906 B2 | 11/2007 | Suzuki et al. |
| 7,292,767 B2 | 11/2007 | Cheng |
| 7,322,733 B2 | 1/2008 | Chang et al. |
| D563,036 S | 2/2008 | Miyairi et al. |
| D565,778 S | 4/2008 | Pedersen |
| D566,300 S | 4/2008 | Lo |
| 7,364,342 B2 | 4/2008 | Parker et al. |
| D568,529 S | 5/2008 | Colleran, Jr. et al. |
| D570,025 S | 5/2008 | Walker |
| 7,369,918 B2 | 5/2008 | Cosgrove |
| D573,292 S | 7/2008 | Zheng et al. |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| D575,898 S | 8/2008 | Tran et al. |
| 7,422,357 B1 | 9/2008 | Chang |
| D581,555 S | 11/2008 | To et al. |
| 7,455,416 B2 | 11/2008 | Chen |
| 7,458,714 B2 | 12/2008 | Chang |
| 7,465,074 B2 | 12/2008 | Blumel |
| D584,838 S | 1/2009 | To et al. |
| 7,486,854 B2 | 2/2009 | Van Ostrand et al. |
| 7,488,093 B1 | 2/2009 | Huang et al. |
| D587,839 S | 3/2009 | Guercio |
| D589,195 S | 3/2009 | Sabernig |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| D604,002 S | 11/2009 | Santoro |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,193 B2 | 12/2009 | Chang |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| D609,384 S | 2/2010 | Gray et al. |
| D610,722 S | 2/2010 | Bi |
| 7,654,687 B2 | 2/2010 | Tsai et al. |
| 7,654,719 B2 | 2/2010 | Chang |
| 7,663,804 B2 | 2/2010 | Chang |
| D612,527 S | 3/2010 | Espiau et al. |
| 7,674,018 B2 | 3/2010 | Holder et al. |
| 7,695,165 B2 | 4/2010 | Chang |
| 7,696,531 B2 | 4/2010 | Miyao |
| 7,703,945 B2 | 4/2010 | Leung et al. |
| 7,703,950 B2 | 4/2010 | Ewert et al. |
| 7,703,967 B2 | 4/2010 | Parker |
| D615,232 S | 5/2010 | Xiao et al. |
| D616,145 S | 5/2010 | Boissevain |
| 7,710,663 B2 | 5/2010 | Barnes et al. |
| 7,722,224 B1 | 5/2010 | Coleman et al. |
| 7,722,241 B2 | 5/2010 | Chang |
| 7,724,321 B2 | 5/2010 | Hsieh et al. |
| D617,489 S | 6/2010 | Santoro |
| D618,842 S | 6/2010 | Ngai et al. |
| 7,730,967 B2 | 6/2010 | Ballantyne et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| D622,894 S | 8/2010 | Ngai et al. |
| 7,766,515 B2 | 8/2010 | Condon et al. |
| 7,771,087 B2 | 8/2010 | Wilcox et al. |
| 7,775,697 B2 | 8/2010 | Hirano et al. |
| 7,776,236 B2 | 8/2010 | Shih et al. |
| 7,780,306 B2 | 8/2010 | Hoshi |

(56) References Cited

U.S. PATENT DOCUMENTS

| | | |
|---|---|---|
| 7,784,954 B1 | 8/2010 | Coleman |
| D623,793 S | 9/2010 | Ngai et al. |
| 7,798,695 B2 | 9/2010 | Parker |
| D626,260 S | 10/2010 | Wei |
| 7,806,581 B2 | 10/2010 | Lee |
| 7,810,949 B2 | 10/2010 | Chang |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| D627,913 S | 11/2010 | Gielen |
| D628,319 S | 11/2010 | Yoshinobu et al. |
| 7,826,698 B1 | 11/2010 | Meir et al. |
| D629,129 S | 12/2010 | Lin et al. |
| 7,845,826 B2 | 12/2010 | Aylward et al. |
| 7,850,357 B2 | 12/2010 | Kim et al. |
| 7,857,487 B2 | 12/2010 | Wu et al. |
| 7,857,619 B2 | 12/2010 | Liu |
| D630,347 S | 1/2011 | Pei et al. |
| D630,775 S | 1/2011 | Pan |
| D631,577 S | 1/2011 | Yoshinobu et al. |
| D631,601 S | 1/2011 | Lodhie |
| 7,866,871 B2 | 1/2011 | Couzin et al. |
| D633,636 S | 3/2011 | Gielen |
| D634,056 S | 3/2011 | Hokzaono et al. |
| 7,905,646 B2 | 3/2011 | Adachi et al. |
| 7,907,804 B2 | 3/2011 | Meir et al. |
| 7,909,496 B2 | 3/2011 | Matheson et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| 7,970,246 B2 | 6/2011 | Travis et al. |
| D641,923 S | 7/2011 | Radchenko et al. |
| 7,976,204 B2 | 7/2011 | Li et al. |
| D642,725 S | 8/2011 | Kong et al. |
| 7,991,257 B1 | 8/2011 | Coleman |
| 7,997,784 B2 | 8/2011 | Tsai |
| 8,002,450 B2 | 8/2011 | Van Ostrand et al. |
| D645,194 S | 9/2011 | Budike, Jr. et al. |
| D646,406 S | 10/2011 | Tsai et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,673 B2 | 11/2011 | Santoro |
| 8,047,696 B2 | 11/2011 | Ijzerman et al. |
| 8,052,316 B2 | 11/2011 | Lee |
| 8,054,409 B2 | 11/2011 | Hsieh et al. |
| 8,057,056 B2 | 11/2011 | Zhu et al. |
| 8,061,877 B2 | 11/2011 | Chang |
| 8,064,743 B2 | 11/2011 | Meir et al. |
| 8,067,884 B2 | 11/2011 | Li |
| 8,070,345 B2 | 12/2011 | Zhang et al. |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| D654,618 S | 2/2012 | Kong et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| D659,880 S | 5/2012 | Maxik et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| D662,255 S | 6/2012 | Kluś |
| D662,256 S | 6/2012 | Kluś |
| D662,643 S | 6/2012 | Takahashi et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| D668,370 S | 10/2012 | Guercio |
| D669,624 S | 10/2012 | Phillips |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| D670,422 S | 11/2012 | Siekmann |
| D670,856 S | 11/2012 | Butler et al. |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmakjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| D677,806 S | 3/2013 | Jiang et al. |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| D679,437 S | 4/2013 | Watt |
| D679,444 S | 4/2013 | Vasylyev |
| D679,843 S | 4/2013 | Hsu et al. |
| D681,262 S | 4/2013 | Lee |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,913 B2 | 5/2013 | Vissenberg et al. |
| 8,434,914 B2 | 5/2013 | Li et al. |

(56) References Cited

U.S. PATENT DOCUMENTS

| | | | |
|---|---|---|---|
| 8,449,128 B2 | 5/2013 | Ko et al. |
| 8,449,142 B1 | 5/2013 | Martin et al. |
| D684,296 S | 6/2013 | Henderson et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 | 7/2013 | Wang et al. |
| 8,485,684 B2 | 7/2013 | Lou et al. |
| 8,506,112 B1 | 8/2013 | Dau et al. |
| 8,511,868 B2 | 8/2013 | Haugaard et al. |
| 8,534,896 B2 | 9/2013 | Boonekamp |
| 8,534,901 B2 | 9/2013 | Panagotacos et al. |
| 8,541,795 B2 | 9/2013 | Keller et al. |
| 8,547,022 B2 | 10/2013 | Summerford et al. |
| 8,564,004 B2 | 10/2013 | Tarsa et al. |
| 8,567,983 B2 | 10/2013 | Boyer et al. |
| 8,567,986 B2 | 10/2013 | Szprengiel et al. |
| D694,449 S | 11/2013 | Walker |
| 8,573,823 B2 | 11/2013 | Dau et al. |
| 8,585,253 B2 | 11/2013 | Duong et al. |
| 8,591,072 B2 | 11/2013 | Shani et al. |
| 8,591,090 B2 | 11/2013 | Lin |
| 8,593,070 B2 | 11/2013 | Wang et al. |
| D695,442 S | 12/2013 | Speier et al. |
| D695,447 S | 12/2013 | Speier et al. |
| 8,598,778 B2 | 12/2013 | Allen et al. |
| 8,602,586 B1 | 12/2013 | Dau et al. |
| 8,608,351 B2 | 12/2013 | Peifer |
| 8,616,746 B2 | 12/2013 | Shinohara |
| 8,618,735 B2 | 12/2013 | Coplin et al. |
| 8,632,214 B1 | 1/2014 | Tickner et al. |
| 8,641,219 B1 | 2/2014 | Johnson et al. |
| 8,657,479 B2 | 2/2014 | Morgan et al. |
| 8,696,173 B2 | 4/2014 | Urtiga et al. |
| 8,702,281 B2 | 4/2014 | Okada et al. |
| 8,724,052 B2 | 5/2014 | Hsieh et al. |
| 8,740,440 B2 | 6/2014 | Mizuno et al. |
| 8,755,005 B2 | 6/2014 | Bierhuizen et al. |
| 8,770,821 B2 | 7/2014 | Ijzerman et al. |
| 8,780,299 B2 | 7/2014 | Ryu et al. |
| 8,833,996 B2 | 9/2014 | Dau et al. |
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 * | 10/2014 | Parker et al. ............... 362/612 |
| 8,870,430 B2 | 10/2014 | Kamikatano et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,915,611 B2 | 12/2014 | Zhang |
| 8,917,962 B1 | 12/2014 | Nichol et al. |
| 8,950,919 B2 | 2/2015 | Chen |
| 8,960,969 B2 | 2/2015 | Freund |
| 8,975,827 B2 | 3/2015 | Chobot et al. |
| 9,046,225 B2 | 6/2015 | Meyers et al. |
| 9,081,125 B2 | 7/2015 | Dau et al. |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2003/0034985 A1 | 2/2003 | Needham Riddle et al. |
| 2003/0146688 A1 | 8/2003 | Kitazawa et al. |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0146241 A1 | 7/2004 | Deladurantaye et al. |
| 2004/0213003 A1 | 10/2004 | Lauderdale et al. |
| 2004/0240217 A1 | 12/2004 | Rice |
| 2005/0024744 A1 | 2/2005 | Falicoff et al. |
| 2005/0111235 A1 | 5/2005 | Suzuki et al. |
| 2005/0201103 A1 | 9/2005 | Saccomanno et al. |
| 2005/0210643 A1 | 9/2005 | Mezei et al. |
| 2005/0286251 A1 | 12/2005 | Smith |
| 2006/0002146 A1 | 1/2006 | Baba |
| 2006/0072203 A1 | 4/2006 | Lee |
| 2006/0076568 A1 | 4/2006 | Keller et al. |
| 2006/0187651 A1 | 8/2006 | Kim et al. |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0189033 A1 | 8/2007 | Watanabe et al. |
| 2007/0223247 A1 | 9/2007 | Lee et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2008/0002399 A1 | 1/2008 | Villard et al. |
| 2008/0037284 A1 | 2/2008 | Rudisill |
| 2008/0094853 A1 | 4/2008 | Kim et al. |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 | 8/2008 | Turner |
| 2008/0266879 A1 | 10/2008 | Chang |
| 2008/0266901 A1 | 10/2008 | Chang |
| 2009/0027893 A1 | 1/2009 | Chang |
| 2009/0091948 A1 | 4/2009 | Wang et al. |
| 2009/0103293 A1 | 4/2009 | Harbers et al. |
| 2009/0196071 A1 | 8/2009 | Matheson et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2009/0310367 A1 | 12/2009 | Kuo |
| 2009/0316414 A1 | 12/2009 | Yang et al. |
| 2010/0008088 A1 | 1/2010 | Koizumi et al. |
| 2010/0008628 A1 | 1/2010 | Shani |
| 2010/0027257 A1 | 2/2010 | Boonekamp et al. |
| 2010/0046219 A1 | 2/2010 | Pijlman et al. |
| 2010/0053959 A1 | 3/2010 | Ijzerman et al. |
| 2010/0073597 A1 | 3/2010 | Bierhuizen et al. |
| 2010/0079843 A1 | 4/2010 | Derichs et al. |
| 2010/0079980 A1 | 4/2010 | Sakai |
| 2010/0110673 A1 | 5/2010 | Bergman et al. |
| 2010/0110679 A1 | 5/2010 | Teng et al. |
| 2010/0118531 A1 | 5/2010 | Montagne |
| 2010/0128483 A1 | 5/2010 | Reo et al. |
| 2010/0133422 A1 | 6/2010 | Lin et al. |
| 2010/0157577 A1 | 6/2010 | Montgomery et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0246158 A1 | 9/2010 | Van Gorkom et al. |
| 2010/0254129 A1 | 10/2010 | Le Toquin et al. |
| 2010/0283369 A1 * | 11/2010 | Chen ................ F21K 9/52 313/1 |
| 2010/0301360 A1 | 12/2010 | Van De Ven et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0315833 A1 | 12/2010 | Holman et al. |
| 2010/0320904 A1 | 12/2010 | Meir |
| 2010/0328936 A1 | 12/2010 | Pance et al. |
| 2011/0007505 A1 | 1/2011 | Wang et al. |
| 2011/0013397 A1 | 1/2011 | Catone et al. |
| 2011/0013420 A1 | 1/2011 | Coleman et al. |
| 2011/0037388 A1 | 2/2011 | Lou et al. |
| 2011/0044022 A1 | 2/2011 | Ko et al. |
| 2011/0044582 A1 | 2/2011 | Travis et al. |
| 2011/0051457 A1 | 3/2011 | Chen |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063855 A1 | 3/2011 | Vissenberg |
| 2011/0069843 A1 | 3/2011 | Cohen et al. |
| 2011/0122616 A1 | 5/2011 | Hochstein |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |

(56) References Cited

U.S. PATENT DOCUMENTS

| | | |
|---|---|---|
| 2011/0187273 A1 | 8/2011 | Summerford et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1 | 10/2011 | Boonekamp |
| 2011/0261570 A1 | 10/2011 | Okada et al. |
| 2011/0273079 A1 | 11/2011 | Pickard et al. |
| 2011/0273882 A1* | 11/2011 | Pickard ............... 362/237 |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0014128 A1 | 1/2012 | Lin |
| 2012/0020108 A1 | 1/2012 | Chang |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0068615 A1 | 3/2012 | Duong |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0075873 A1 | 3/2012 | Cooper |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |
| 2012/0147624 A1 | 6/2012 | Li et al. |
| 2012/0152490 A1 | 6/2012 | Wen et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Petcavich et al. |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0287677 A1 | 11/2012 | Wheatley et al. |
| 2012/0298181 A1 | 11/2012 | Cashion et al. |
| 2012/0307496 A1 | 12/2012 | Phillips et al. |
| 2012/0320626 A1 | 12/2012 | Quilici et al. |
| 2012/0326614 A1 | 12/2012 | Tsuji et al. |
| 2013/0003363 A1 | 1/2013 | Lu et al. |
| 2013/0003409 A1 | 1/2013 | Vissenberg et al. |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1 | 2/2013 | Dau et al. |
| 2013/0044480 A1* | 2/2013 | Sato et al. ............... 362/235 |
| 2013/0077298 A1 | 3/2013 | Steele et al. |
| 2013/0107518 A1 | 5/2013 | Boyer et al. |
| 2013/0107527 A1 | 5/2013 | Boyer et al. |
| 2013/0107528 A1 | 5/2013 | Boyer et al. |
| 2013/0128593 A1 | 5/2013 | Luo |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0300310 A1 | 11/2013 | Hu et al. |
| 2013/0328073 A1 | 12/2013 | Lowes et al. |
| 2013/0336001 A1 | 12/2013 | Boonekamp |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211496 A1 | 7/2014 | Durkee |
| 2014/0211502 A1 | 7/2014 | Keller et al. |
| 2014/0211503 A1 | 7/2014 | Tarsa |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268762 A1 | 9/2014 | Raleigh et al. |
| 2014/0268875 A1 | 9/2014 | Durkee |
| 2014/0268879 A1 | 9/2014 | Mizuyama et al. |
| 2014/0270672 A1 | 9/2014 | Durkee |
| 2014/2688761 | 9/2014 | Raleigh et al. |
| 2014/0334126 A1 | 11/2014 | Speier et al. |
| 2014/0347885 A1 | 11/2014 | Wilcox et al. |
| 2014/0355297 A1 | 12/2014 | Castillo et al. |
| 2014/0355302 A1 | 12/2014 | Wilcox et al. |
| 2015/0003059 A1 | 1/2015 | Haitz et al. |
| 2015/0049507 A1 | 2/2015 | Shani et al. |
| 2015/0049511 A1 | 2/2015 | Tarsa et al. |
| 2015/0055369 A1 | 2/2015 | Tarsa et al. |
| 2015/0055371 A1 | 2/2015 | van de Ven et al. |
| 2015/0109820 A1 | 4/2015 | Wilcox et al. |
| 2015/0160396 A1 | 6/2015 | Wilcox et al. |
| 2015/0177439 A1 | 6/2015 | Durkee et al. |
| 2015/0192742 A1 | 7/2015 | Tarsa et al. |
| 2015/0198760 A1 | 7/2015 | Wilcox et al. |
| 2015/0204491 A1 | 7/2015 | Yuan et al. |

FOREIGN PATENT DOCUMENTS

| | | |
|---|---|---|
| DE | 10047101 | 5/2002 |
| DE | 10203106 | 7/2003 |
| DE | 10302563 | 7/2004 |
| DE | 10302564 | 7/2004 |
| DE | 102006009325 | 9/2007 |
| DE | 102006011296 | 9/2007 |
| DE | 102006013343 | 9/2007 |
| JP | H10173870 | 6/1998 |
| JP | 2000/147264 | 5/2000 |
| JP | 2004/227934 A | 8/2004 |
| JP | 3093080 | 12/2005 |
| JP | 2006/131444 | 5/2006 |
| JP | 2006/0221922 A | 8/2006 |
| JP | 2007/123130 A | 5/2007 |
| WO | WO 96/21122 | 7/1996 |
| WO | WO 96/21884 | 7/1996 |
| WO | WO 99/04531 | 1/1999 |
| WO | WO 03/031869 | 4/2003 |
| WO | WO 2009/012484 | 1/2009 |
| WO | WO 2011/130648 | 10/2011 |

(56) References Cited

FOREIGN PATENT DOCUMENTS

| WO | WO 2013/078463 | 5/2013 |
|---|---|---|
| WO | WO 2013/082537 | 6/2013 |
| WO | WO 2014/120672 A2 | 8/2014 |
| WO | WO 2014/120968 | 8/2014 |
| WO | WO 2014/120971 | 8/2014 |
| WO | WO 2014/120672 A3 | 9/2014 |
| WO | WO 2014/145283 | 9/2014 |

OTHER PUBLICATIONS

U.S. Appl. No. 13/657,421, filed Oct. 22, 2012 (38 pages).
Web page at http://www.oluce.com/en/lamps/table/colombo-281-detail, printed Nov. 19, 2013 (2 pages).
International Search Report and Written Opinion dated May 19, 2014, for International Application No. PCT/US2014/013891 (12 pages).
Invitation to Pay Additional Fees dated May 1, 2014, for International Application No. PCT/US2014/013931, Applicant, Cree, Inc. (2 pages).
Invitation to Pay Additional Fees dated May 1, 2014, for International Application No. PCT/US2014/013934, Applicant, Cree, Inc. (2 pages).
Invitation to Pay Additional Fees for International Application No. PCT/US2014/013408, issued May 8, 2014, Applicant, Cree, Inc. (2 pages).
International Search Report and Written Opinion for International Application No. PCT/US2014/013408, issued Jul. 17, 2014, Applicant, Cree, Inc. (21 pages).
International Search Report and Written Opinion for International Application No. PCT/US2014/013854, issued Jun. 5, 2014, Applicant, Cree, Inc. (15 pages).
International Search Report and Written Opinion dated Jul. 14, 2014, for International Application No. PCT/US2014/013931 Applicant, Cree, Inc. (21 pages).
International Search Report and Written Opinion dated Jul. 10, 2014, for International Application No. PCT/US2014/013934, Applicant, Cree, Inc. (19 pages).
Non-final Office action dated Jul. 31, 2015, for U.S. Appl. No. 14/015,801, Applicant, Cree, Inc. (48 pages).
Non-final Office action dated Jun. 10, 2015, for U.S. Appl. No. 13/842,521, Applicant, Cree, Inc. (53 pages).
Non-final Office action dated Mar. 24, 2015, for U.S. Appl. No. 13/839,949 Applicant, Cree, Inc. (31 pages).
Final Office action dated Jun. 2, 2015, for U.S. Appl. No. 13/841,622, Applicant, Cree, Inc. (58 pages).
Final Office action dated Jun. 11, 2015, for U.S. Appl. No. 13/938,877, Applicant, Cree, Inc. (40 pages).
Non-final Office action dated Apr. 1, 2015, for U.S. Appl. No. 13/841,074, Applicant, Cree, Inc. (57 pages).
Non-final Office action dated Apr. 30, 2015, for U.S. Appl. No. 14/101,132, Applicant, Cree, Inc. (21 pages).
Non-final Office action dated Aug. 12, 2015, for U.S. Appl. No. 14/577,730, Applicant, Cree, Inc. (52 pages).
Non-final Office action dated Feb. 27, 2015, U.S. Appl. No. 14/292,778, Applicant, Cree, Inc. (10 pages).
Invitation to Pay Additional Fees for International Application No. PCT/US2015/032011 dated Aug. 6, 2015, Applicant, Cree, Inc. (2 pages).
Invitation to Pay Additional Fees for International Application No. PCT/US2015/032040 dated Aug. 6, 2015, Applicant, Cree, Inc. (2 pages).
Invitation to Pay Additional Fees for International Application No. PCT/US2015/020601 dated Jun. 5, 2015, Applicant, Cree, Inc. (2 pages).
International Search Report and Written Opinion for International Application No. PCT/US2015/020601, dated Jul. 31, 2015, Applicant, Cree, Inc. (23 pages).
Iprp for International Application No. PCT/US2014/013840, dated Aug. 13, 2015, Applicant, Cree, Inc. (10 pages).
International Search Report and Written Opinion for International Application No. PCT/US2014/013840, dated Jul. 28, 2014, Applicant, Cree, Inc. (17 pages).
Iprp for International Application No. PCT/US2014/013937, dated Aug. 13, 2015, Applicant, Cree, Inc., (16 pages).
International Search Report and Written Opinion for International Application No. PCT/US2014/013937, dated Jul. 11, 2014, Applicant, Cree, Inc., (29 pages).
Iprp for International Application No. PCT/US2014/013891, dated Aug. 13, 2015, Applicant, Cree, Inc., (8 pages).
International Search Report and Written Opinion for International Application No. PCT/US14/30017, dated Aug. 1, 2014, Applicant, Cree, Inc., (21 pages).
International Search Report and Written Opinion for International Application No. PCT/US2014/072848, dated Mar. 25, 2015, Applicant, Cree, Inc., (17 pages).
Iprp for International Application No. PCT/US2014/013934, dated Aug. 13, 2015, Applicant, Cree, Inc., (11 pages).
Iprp for International Application No. PCT/US2014/013854, dated Aug. 13, 2015, Applicant, Cree, Inc., (9 pages).
Iprp for International Application No. PCT/US2014/013931, dated Aug. 13, 2015, Applicant, Cree, Inc., (15 pages).
Iprp for International Application No. PCT/US2014/013408, dated Aug. 13, 2015, Applicant, Cree, Inc., (15 pages).
U.S. Appl. No. 14/618,884, filed Feb. 10, 2015, Inventors, Castillo et al. (56 pages).
U.S. Appl. No. 14/618,819, filed Feb. 10, 2015, Inventors, Bendtsen et al. (37 pages).
U.S. Appl. No. 61/932,058, filed Jan. 27, 2014, Inventors, Carrigan et al. (203 pages).
U.S. Appl. No. 14/462,322, filed Aug. 18, 2014, Inventors, Castillo et al. (31 pages).
U.S. Appl. No. 29/496,754, filed Jul. 16, 2014, Inventors, Pope et al. (35 pages).
U.S. Appl. No. 14/801,476, filed Jul. 16, 2015, Inventors, de Sugny et al. (38 pages).
U.S. Appl. No. 14/472,078, filed Aug. 28, 2014, Inventors, Tarsa et al. (60 pages).
U.S. Appl. No. 14/726,152, filed May 29, 2015, Inventors, Yuan et al. (57 pages).
Non-final Office action dated Mar. 24, 2015, for U.S. Appl. No. 13/840,563, Applicant, Cree, Inc. (36 pages).
U.S. Appl. No. 62/088,375, filed Dec. 5, 2014, Inventors, Hussell et al. (51 pages).
U.S. Appl. No. 14/291,829, filed May 30, 2014, Inventors, Yuan et al. (65 pages).
U.S. Appl. No. 14/292,001, filed May 30, 2014, Inventors, Hu et al. (38 pages).
U.S. Appl. No. 14/292,286, filed May 30, 2014, Inventors, McBryde et al. (103 pages).
U.S. Appl. No. 14/657,988, filed Mar. 13, 2015, Inventors, Wilcox et al. (181 pages).
Non-final Office action dated Jun. 30, 2015, for U.S. Appl. No. 14/583,415, Applicant, Cree, Inc. (216 pages).
U.S. Appl. No. 14/839,557, filed Aug. 28, 2015, Inventors, Wilcenski et al. (63 pages).
Iijima et al., "Document Scanner Using Polymer Waveguides With a Microlens Array," Optical Engineering, vol. 41, Issue 11, pp. 2743-2748, Oct. 28, 2002 (4 pages).

(56) References Cited

OTHER PUBLICATIONS

Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).

Ji et al., "Electrically Controllable Microlens Array Fabricated by Anisotropic Phase Separation From Liquid-Crystal and Polymer Composite Materials," vol. 28, No. 13, Optics Letters, pp. 1147-1149, Jul. 1, 2003 (4 pages).

Non-final Office action dated Sep. 4, 2015, for U.S. Appl. No. 14/101,132, Applicant, Cree, Inc. (48 pages).

Non-final Office action dated Aug. 31, 2015, for U.S. Appl. No. 14/292,778, Applicant, Cree, Inc. (49 pages).

International Search Report and Written Opinion dated Mar. 25, 2015, for International Application No. PCT/US2014/072860, Applicant, Cree, Inc. (14 pages).

Extended European Search Report and Written Opinion dated May 19, 2015, for European Application No. 14192325.0-1562, Applicant, Cree, Inc. (5 pages).

\* cited by examiner

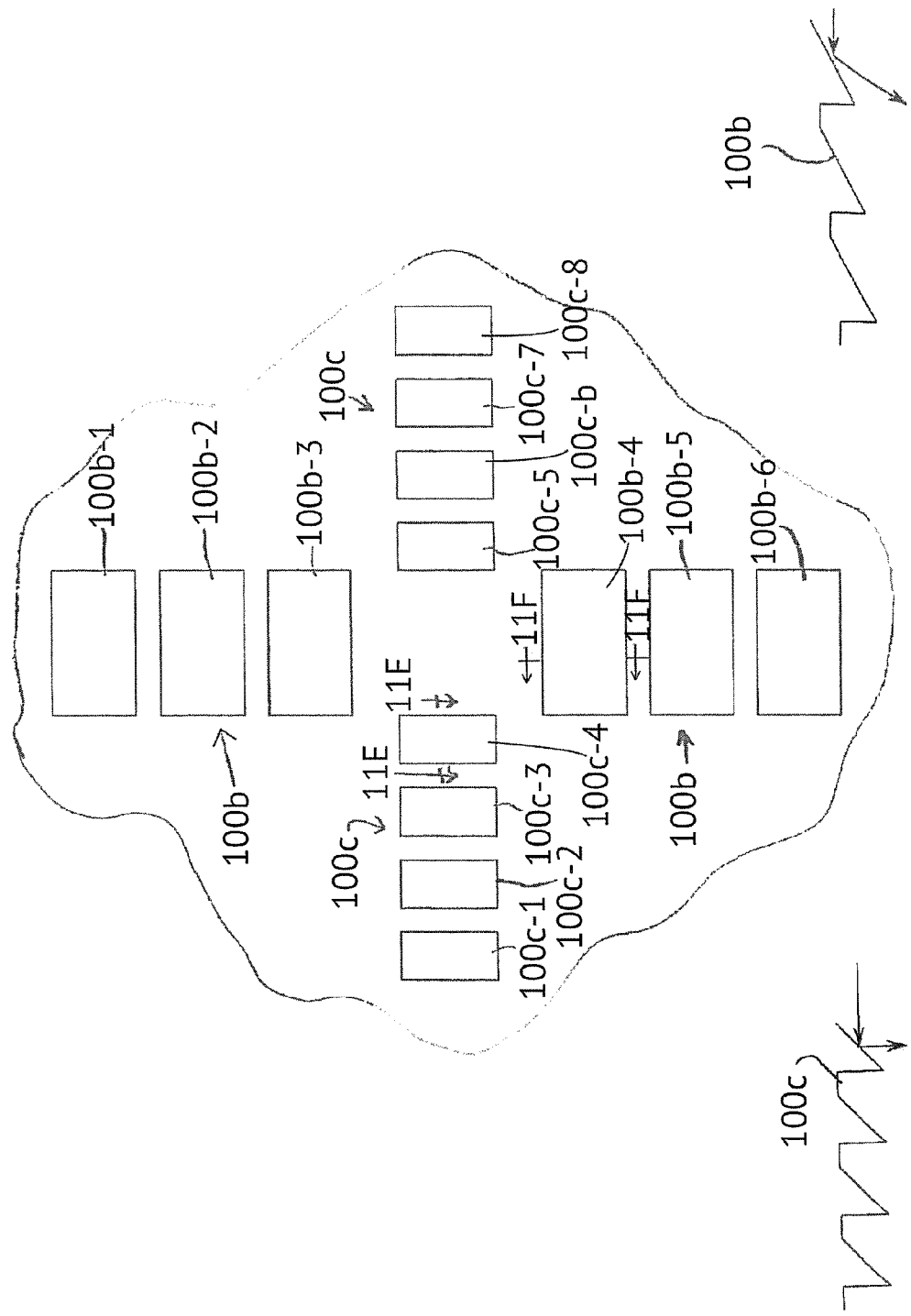

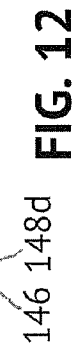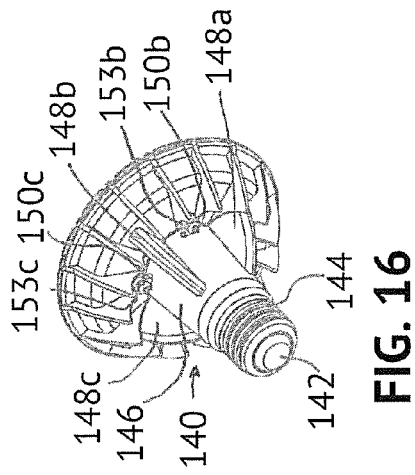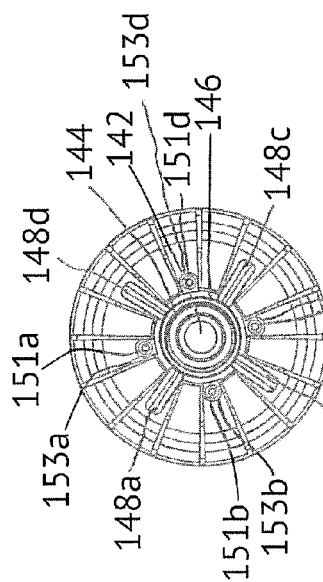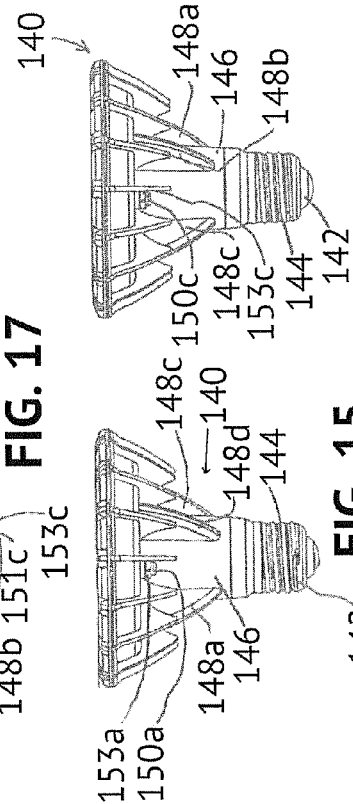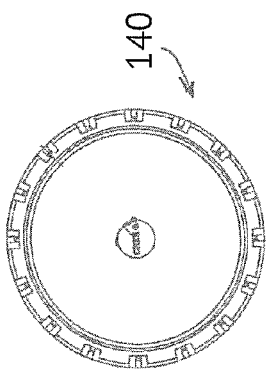

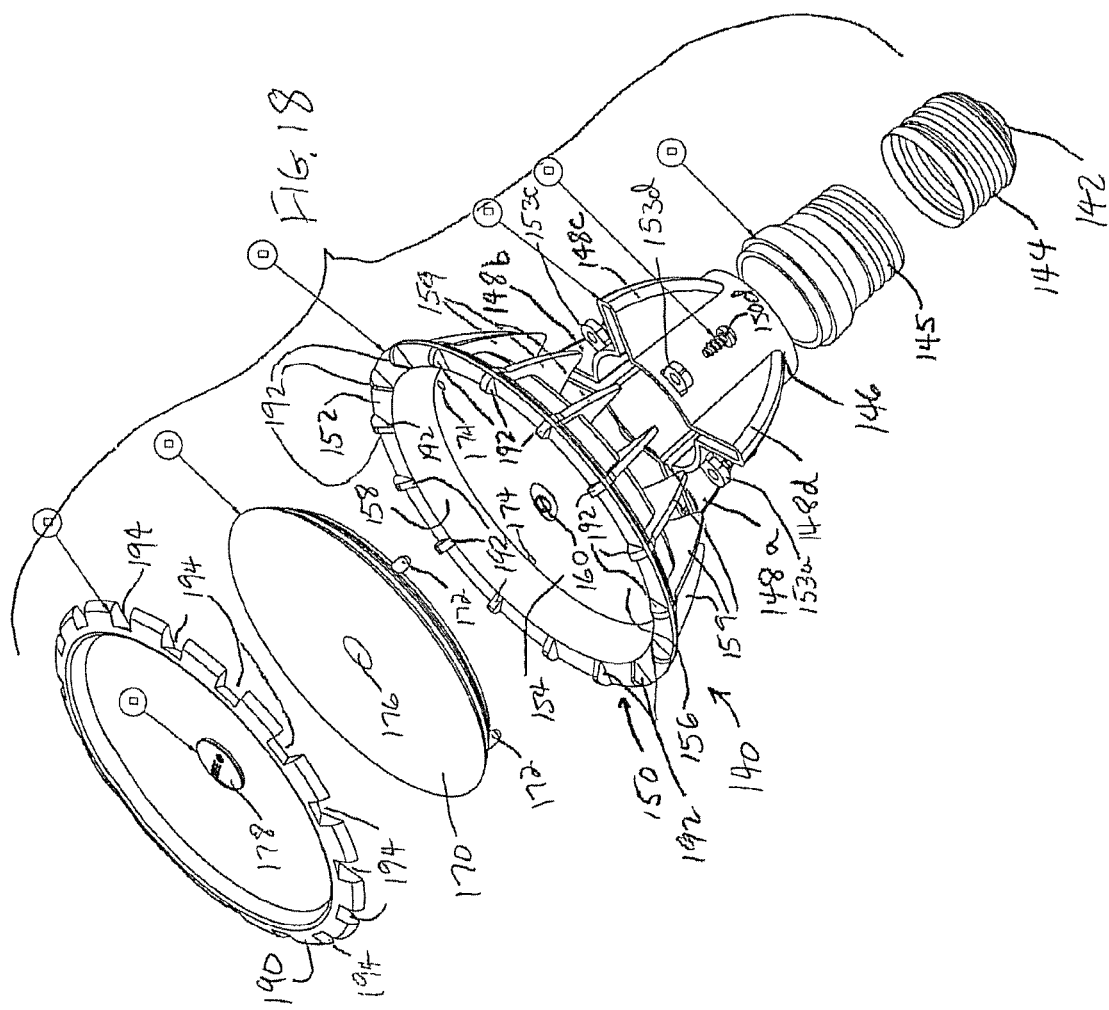

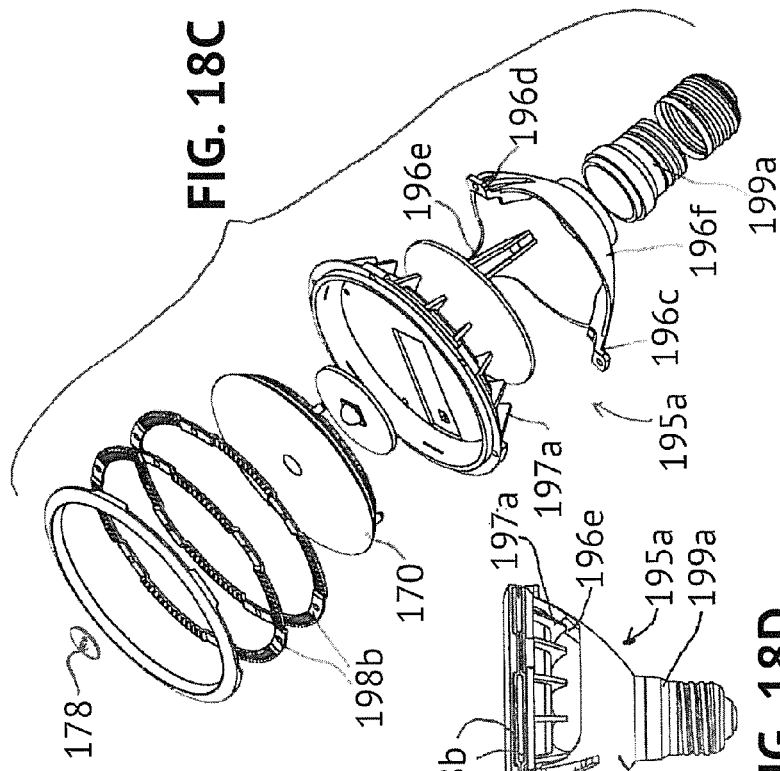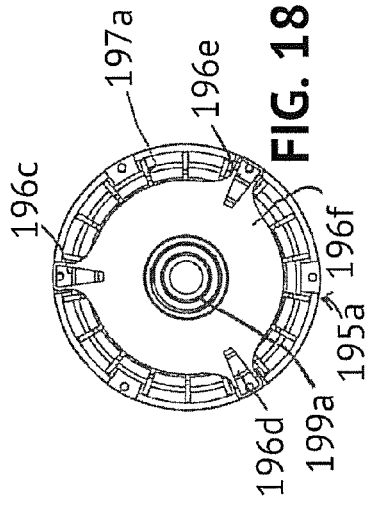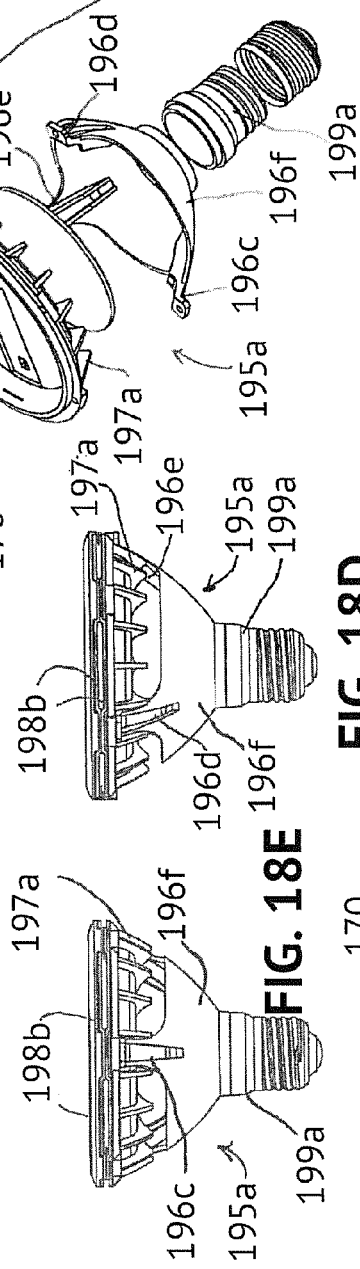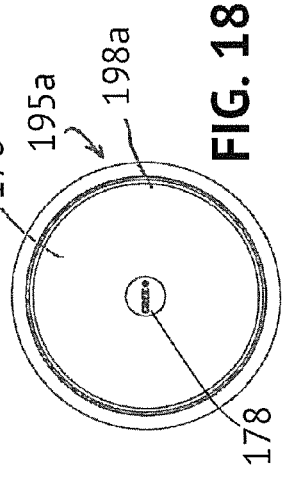

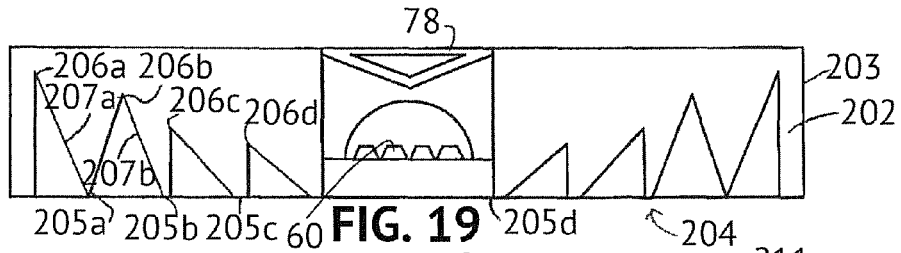
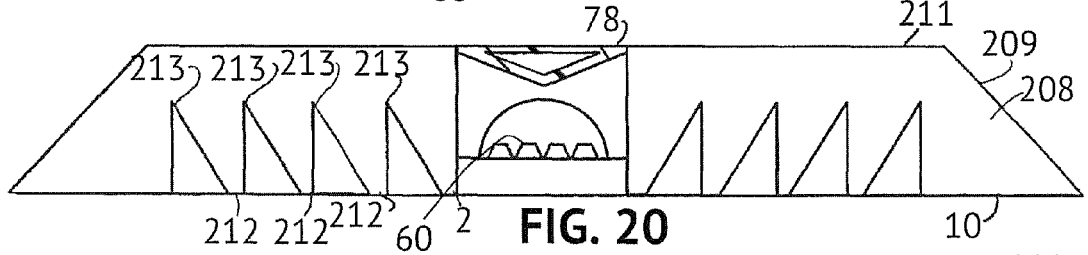
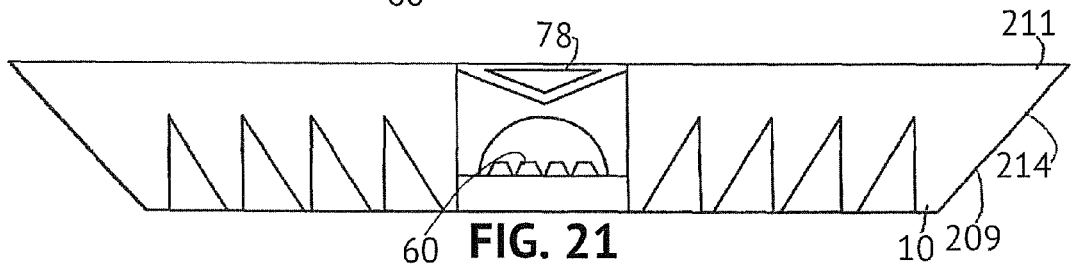
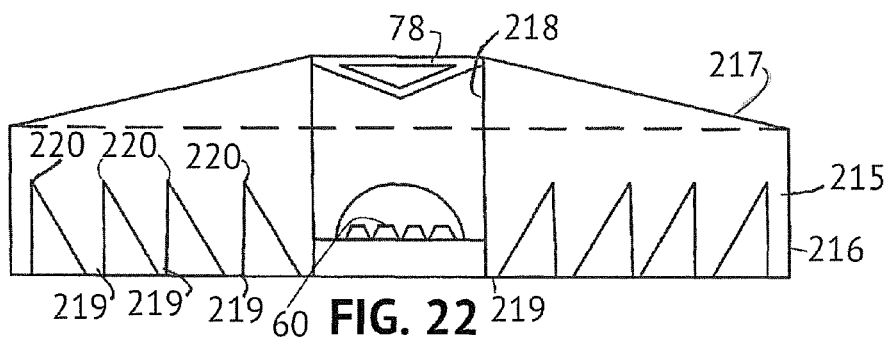
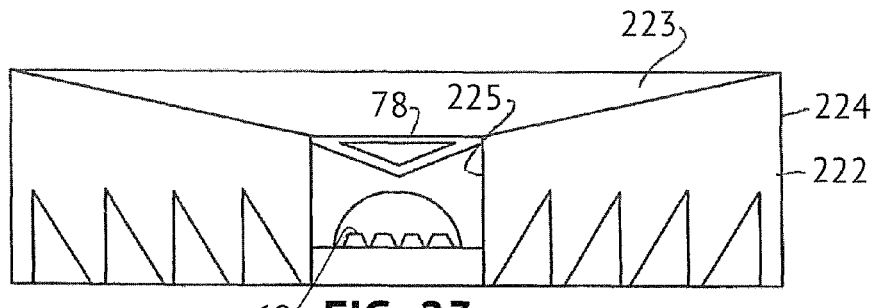

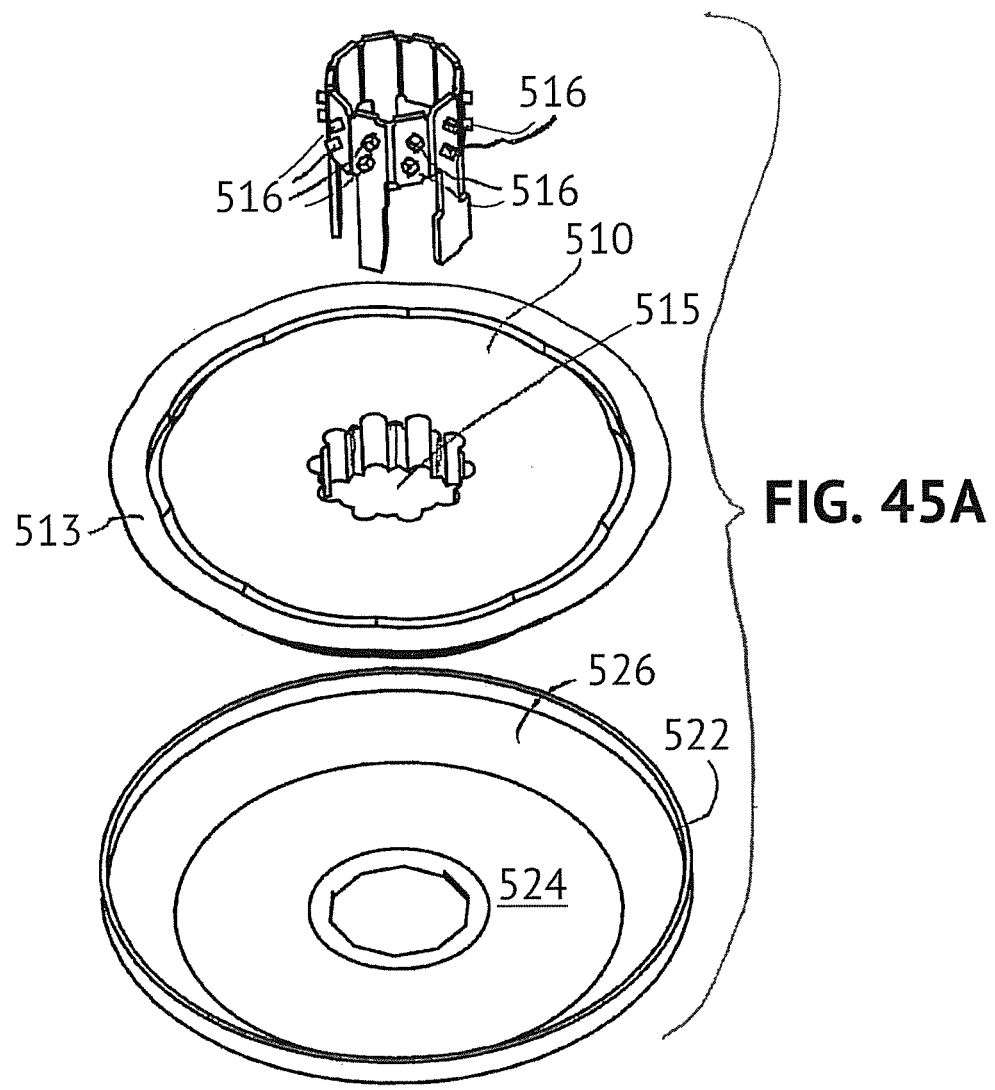

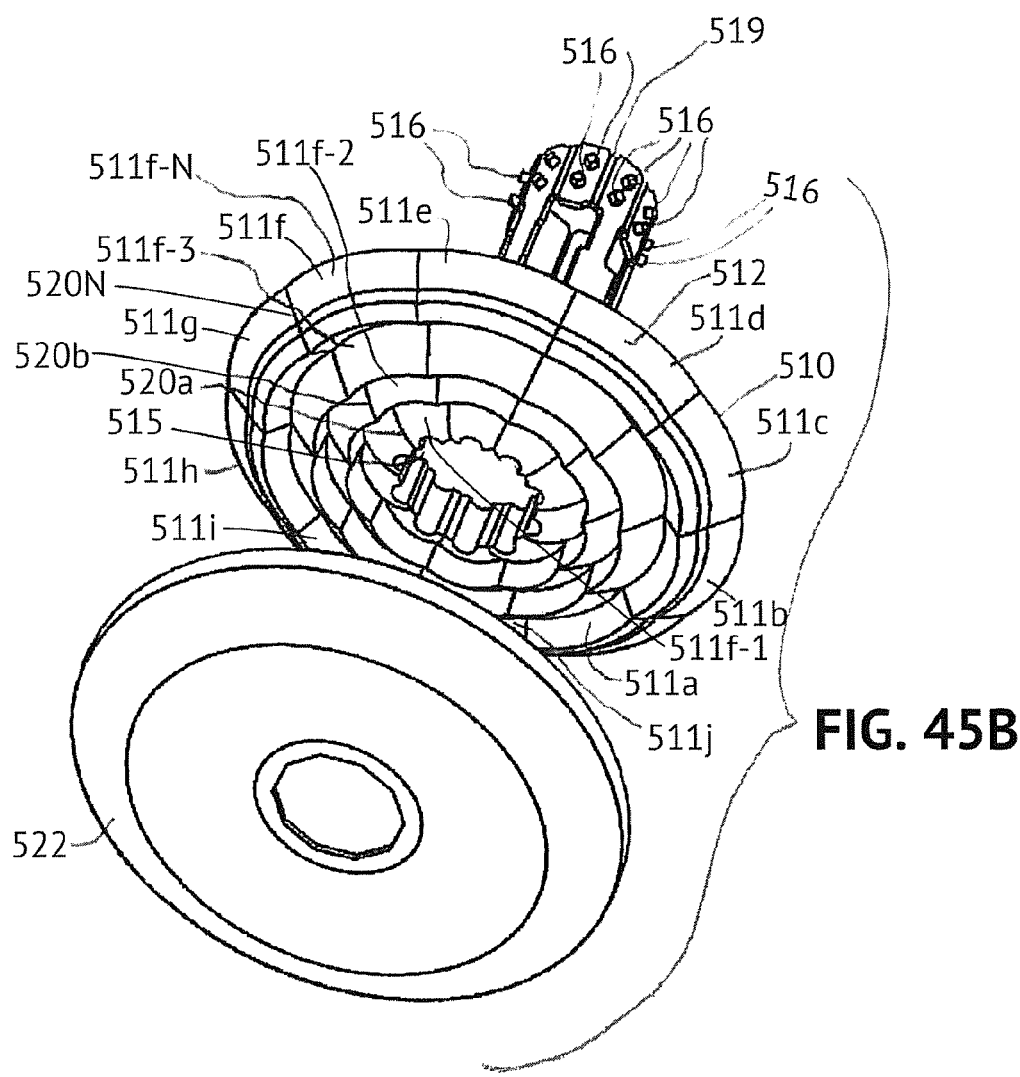

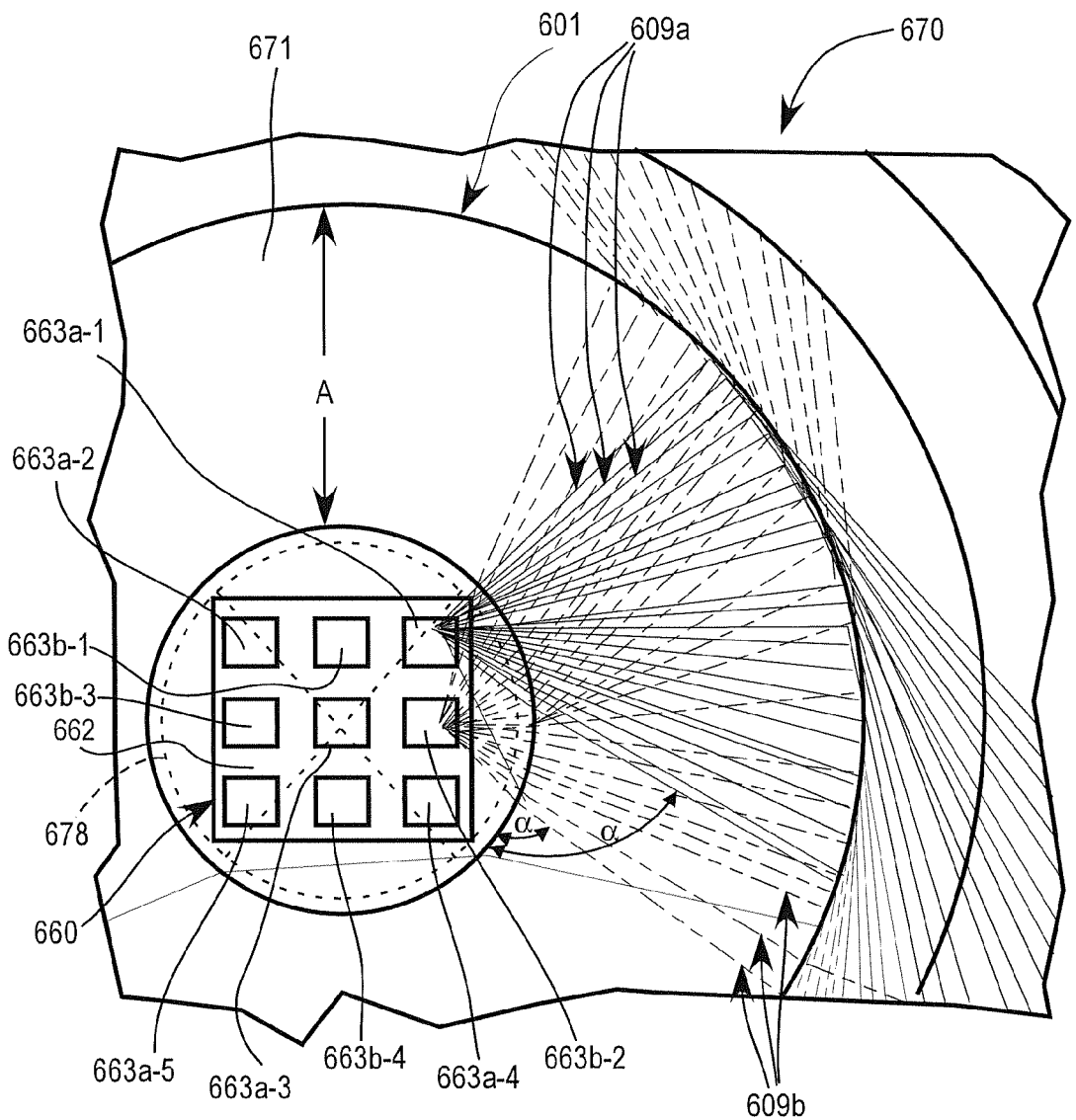
FIG. 52A
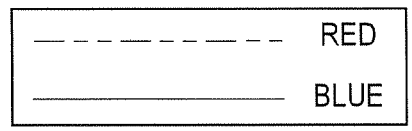

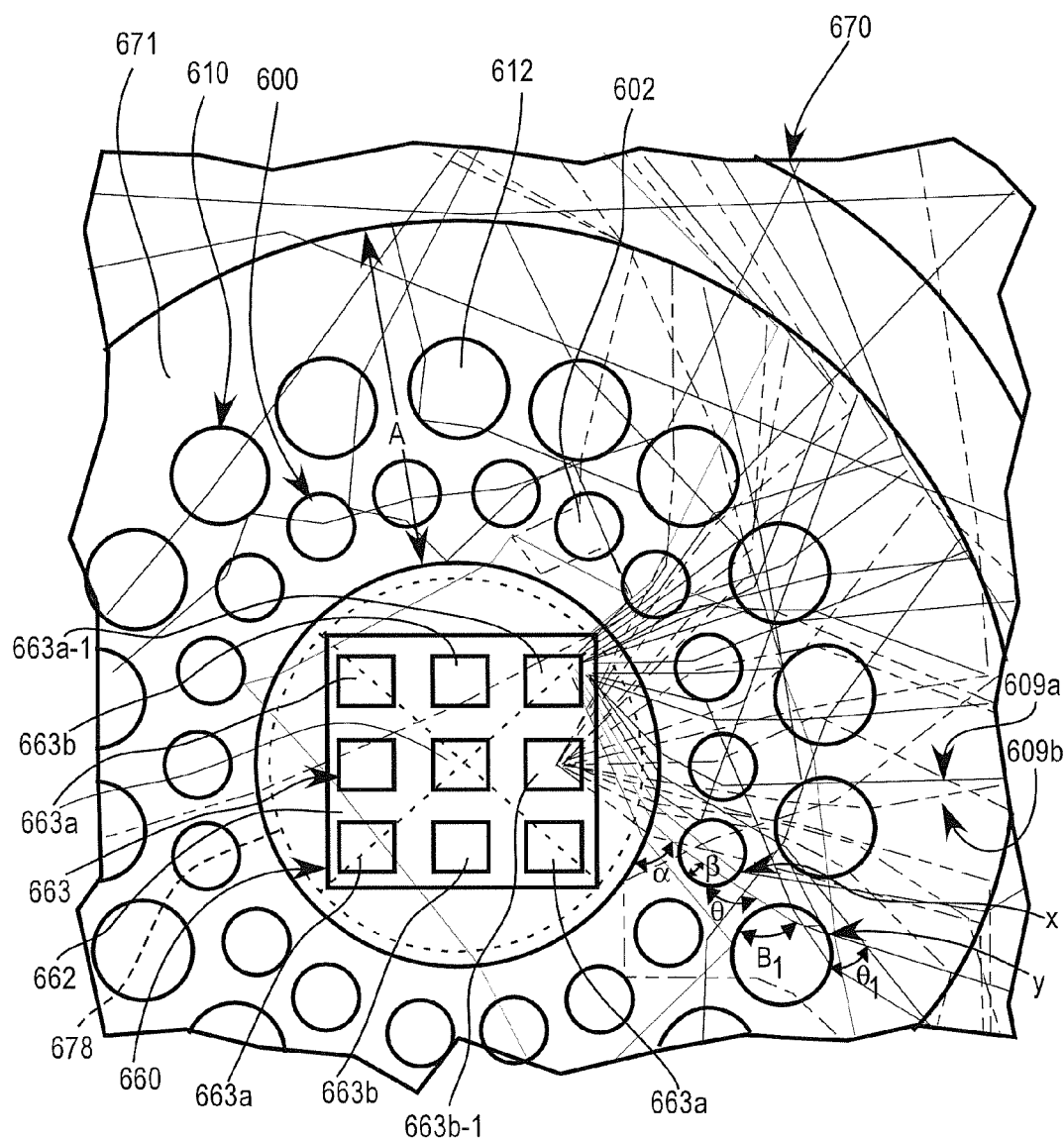
FIG. 53
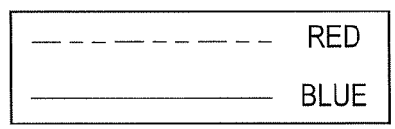

OPTICAL WAVEGUIDE AND LAMP INCLUDING SAME

CROSS-REFERENCE TO RELATED APPLICATIONS

The present application claims the benefit of U.S. Provisional U.S. Patent Application No. 61/758,660, filed Jan. 30, 2013, entitled "Optical Waveguide" and further comprises a continuation-in-part of U.S. U.S. patent application Ser. No. 13/842,521, filed Mar. 15, 2013, entitled "Optical Waveguides", and further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/841,074, filed Mar. 15, 2013, entitled "Optical Waveguide Body", and further comprises a continuation-in-part of U.S. patent application Ser. No. 13/840,563, filed Mar. 15, 2013, entitled "Optical Waveguide and Luminaire Including Same", and further comprises a continuation-in-part of U.S. patent application Ser. No. 13/938,877, filed Jul. 10, 2013, entitled "Optical Waveguide and Luminaire Incorporating Same", all owned by the assignee of the present application, and the disclosures of which are incorporated by reference herein. This patent application also incorporates by reference co-pending U.S. patent application Ser. No. 14/101,086, entitled "Optical Waveguides and Luminaires Incorporating Same" by Eric J. Tarsa et al., filed Dec. 9, 2013, U.S. patent application Ser. No. 14/101,099, entitled "Optical Waveguide Assembly And Light Engine Including Same" by Zongjie Yuan et al., filed Dec. 9, 2013, U.S. patent application Ser. No. 14/101,132, entitled "Waveguide Bodies Including Redirection Features and Methods of Producing Same" by Eric J. Tarsa, filed Dec. 9, 2013, U.S. patent application Ser. No. 14/101,147, entitled "Luminaires Using Waveguide Bodies and Optical Elements" by Bernd Keller et al., filed Dec. 9, 2013, and U.S. patent application Ser. No. 14/101,129 entitled "Simplified Low Profile Module With Light Guide For Pendant, Surface Mount, Wall Mount And Stand Alone Luminaires" by Eric J. Tarsa et al., filed Dec. 9, 2013.

REFERENCE REGARDING FEDERALLY SPONSORED RESEARCH OR DEVELOPMENT

Not applicable

SEQUENTIAL LISTING

Not applicable

FIELD OF THE INVENTION

The present inventive subject matter relates to optical waveguides, and more particularly to optical waveguides for general lighting.

BACKGROUND OF THE INVENTION

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material which defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face.

Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Van Ostrand et al. U.S. Pat. No. 8,002,450 discloses a light mixing waveguide for edge-lit flat panel displays. The waveguide has a reflectorized edge, a pair of opposing side edges, a light transfer edge opposite the reflectorized edge, and a number of cavities formed inside the waveguide. One of the side edges is configured to receive light from a light source so that the received light is totally-internally reflected from top and bottom surfaces of the waveguide. Interaction of the received light, the cavities, and the reflectorized edge mixes the received light prior to the light passing through the light transfer edge and into a target optical system.

SUMMARY OF THE INVENTION

According to one aspect of the present invention, an optical waveguide comprises a body of optically transmissive material defined by outer edges and comprising a width substantially greater than an overall thickness thereof. The body of optically transmissive material comprises a first side and a second side opposite the first side. An interior coupling cavity is defined by a surface intersecting the second side and extends from the second side toward the first side of the body of optically transmissive material and is disposed remote from edges of the body and is configured to receive an LED element. The body of optically transmissive material further comprises a first array of cavities surrounding the interior coupling cavity, an extraction feature disposed on one of the first and second sides wherein the light extraction feature at least partially surrounds the interior coupling cavity, and a total internal reflectance optical member disposed in the interior coupling cavity.

According to a second aspect of the present invention, a luminaire comprises a base comprising an electrical connector, a central body disposed on the base, and a light assembly joined to the central body. The light assembly comprises a lightguide body utilizing total internal reflection and comprising an interior coupling cavity, an LED element disposed in the coupling cavity, and a first array of cavities surrounding the coupling cavity. The light assembly further comprises a reflective surface disposed in the interior coupling cavity and the lightguide body is comprised of a material such that the LED element directs light onto the reflective surface and the light is deverted transversely into the material of the lightguide body. Furthermore, the light passes through a cavity of the first array of cavities at an angle that is different from an angle at which the light passes through the material of the lightguide body.

According to another aspect of the present invention, an optical waveguide comprises a body of optically transmissive material comprising a width substantially greater than an overall thickness thereof. The body of optically transmissive material comprises a first side, a second side opposite the first side, and an interior coupling cavity extending between the first and second sides. The interior coupling cavity is configured to receive an LED element. The body of optically transmissive material further comprises at least one array of color mixing cavities each extending at least partially through the waveguide body and the array of color mixing cavities surround the interior coupling cavity. Further, the waveguide body utilizes total internal reflection, and the body of optically transmissive material comprises light mixing features in the interior coupling cavity.

Other aspects and advantages of the present invention will become apparent upon consideration of the following detailed description and the attached drawings.

BRIEF DESCRIPTION OF THE DRAWINGS

FIG. 11D is a diagrammatic elevational view of an asymmetric waveguide;

FIGS. 11E and 11F are cross sectional views taken generally along the lines 11E-11E and 11F-11F, respectively, of FIG. 11D;

FIG. 12 is an isometric view of a first end of a second lamp incorporating a waveguide according to a second embodiment of the present invention;

FIG. 13 is a first end elevational view of the lamp of FIG. 12;

FIG. 14 is a first side elevational view of the lamp of FIG. 12;

FIG. 15 is a second side elevational view of the lamp of FIG. 12;

FIG. 16 is a second end isometric view of the lamp of FIG. 12;

FIG. 17 is a second end elevational view of the lamp of FIG. 12;

FIG. 18 is an exploded isometric first end view of the lamp of FIG. 12;

FIG. 18C is an exploded isometric view of yet another lamp;

FIG. 18D is a side elevational view of the lamp of FIG. 18C as assembled;

FIG. 18E is a front elevational view of the lamp of FIG. 18D;

FIG. 18F is a bottom elevational view of the lamp of FIG. 18D;

FIG. 18G is a top plan view of the lamp of FIG. 18D;

FIGS. 19, 19A and 20-25 are cross sectional views similar to FIG. 11 of further embodiments of waveguides according to the present invention;

FIGS. 45A and 45B are exploded isometric views of the light assembly of FIG. 43;

FIG. 52A illustrates an embodiment in which the LEDs 663 are disposed in a checkerboard pattern with the red LEDs 663*b* being disposed between the blue-shifted LEDs 663*a*;

FIG. 53 is a partial fragmentary diagrammatic view of the waveguide of FIG. 50 illustrating the general path light beams emitted from two different light sources travel as the light beams pass through a first array of cavities and a second array of cavities disposed in the waveguide;

DETAILED DESCRIPTION OF THE PREFERRED EMBODIMENTS

Figure 1:
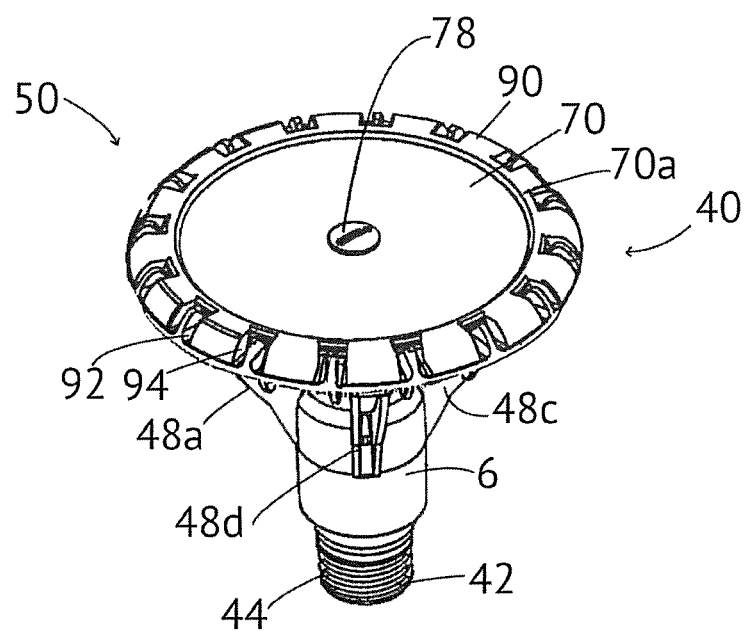
FIG. 1 is an isometric view of a first end of a first lamp incorporating a waveguide according to a first embodiment of the present invention.

Referring first to FIGS. 1-8, a lamp 40 includes a base 42 at which an Edison-style plug 44 is disposed. Extending away from the base 42 is a central body 46. Four arms 48*a*-48*d* extend away from the central body 46. A light assembly 50 is disposed on ends of the arms 48*a*-48*d* and is secured thereto by any suitable means, such as three screws 51 or other fasteners (shown in FIGS. 5 and 7) that extend through holes in the ends of the arms 48*a*-48*c* into threaded bores of the light assembly 50.

Figure 6:
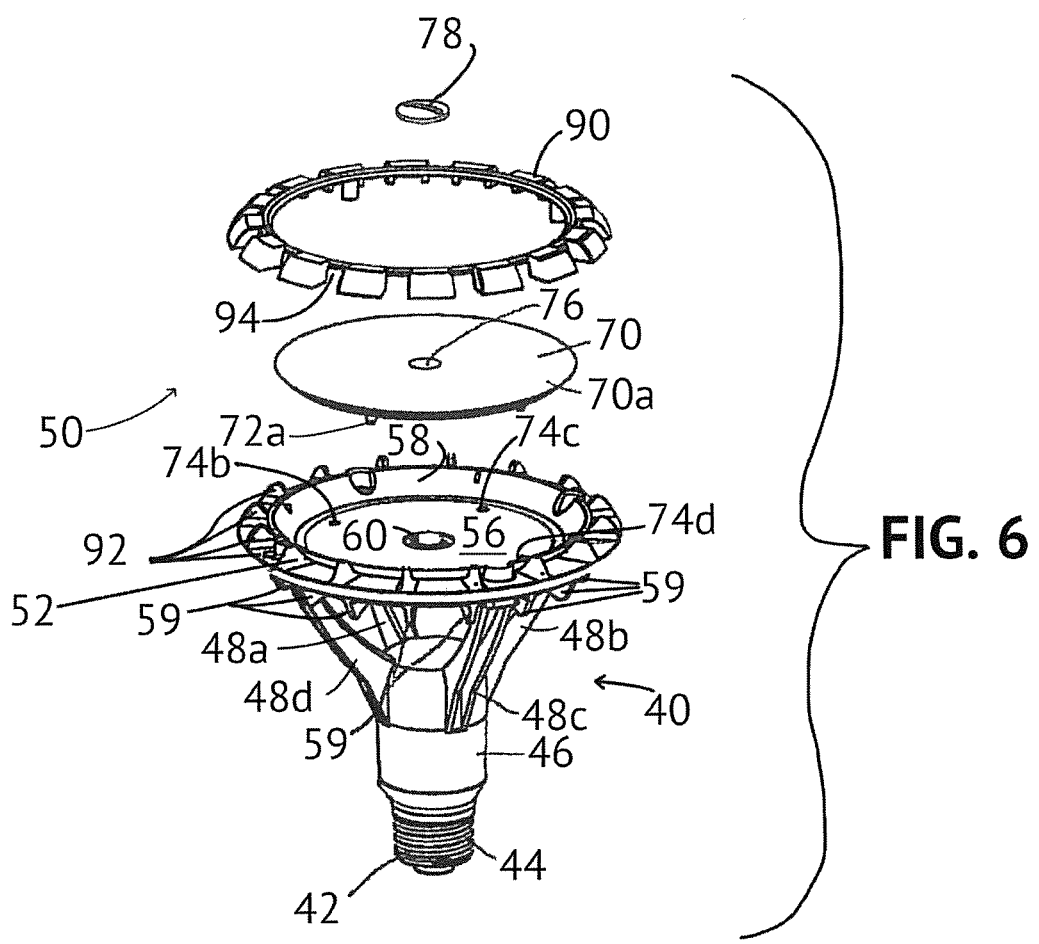
FIG. 6 is an exploded isometric first end view of the lamp of FIG. 1.
Figure 7:
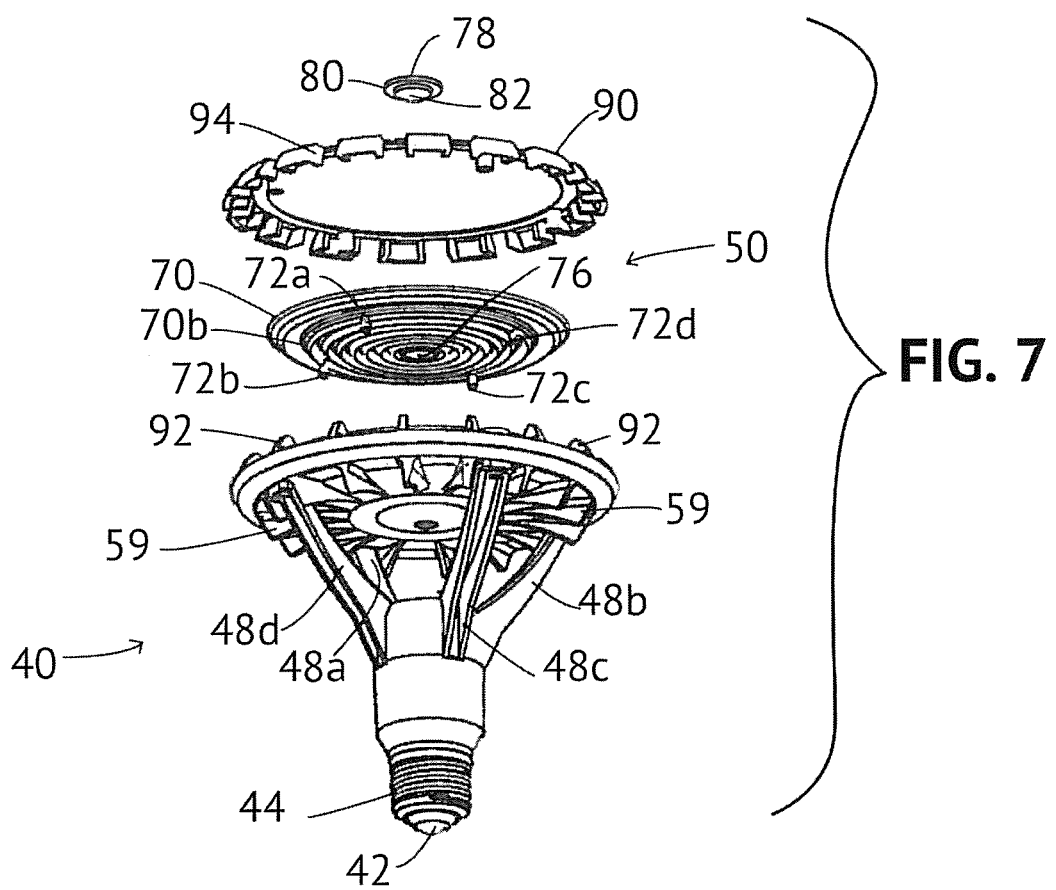
FIG. 7 is an exploded isometric second end view of the lamp of FIG. 1.
Figure 8:
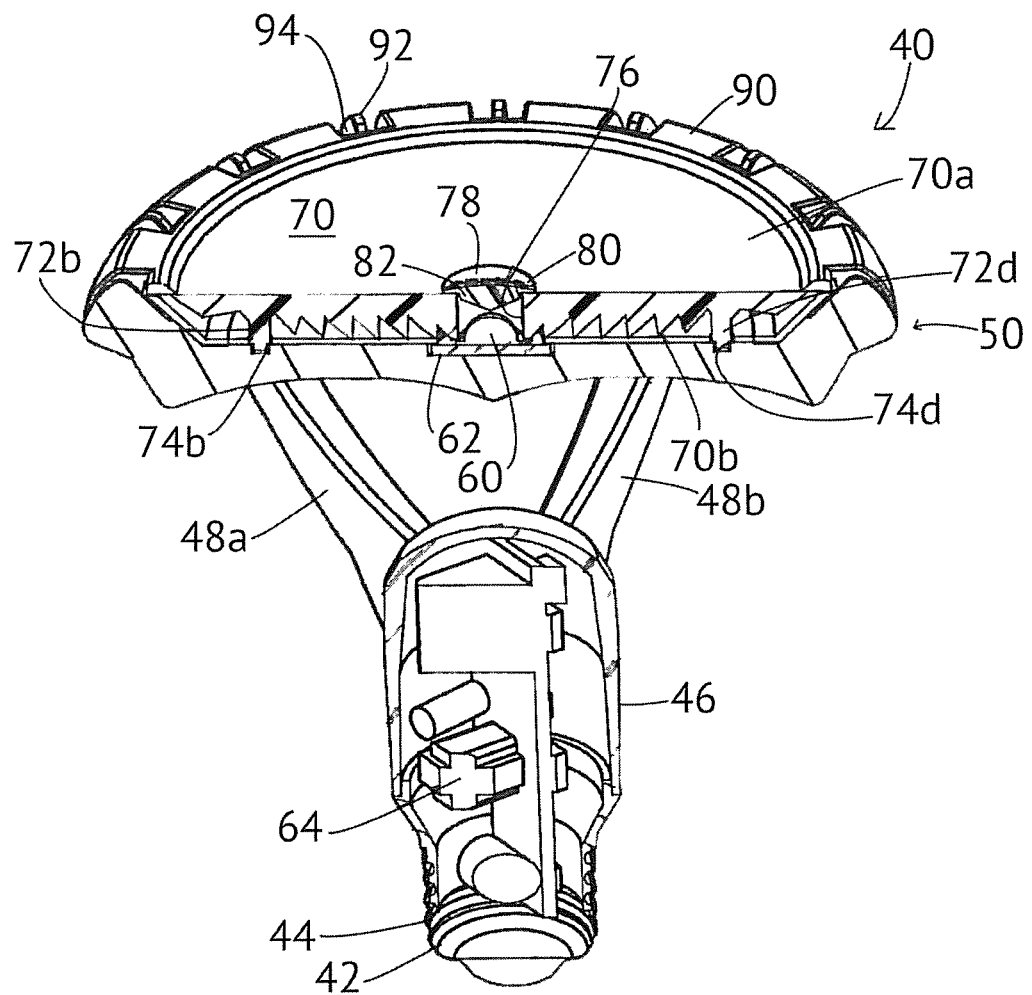
FIG. 8 is a sectional isometric view of the lamp of FIG. 1.

As seen in FIGS. 6 and 8, the light assembly 50 includes a base element in the form of a heat exchanger 52 having a central recess 54 defined by a base surface 56 and a tapered circumferential wall 58. The heat exchanger 52 is made of any suitable heat conductive material, such as aluminum, and includes a plurality of heat exchanger fins 59 (FIGS. 3-7) on a side thereof opposite the central recess 54. Further, if desired, the base surface 56 and/or the tapered circumferential wall 58 may be covered or coated by a reflective material, which may be a white material or a material that exhibits specular reflective characteristics. A light source 60 that may include one or more light emitting diodes (LEDs) (seen in FIG. 8) is mounted on a support member 62 comprising a heat conductive substrate, such as a metal circuit board, and extends beyond the base surface 56. The LED may be one or more white or other color LED's or may comprise multiple LEDs either mounted separately or together on a single substrate or package including a phosphor-coated LED either alone or in combination with at least one color LED, such as a green LED, a yellow or amber LED, a red LED, etc. In those cases where a soft white illumination is to be produced, the light source 60 typically includes one or more blue shifted yellow LEDs and one or more red LEDs. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, both as developed by Cree, Inc., the assignee of the present application. In any of the embodiments disclosed herein the LED(s) have a particular emission distribution, as necessary or desirable. For example, a side emitting LED disclosed in U.S. Pat. No. 8,541,795, the disclosure of which is incorporated by reference herein, may be utilized inside the waveguide body. More generally, any lambertian, symmetric, wide angle, preferential-sided, or asymmetric beam pattern LED(s) may be used as the light source. Still further, any of the LED arrangements and optical elements disclosed in co-pending U.S. patent application Ser. No. 14/101,147, entitled "Luminaires Using Waveguide Bodies and Optical Elements" by Bernd Keller et al., filed Dec. 9, 2013, incorporated by reference herein, may be used.

The light source 60 is operated by control circuitry 64 in the form of a driver circuit (seen in FIG. 8) disposed in the central body 46 that receives AC power via the Edison-style plug. The control circuitry 64 may be potted within the central body 46. Wires or conductors extend through one or more of the arms 48a-48d from the control circuitry 64 to the light source 60. In the illustrated embodiment, wires extend through the arm 48d into the light assembly 50. A cover 66 (FIG. 5) may be disposed in or over the arm 48d to provide a passage for the wires. The control circuitry 64 is designed to operate the light source 60 with AC or DC power in a desired fashion to produce light of a desired intensity and appearance. The heat exchanger 52 is preferably arranged to eliminate thermal crosstalk between the LEDs and the control circuitry. Preferably, the light source 60 develops light appropriate for general illumination purposes including light similar or identical to that provided by an incandescent, halogen, or other lamp that may be incorporated in a down light, a light that produces a wall washing effect, a task light, a troffer, or the like.

Figure 2:
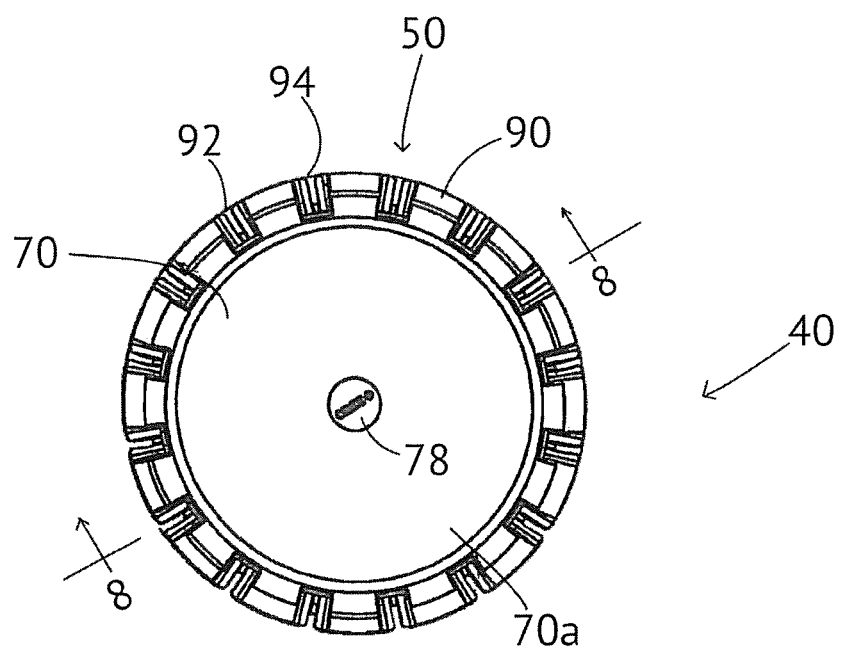
FIG. 2 is a first end elevational view of the lamp of FIG. 1.
Figure 3:
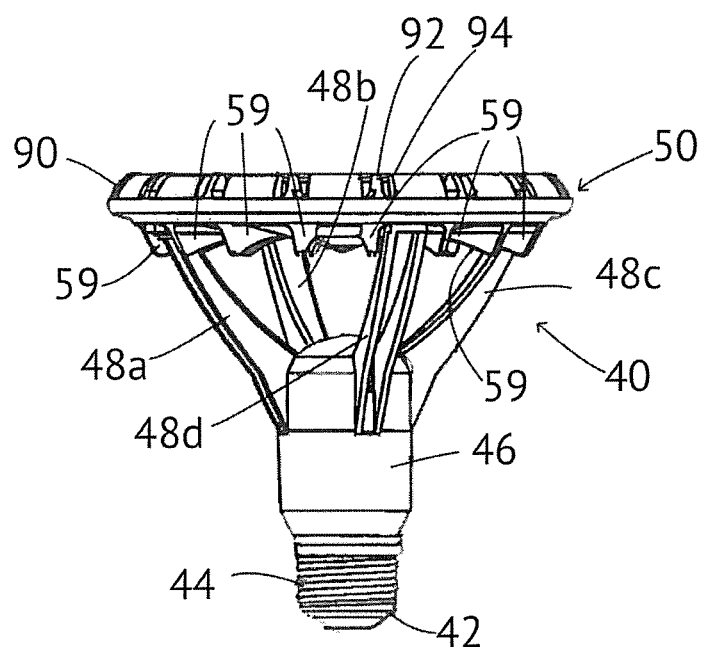
FIG. 3 is a side elevational view of the lamp of FIG. 1.
Figure 4:
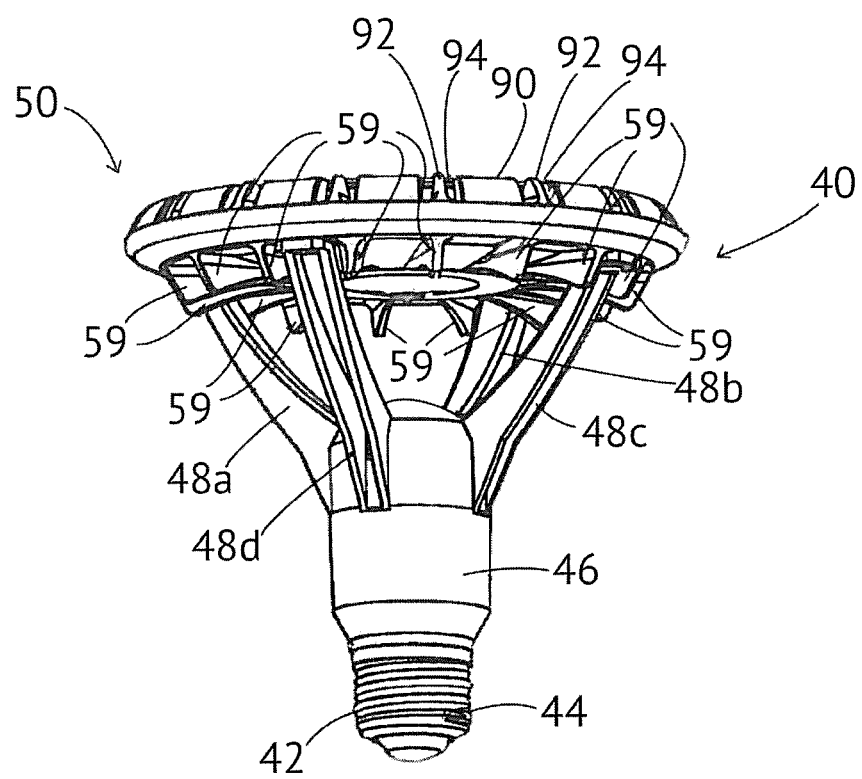
FIG. 4 is an isometric view of a second end of the lamp of FIG. 1.
Figure 5:
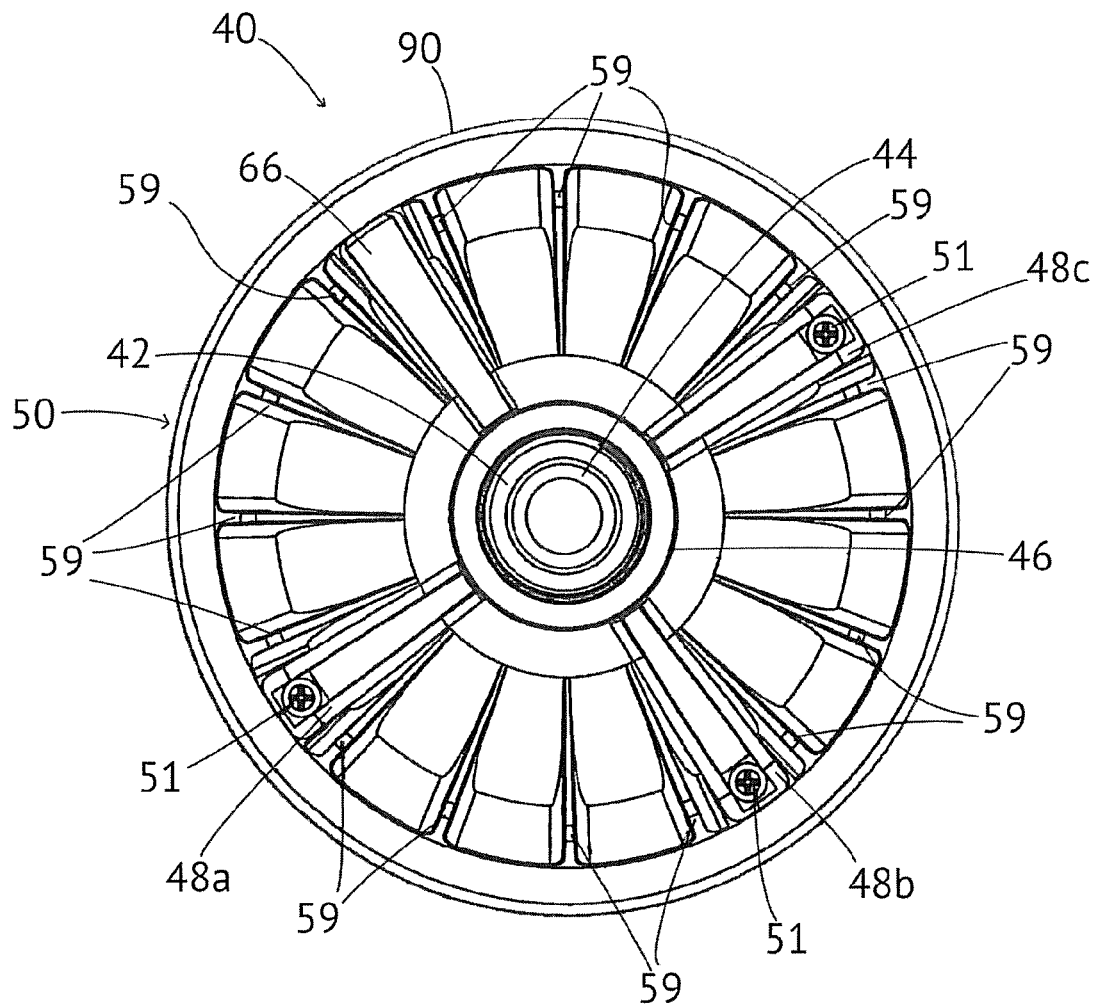
FIG. 5 is a second end elevational view of the lamp of FIG. 1.

A waveguide 70 has a main body of material 71 (FIG. 11) having a width substantially greater than an overall thickness thereof and is substantially or completely circular in a dimension transverse to the width and thickness (FIG. 2). The waveguide 70 is disposed in contact with the base surface 56 and the tapered circumferential wall 58 and is located by four location pins 72a-72d (FIG. 7) that are disposed in corresponding blind bores 74a-74d (only the bores 74b-74d are visible in FIGS. 6 and 8). In the illustrated embodiment, the waveguide 70 includes a first or outer side or surface 70a, a second opposite inner side or surface 70b, and an interior coupling cavity comprising a central bore 76 that in the illustrated embodiment extends fully through the waveguide 70 from the first side to the second side. If desired, the coupling cavity need not extend fully through the waveguide 70. Also in the illustrated embodiment, the walls defining the central bore 76 are normal to the first and second sides 71a, 71b of the waveguide 70 and the central bore 76 is coaxial with an outer surface of the main body of material 71. In all the embodiments disclosed herein, the central bore is preferably polished and optically smooth. Also preferably, the light source 60 extends into the central bore 76 from the second side thereof. Also in the illustrated embodiment, a light diverter of any suitable shape and design, such as a conical plug member 78 extends into the central bore 76 from the first side thereof. Referring specifically to FIGS. 7 and 8, in the illustrated embodiment, the conical plug member 78 includes a first portion in the form of a base flange 80 that is secured by any suitable means, such as an adhesive, to an outer surface of the waveguide 70 such that a second or conical portion 82 extends into the central bore 76. If desired, the base flange 80 may be omitted and the outer diameter of the plug member may be slightly greater than the diameter of the bore 76 whereupon the plug member 78 may be press fitted or friction fitted into the bore 76 and/or secured by adhesive or other means. Still further, if desired, the conical plug member 78 may be integral with the waveguide 70 (see FIG. 47) rather than being separate therefrom. Further, the light source 60 may be integral with the waveguide 70 or encased within the waveguide body 71, if desired. In the illustrated embodiment, the plug member 78 may be made of white polycarbonate or any other suitable material, such as acrylic, molded silicone, polytetrafluoroethylene (PTFE), Delrin® acetyl resin, or any suitable metal. The material may be coated with reflective silver or other metal or material using any suitable application methodology, such as a vapor deposition process. Thus, for example, the plug member 78 may be coated with silver, aluminum, or another metal in accordance with the teachings of co pending U.S. patent application Ser. No. 14/101,086, entitled "Optical Waveguides and Luminaires Incorporating Same" by Eric J. Tarsa et al., filed Dec. 9, 2013, incorporated by reference herein. The plug member 78 may be any other suitable shape, including a symmetric or asymmetric shape, a noncircular shape, etc., as desired. For example, the plug member may be non-conical and may have a substantially flat shape, a segmented shape, an inclined shape to direct light out a particular side of the lamp 40, etc. The coupling cavity may also (although it need not) have a noncircular shape or the shape may be circular where the first portion 80 is disposed and secured (in which case the first portion 80 is circular cylindrical) and the shape of the coupling cavity may be noncircular in other portions (i.e., at locations remote from the first portion 80). Specifically, the coupling cavity may be of any shape including, for example, those disclosed in co-pending U.S. patent application Ser. No. 14/101,086, entitled "Optical Waveguides and Luminaires Incorporating Same" by Eric J. Tarsa et al., filed Dec. 9, 2013, incorporated by reference herein to promote mixing of light developed by the light source 60.

The waveguide 70 may be secured in any suitable fashion and by any suitable means to the heat exchanger 52. In the illustrated embodiment, a ring member 90 is retained on surfaces of the heat exchanger 52 such that ribs 92 of the heat exchanger 52 are disposed in recesses 94 of the ring member 90. This securement is accomplished by the screws 51, which may extend into threaded bosses (not shown) carried on an inner surface of the ring member 90. In addition the ring member 90 bears against that outer surface of the waveguide 70 so that the waveguide 70 is secured in place.

Figure 11B:
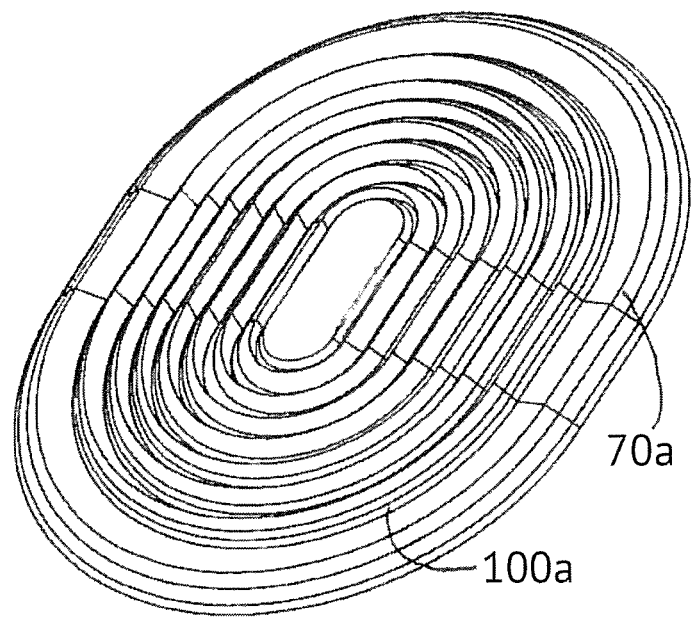
FIGS. 11B and 11C are isometric views of non-circular and asymmetric waveguides, respectively.
Figure 11:
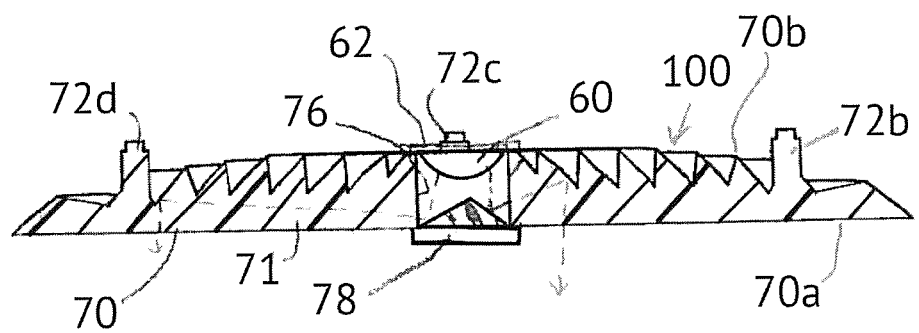
FIG. 11 is a cross sectional view of the waveguide of FIG. 1 taken generally along the lines 11-11 of FIG. 10.

In the illustrated embodiment the lamp 40 has a size and outer envelope equivalent to a PAR 38 lamp, and can be used in any luminaire that can accommodate same. It should be noted that the lamp 40 could be made larger or smaller to fit inside other luminaires and/or to satisfy particular lighting requirements. One example of a luminaire with which the lamp 40 could be used is a downlight mounted, for example, in a ceiling. In such a case, the plug 44 of the lamp 40 is screwed into an Edison-style socket in the luminaire such that the light source 60 points downwardly (i.e., the lamp 40 is oriented opposite to the orientation of FIG. 3 such that the plug 44 is above the waveguide 70.) FIG. 11 illustrates the waveguide 70 in such orientation with the light source 60 disposed above the plug member 78. When the light source 60 is energized, light developed by the source 60 travels within the bore 76 and reflects off the surface of the conical portion 82. Preferably, the conical portion 82 is made of or the surface is coated with a white or specular material that is highly reflective such that the great majority of light incident thereon (preferably, although not necessarily, greater than 95%) is reflected into the waveguide 70 in a generally transverse direction along the width of the body of material 71. Examples of such reflected light rays are shown in FIG. 11. Alternatively, the plug member 78 may be partially or fully transparent or translucent, as desired, to allow at least some light to be transmitted therethrough (for example, at least about 5% of the light may be transmitted through the plug member 78). In any event, the spacing, number, size and geometry of extraction features 100 determine the mixing and distribution of light in the waveguide 70 and light exiting the waveguide 70. In the illustrated embodiment, the extraction features 100 comprise a series of ridges separated by intervening troughs at least some of which define one or more inverted V-shapes. Also in the illustrated embodiment, the extraction features 100 are continuous (i.e., they extend fully in a continuous manner about the central bore 76), are coaxial with the central bore, and therefore symmetric about the central axis of the central bore 76. In addition to the foregoing, the waveguide 70 is tapered from the center of the waveguide to an outside edge in the sense that there is less material at the radially outside edges of the waveguide than at the center. Such tapering may be effectuated by providing extraction features that become deeper and/or are more widely separated with distance from the center of the waveguide, as noted in greater detail hereinafter. The tapering maximizes the possibility that substantially all the light introduced into the waveguide 70 is extracted over a single pass of the light through the waveguide. This results in substantially all of the light striking the radially outward surfaces of the extraction features 100, which are carefully controlled so that the extraction of light is also carefully controlled. The combination of tapering with the arrangement of extraction features and use of efficient coupling components including the plug member 78 disposed in the bore 76 with the light source 60 together result in improved color mixing with minimum waveguide thickness and excellent control over the emitted light.

In the illustrated embodiment, the light emitted out the waveguide 70 is mixed such that point sources of light in the source 60 are not visible to a significant extent and the emitted light is controlled and collimated to a high degree.

Figure 11A:
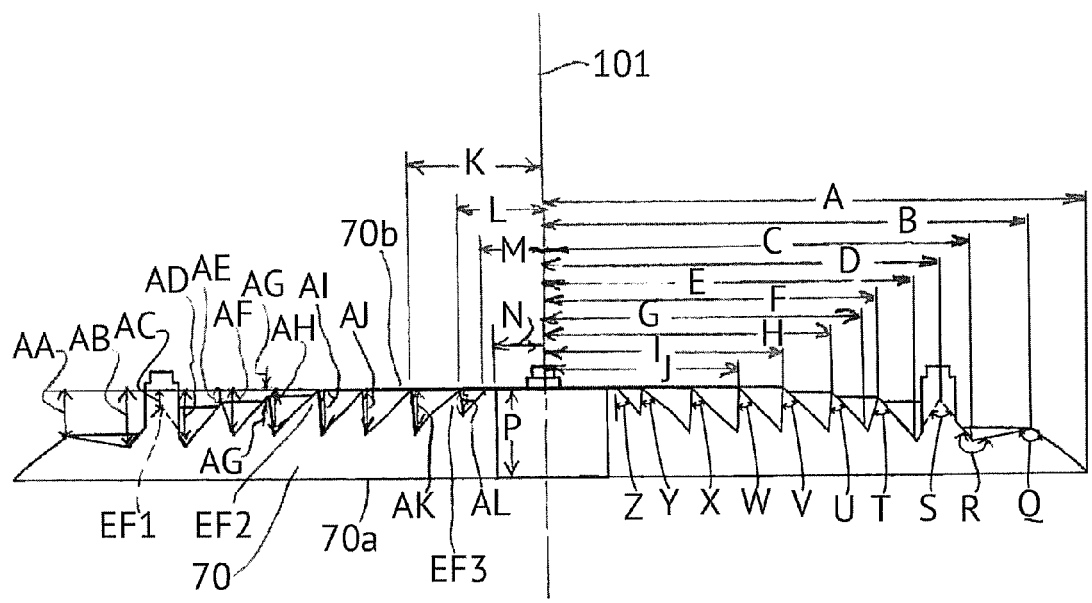
FIG. 11A is a view identical to FIG. 11 identifying sample dimensions of the waveguide of FIG. 1.

In the illustrated embodiment, the waveguide is made of any suitable optical grade material including one or more of acrylic, air, molded silicone, polycarbonate, glass, and/or cyclic olefin copolymers, and combinations thereof, particularly (although not necessarily) in a layered arrangement to achieve a desired effect and/or appearance. In one example, the waveguide has the dimensions noted in the following table and as seen in FIG. 11A. It should be noted that the dimensions in the following table as exemplary only and not limiting (several of the dimensions are taken with respect to a center line 101 (FIG. 11A) of the waveguide 70):

TABLE 1

| REFERENCE (FIG. 11A) | NOMINAL DIMENSION (Millimeters - unless otherwise specified) |
| --- | --- |
| A | 48.500 |
| B | 43.600 |
| C | 38.100 |
| D | 35.100 |
| E | 33.100 |
| F | 29.700 |
| G | 28.700 |
| H | 25.500 |
| I | 21.000 |
| J | 17.000 |
| K | 12.700 |
| L | 8.000 |
| M | 6.000 |
| N | 5.000 |
| P | 8.000 |
| Q | 132.8° |
| R | 241.7° |
| S | 70.7° |
| T | 58.8° |
| U | 51.5° |
| V | 50.6° |
| W | 46.4° |
| X | 47.1° |
| Y | 56.2° |
| Z | 42.3° |
| AA | 4.000 |
| AB | 5.000 |
| AC | 1.500 |
| AD | 5.000 |
| AE | 1.000 |
| AF | 4.000 |
| AG | 0.500 |
| AH | 4.000 |
| AI | 4.000 |
| AJ | 4.000 |
| AK | 4.000 |
| AL | 2.000 |

From the foregoing dimensions one can calculate extraction feature aspect ratios as follows:

$$\text{Aspect Ratio} = \text{Width of ridge}/\text{Greatest height extent of ridge} \quad (1)$$

Using the foregoing equation, one can calculate (at least approximately) aspect ratios AR1, AR2, and AR3 of various extraction features EF1, EF2, and EF3 denoted in FIG. 11A as follows:

$$AR1 = (C-E)/(AB-AC) = (38.1-33.1)/(5.0-1.5) = 5.0/3.5 = 1.43 \quad (2)$$

$$AR2 = (H-I)/AI = (25.5-21.0)/4.0 = 4.5/4.0 = 1.125 \quad (3)$$

$$AR3 = (K-L)/AK = (12.7-8.0)/4.0 = 4.7/4 = 1.175 \quad (4)$$

In the illustrated embodiment, the waveguide 70 may be designed to create a beam angle that preferably is between less than about 5 degrees to greater than 60 degrees, and more preferably is between about 5 degrees and about 50 degrees and most preferably between about 6 degrees and about 40 degrees. The beam peak can either be centered in the nadir (as in a PAR application) or off-center (as in an outdoor application). The beam angle and/or peak can be controlled through appropriate design of the waveguide 70. In the illustrated embodiment of FIG. 11A, the beam angle is about 12 degrees.

In any of the embodiment disclosed herein, the extraction features may be similar or identical to one another in shape, size, and/or pitch, or may be different from one another in any one or more of these parameters, as desired.

Figure 11C:
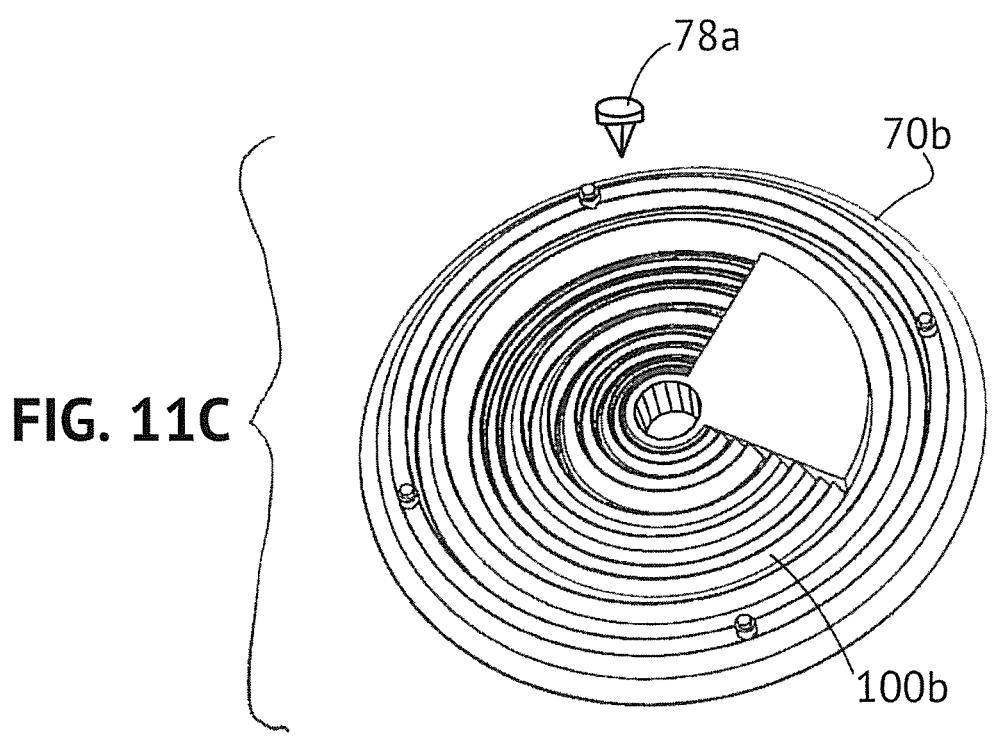
Figure 34:
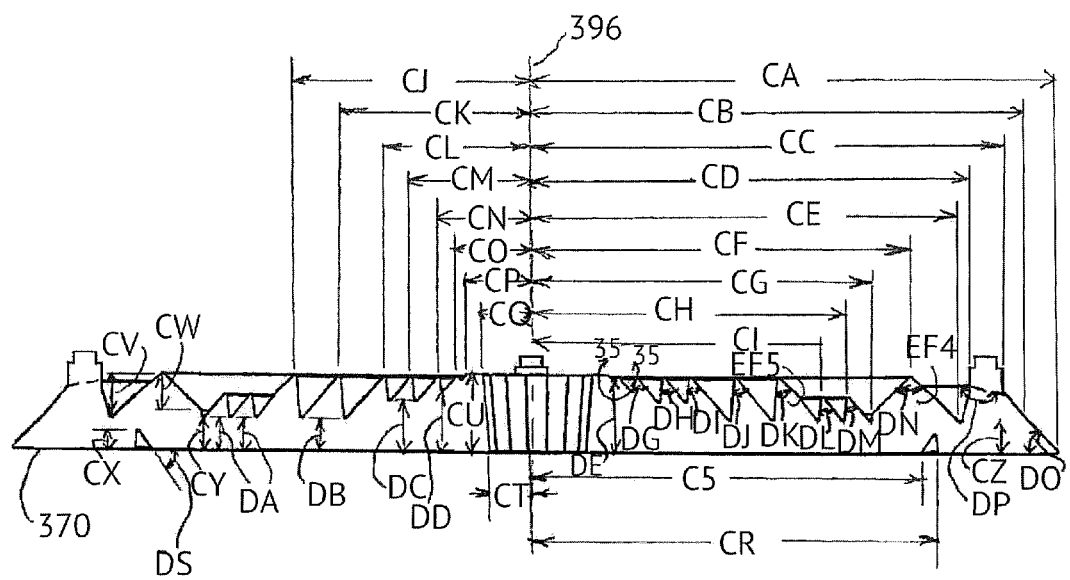
FIG. 34 is a sectional view identical to FIG. 31 identifying sample dimensions of the waveguide thereof.
Figure 35:
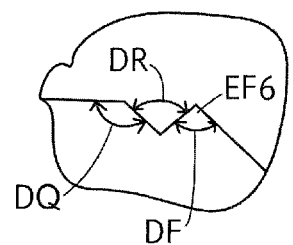
FIG. 35 is an enlarged fragmentary view of a portion of the waveguide of FIG. 34 seen generally at the lines 35-35 of FIG. 34.
Figure 36:
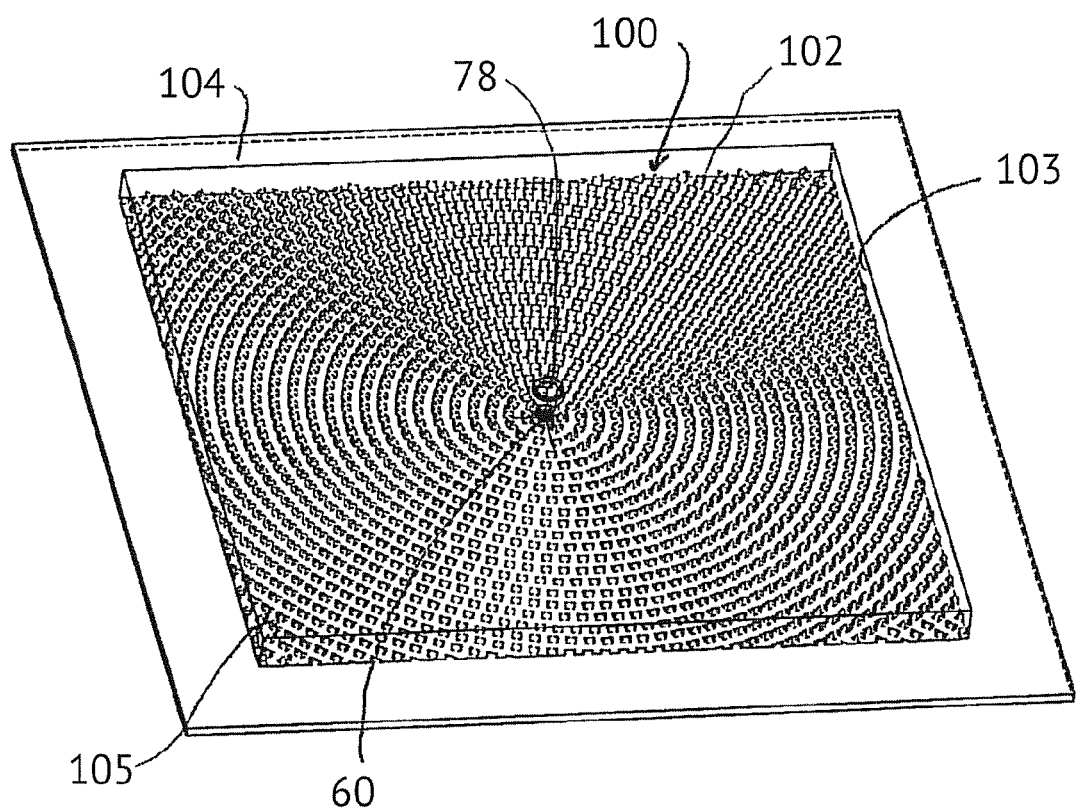
FIGS. 36-38 are isometric, plan and sectional views, respectively, of a further embodiment of an optical waveguide.
Figure 37:
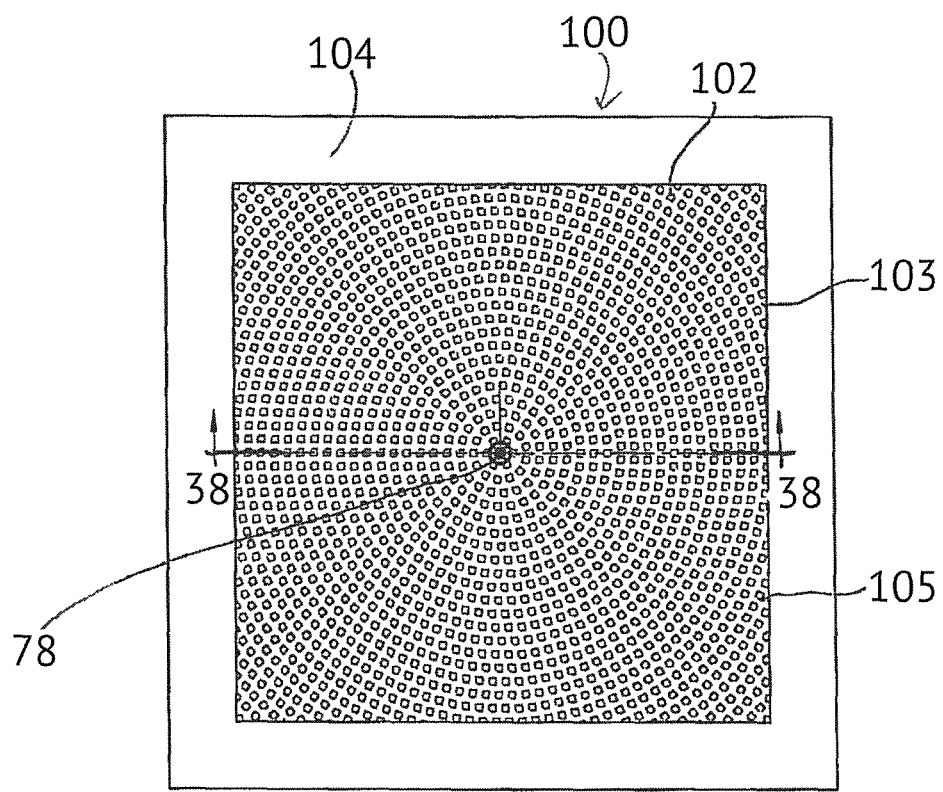
Figure 38:
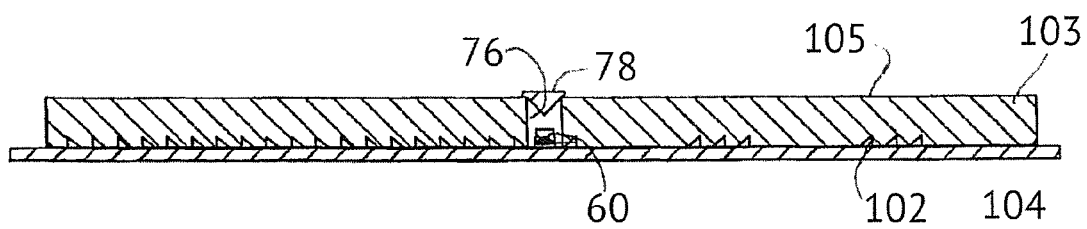

If desired, the extraction features 100 may be other than circular, asymmetric and/or discontinuous. FIG. 11B illustrates a racetrack-shaped waveguide 70a with racetrack-shaped extraction features 100a. FIG. 11C shows a circular waveguide 70b with asymmetric and discontinuous extraction features 100b. An asymmetric plug member 78a that may be used with the waveguide 70b is illustrated in FIG. 11C. Asymmetric extraction features may be used with or without an asymmetric plug member to obtain multiple beam distributions. For example, as seen in FIG. 11D, a first set of discrete extraction features 100b disposed in discrete boundaries 100b-1 through 100b-6 may direct light toward a first direction and at least a second set of extraction features 100c disposed in discrete boundaries 100c-1 through 100c-8 may direct light toward at least a second direction with each of the at least two directed beams having substantially identical or different beam widths and/or intensities. FIGS. 11E and 11F illustrate different extraction features that may accomplish this result. In a still further example seen in FIGS. 36-38, the extraction features 100 may comprise a plurality of discrete prisms 102 formed in a lower surface (as seen in FIGS. 33-39) of a waveguide main body 103 and arranged in concentric rings. As in the previous embodiment, the light source 60 and the plug member 78 extend into an internal cavity 76. The waveguide main body 103 is disposed on a substrate 104 that may have a reflective coating thereon and light developed by the light source 60 is diverted transversely into the main body 103 and is emitted out a surface 105 by the prisms 102. The prisms may be identical or not identical to one another. Preferably, the prisms face the internal cavity 76. The prisms 102 are much smaller in size than the extraction features 100 of previous and later embodiments and may be of the size(s) specified in co-pending U.S. patent application Ser. No. 14/101,086, entitled "Optical Waveguides and Luminaires Incorporating Same" by Eric J. Tarsa et al., filed Dec. 9, 2013, incorporated by reference herein. Still further, In all of the embodiments disclosed herein, one or more pluralities of light extraction features or elements 100 may be disposed in one or both upper and lower surfaces of the waveguide body 103. Each light extraction feature 100 may alternatively comprise a facet or other planar or non-planar feature (e.g., a wedge-shaped feature or a curved feature, such as a hemisphere) that is formed by any suitable process, such as embossing, cold rolling, or the like, as disclosed in co-pending U.S. patent application Ser. No. 14/101,086, entitled "Optical Waveguides and Luminaires Incorporating Same" by Eric J. Tarsa et al., filed Dec. 9, 2013, incorporated by reference herein or U.S. patent application Ser. No. 13/842,521 incorporated by reference herein. In any of the embodiments disclosed herein the extraction features 100 may be disposed in an array such that the extraction features 100 are disposed at a first density proximate the cavity and gradually increase in density or size with distance from the light source 60, as seen in U.S. patent application Ser. No. 13/842,521. Further in any of the embodiments disclosed herein, as seen in FIGS. 3A and 3B, the extraction features may be similar or identical to one another in shape, size, and/or pitch (i.e., spacing), or may be different from one another in any one or more of these parameters, as desired. The features 100 may comprise indents, depressions, or holes extending into the waveguide, or bumps or facets or steps that rise above the surface of the waveguide, or a combination of both bumps and depressions. Features of the same size may be used, with the density of features increasing with distance from the source, or the density of features may be constant, with the size of the feature increasing with distance from the source (as seen in FIG. 36). For example, where the density of the extraction features is constant with the spacing between features of about 500 microns, and each extraction feature comprises a hemisphere, the diameter of the hemisphere may be no greater than about 1 mm, more preferably no greater than about 750 microns, and most preferably no greater than about 100 microns. Where each extraction feature comprises a shape other than a hemisphere, preferably the greatest dimension (i.e., the overall dimension) of each feature does not exceed about 1 mm, and more preferably does not exceed about 750 microns, and most preferably does not exceed about 100 microns. Also, the waveguide body 71 may have a uniform or non-uniform thickness. Irrespective of whether the thickness of the waveguide body 71 is uniform or non-uniform, a ratio of extraction feature depth to waveguide body thickness is preferably between about 1:10,000 and about 1:2, with ratios between about 1:10,000 and about 1:10 being more preferred, and ratios between about 1:1000 and about 1:5 being most preferred.

Figure 39:
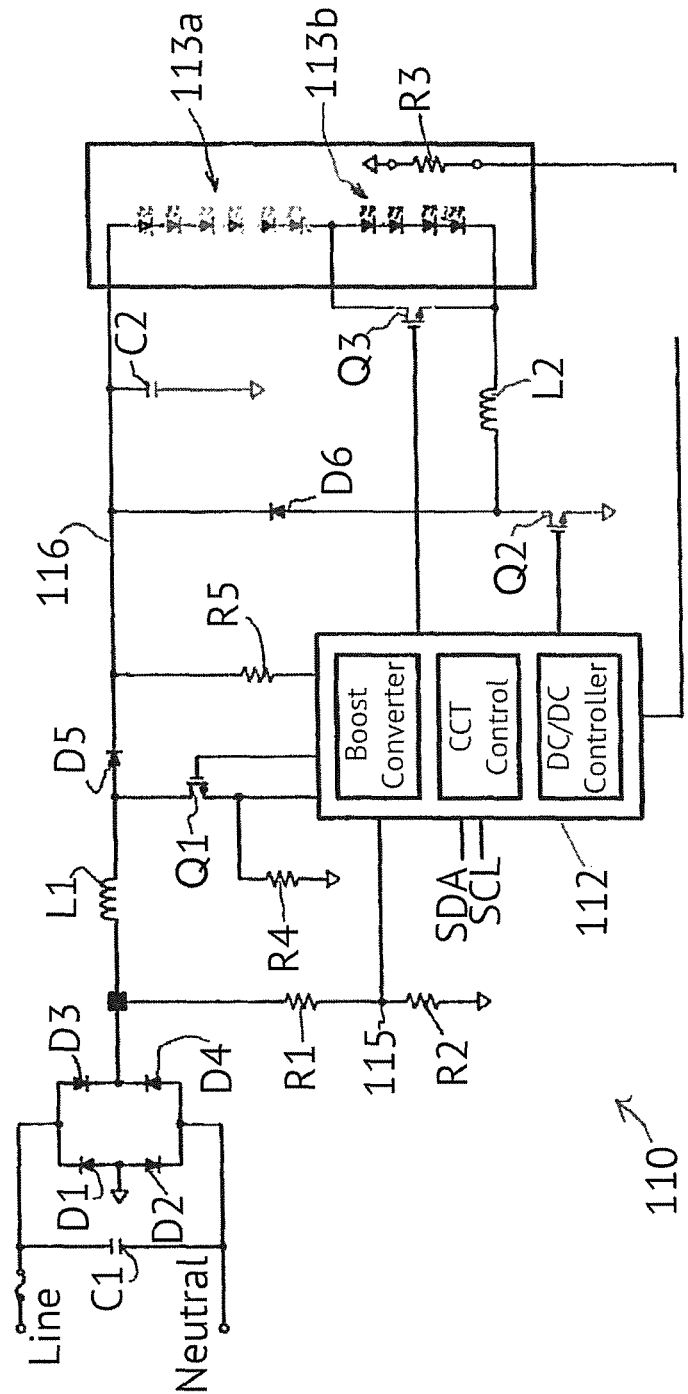
FIG. 39 is a schematic diagram of a driver circuit suitable for developing power for the LED(s) of FIGS. 1-8.

FIG. 39 is a schematic diagram of a driver circuit 110 suitable for developing power for the LED(s) and which may be used as the circuitry 64. The driver circuit 110 is an I$^2$C control that includes an integrated circuit IC 112. The IC 112 and other circuitry operate as a constant current source. The circuit 110 further includes a full-wave rectifier circuit including diodes D1-D4 coupled to a capacitor C1 and filter elements comprising inductors L1 and L2 and a capacitor C2. A diode D5 effectuates unidirectional charging of the capacitor C. The circuit 110 operates as a two-stage regulation circuit that is capable of operating two sets of LEDs 113a, 113b in a controllable dimming fashion in response to a dimming command signal SDA delivered to an input of the IC 112 by a dimmer (not shown). In the illustrated embodiment, each of the LEDs 113a is capable of developing white light, and each of the LEDs 113b is capable of producing temperature-compensated red light that adds warmth to the white light developed by the LEDs 113a. The two sets of LEDs 113a, 113b may be disposed on a single substrate or may be disposed on multiple substrates, as desired.

Two transistors Q1 and Q2 implement the two stage regulation circuit and are operated together with a third transistor Q3 to control the current through the LEDs 113. A diode D6 isolates the transistors Q1 and Q2 from one another. The IC 112 is also responsive to a signal SCL that is factory set and commands a specific maximum constant current magnitude for the LEDs 113. The IC 112 implements a soft-switching controllable boost and buck converter for dimming of the LED(s) 113 that produces low electromagnetic interference (EMI) and no 120 Hz. AC component in the DC power that is supplied to the LEDs 113.

The balance of the circuit 110 includes a voltage divider including resistors R1 and R2 wherein a junction between the resistors R1 and R2 is coupled to an input of the IC 112. A thermistor R3 is disposed in heat transfer relationship with the LEDs 113b and provides a thermal sensing signal that is fed back to an input of the IC 112 whereby the IC 112 regulates the power delivered to the LEDs 113b in dependence upon the sensed temperature to effectuate the temperature compensation of the LEDs 113b. In addition a resistor R4 pulls an input of the IC 112 down when the transistor Q1 is off and a resistor R5 couples a Power_In input of the IC 112 to a DC bus 116. In the illustrated embodiment, the driver circuit 110 is mounted on a single circuit board and is compatible with a wide range of dimmers.

Any other suitable driver circuit may be used as the circuitry 64.

Referring next to FIGS. 12-18, a second embodiment of a lamp 140 is shown. The lamp 140 is intended for use in luminaires that can accommodate PAR 30 bulbs. The lamp 140 includes a base 142 at which an Edison-style plug 144 is disposed. Extending away from the base 142 is a cap 145 (FIG. 18) and a central body 146. The cap 145 is secured in any suitable fashion to the central body 146, such as by ultrasonic welding. Four arms 148a-148d extend away from the central body 146. A light assembly 150 is disposed on ends of the arms 148a-148d and is secured thereto by any suitable means, such as four threaded fasteners 151a-151d that extend through associated bores in associated tabs 153a-153d carried by the central body 146 and into threaded bores (not seen in the FIGS.) of the light assembly 150.

As seen in FIG. 18, the light assembly 150 includes a base element in the form of a heat exchanger 152 having a central recess 154 defined by a base surface 156 and a tapered circumferential wall 158. The heat exchanger 152 is made of any suitable heat conductive material, such as aluminum, and includes a plurality of heat exchanger fins 159 on a side thereof opposite the central recess 154. Further, if desired, and as in the embodiment of FIGS. 1-8, the base surface 156 and/or the tapered circumferential wall 158 may be covered or coated by a reflective material, which may be a white material or a material that exhibits specular reflective characteristics. A light source comprising one or more light emitting diodes (LEDs) 160 that is identical or similar to the light source 60 seen in FIG. 8 is mounted on a support member (not seen, but which may be identical or similar to the member 62 described above comprising a heat conductive substrate, such as a metal circuit board), and extends beyond the base surface 156.

The light source 160 is operated by control circuitry (not shown, but which may be identical or similar to the circuitry 64 described above) disposed in the central body 146 that receives AC power via the Edison-style plug. As in the previous embodiment, the control circuitry may be potted in the central body 146. Wires or conductors extend through one or more of the arms 148a-148d from the control circuitry to the light source 160. As in the previous embodiment, preferably, the light source 160 develops light appropriate for general illumination purposes.

A waveguide 170 is disposed in contact with the base surface 156 and the tapered circumferential wall 158 and is located by four location pins 172 that are disposed in corresponding blind bores 174 (the pins and the bores are identical or similar to the pins 72 and bores of FIGS. 6 and 8). In the illustrated embodiment, the waveguide 170 is similar or identical to the waveguide 70 or any other waveguide disclosed herein, it being understood that the waveguide may alternatively be modified in accordance with the design details of the present invention. As in the previous embodiment, the light source 160 extends into a central bore 176 of the waveguide 170 from a second side thereof. Also in the illustrated embodiment, a conical plug member 178 is secured to the waveguide 170 by any suitable means, such as a press fit, friction fit, and/or adhesive, and extends into the central bore 176 from the first side thereof, as in the embodiment of FIGS. 1-8. Also as noted above, the conical plug member 178 may be integral with the waveguide 170 rather than being separate therefrom. (For example, see FIG. 47, which illustrates that the plug member may be disposed completely within the central bore.) Further, the light source 160 may be integral with the waveguide 170, if desired.

The waveguide 170 may be secured in any suitable fashion and by any suitable means to the heat exchanger 152. In the illustrated embodiment, a ring member 190 similar or identical to the ring member 90 is secured to surfaces of the heat exchanger 152 and is retained thereon such that ribs 192 of the heat exchanger 152 are disposed in recesses 194 of the ring member 190 (FIG. 18). In addition the ring member 190 bears against that outer surface of the waveguide 170 so that the waveguide 170 is secured in place.

As in the previous embodiment, the lamp 140 can be used for general illumination, such as in a downlight or other luminaire, and achieves the advantages noted with respect to the previous embodiment.

Figure 18A:
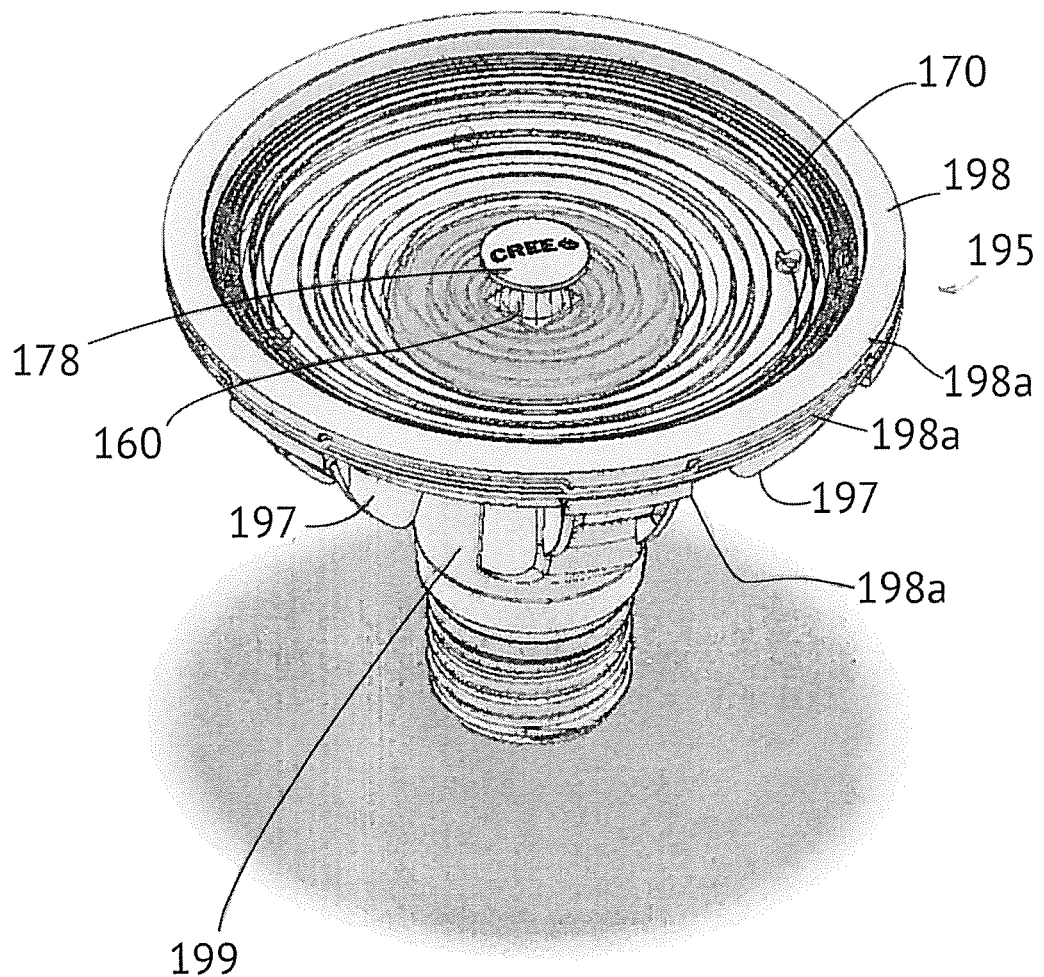
FIGS. 18A and 18B are isometric views of a further lamp.
Figure 18B:
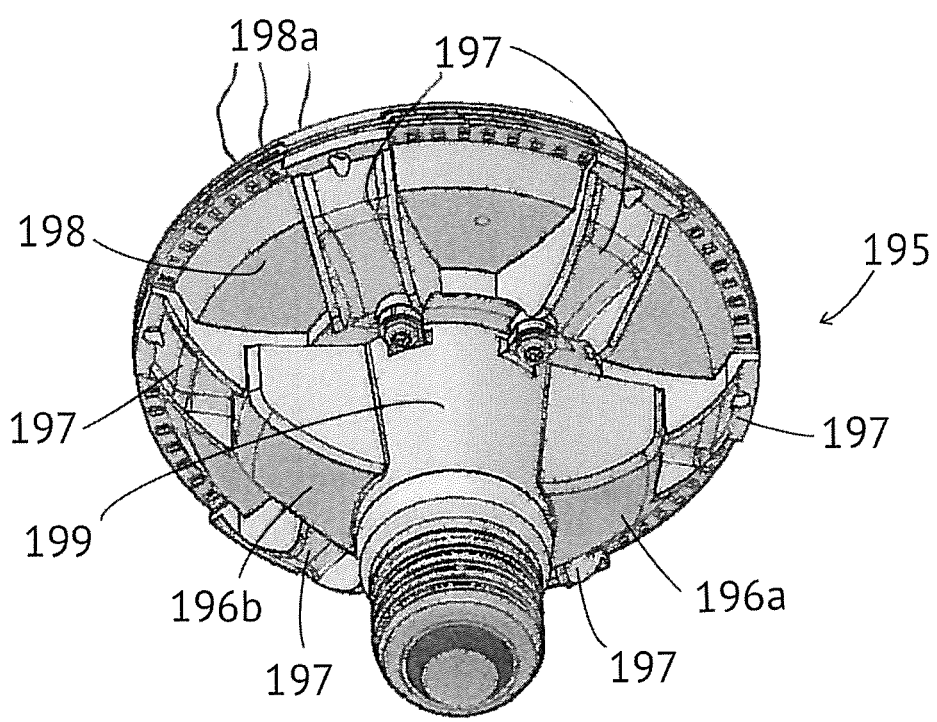

FIGS. 18A and 18B show yet another lamp 195 suitable for general illumination purposes. The lamp 195 may be of a size suitable for use as a PAR 30 lamp. The lamp 195 is substantially similar to the lamp 140 and includes two main arms 196a, 196b secured to a heat exchanger assembly including open fin structures 197 secured to a lower surface of a light assembly 198. The light assembly 198 includes the waveguide 170, or any other suitable waveguide, the light source 160, and the plug member 178 (or any other suitable light source and/or plug assembly). The light source 160 is mounted on a circuit board substrate that is intimately thermally coupled to the heat exchanger assembly by one or more rings 198a. Control circuitry (not shown) is disposed within a central body 199 and is connected to control the light source 160 by one or more wires that extend though one or both of the arms 196a, 196b. The open fin arrangement of the heat exchanger assembly and the intimate thermal coupling of the light source 160 to the heat exchanger assembly may allow improved thermal management such that the lamp 195 might be usable in enclosed installations.

FIGS. 18C-18G show a still further lamp 195a suitable for general illumination purposes. The lamp 195a may be of a size suitable for use as a PAR 30 lamp. The lamp 195a is substantially similar to the lamp 140 and includes three main arms 196c, 196d, 196e carried by a cup-shaped member 196f and secured to a heat exchanger assembly including open fin structures 197a secured to a lower surface of a light assembly 198a. The light assembly 198a includes the waveguide 170, or any other suitable waveguide, the light source 160, and the plug member 178 (or any other suitable light source and/or plug assembly). The light source 160 is mounted on a circuit board substrate that is intimately thermally coupled to the heat exchanger assembly by one or more rings 198b. Control circuitry (not shown) is disposed within a central body 199a and is connected to control the light source 160 by one or more wires that extend though one or more of the arms 196c-196e. The open fin arrangement of the heat exchanger assembly and the intimate thermal coupling of the light source 160 to the heat exchanger assembly may allow improved thermal management such that the lamp 195a might also be usable in enclosed installations.

Referring next to FIGS. 19-25, the waveguide can be modified to achieve other visual and/or optical characteristics. Specifically, the size, shape, other geometry, spacing, number, symmetry, and/or other physical characteristic(s) of the waveguide generally and/or the extraction features can be varied, as desired. Thus, FIG. 19 illustrates a waveguide 202 having an axial outer wall 203 and extraction features 204 comprising a plurality of ridges and troughs 205, 206. In this embodiment, the ridges 205 are unequally spaced, for example, the ridge 205a is spaced a first distance from an adjacent ridge 205b, the ridge 205b is spaced a second, different distance from an adjacent ridge 205c, and the ridge 205c is spaced a third distance from an adjacent ridge 205d.

Further, the depths of the troughs 206 are different. Specifically, a depth of a trough 206a is different than the depths of troughs 206b, 206c and 206d. The shapes of one or more of the ridges 205a, 205b, 205c, and 205d can be different than other ridges. Also, a tapered surface 207a may be disposed at a first angle and a tapered surface 207b may be disposed at a second angle different than the first angle with respect to the first side of the waveguide. Alternatively, the pitch or spacings between troughs 205, the depths of the troughs 206, the angles of tapered surfaces 207, and the widths and shapes of the troughs 206 and/or the ridges 205 may be the same or different, as desired (compare FIG. 19 to subsequent FIGS.).

Figure 19A:
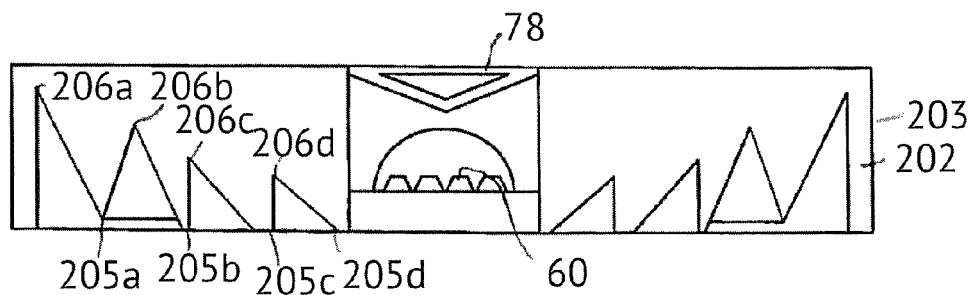

It should be also noted that less than all of the ridges 205 may be coterminous. Thus, for example, as seen in FIG. 19A, a ridge 205a may be disposed at a different elevation (i.e., distance from the first side of the waveguide) than remaining ridges 205b, 205c and/or 205d, which are coterminous.

FIG. 20 illustrates a waveguide 208 having an inclined outer surface 209 wherein the surface 209 linearly tapers from a second side or surface 210 to a first side or surface 211. Extraction features comprising a plurality of ridges 212 and troughs 213 are equally sized and spaced in a symmetric pattern about a central axis of the waveguide 208. FIG. 21 illustrates a waveguide 214 substantially or completely identical to the waveguide 208, with the exception that the outer surface 209 linearly tapers from the surface 211 to the surface 210. As should be evident from an inspection of FIGS. 20 and 21, the outer surface may be disposed at an acute angle with respect to one of the first and second sides of the waveguide and may be disposed at an obtuse angle with respect to another of the first and second sides.

FIG. 22 illustrates a waveguide 215 having a frustoconically-shaped first side including a first surface 217 that is tapered from a central bore 218 to the outer surface 216. The waveguide 215 includes equally spaced and equally sized ridges 219 and troughs 220 and an outer surface 216 that extends in an axial direction. A waveguide 222 shown in FIG. 23 is substantially or completely identical to the waveguide 215, with the exception that the waveguide 223 is substantially or completely inverted frustoconically shaped in that the first surface 223 is inversely linearly tapered from an outer surface 224 to a central bore 225 as compared to the embodiment of FIG. 22. Thus, the first side of the waveguide may be convex (as in FIG. 22) or concave (as in FIG. 23) at least in part.

Figure 24:
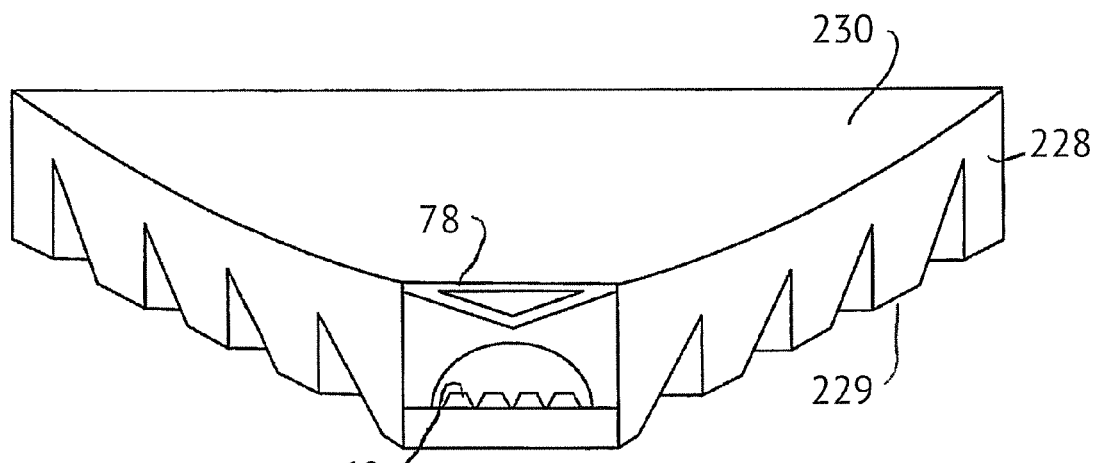

FIG. 24 illustrates a waveguide 228 having a concave first surface at least in part and which is identical or similar to FIG. 23, with the exception that first and second sides or surfaces 229, 230 are curved. In the illustrated embodiment, the sides or surfaces 229, 230 converge with radial distance from a centerline of the waveguide 228 resulting in a tapered waveguide, although these surfaces may alternatively diverge or be equally spaced over the radial dimension thereof.

Figure 25:
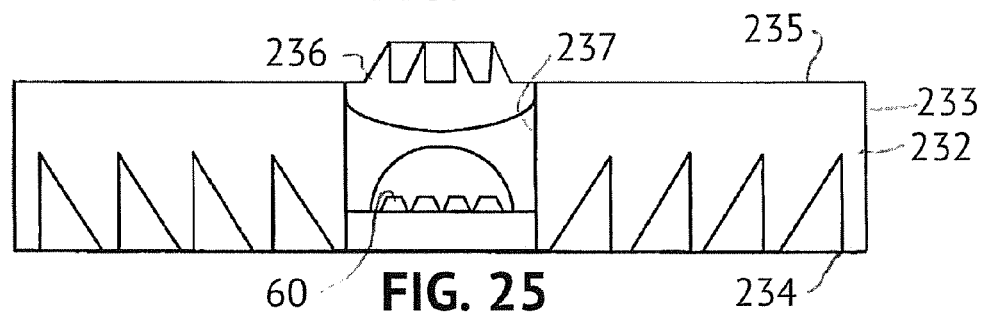

FIG. 25 illustrates a waveguide 232 having an axial outer surface 233, a first surface 234 and a second surface 235 that is generally parallel to the first surface 234. However, in the illustrated embodiment of FIG. 25, the plug member 78 is replaced by a total internal reflectance optical member 236 that is disposed within a central bore 237. The optical member 236 permits some light to pass from the light source 60 axially outwardly therethrough, and further reflects remaining light off of one or more surfaces of the optical member 236 into the waveguide in a transverse direction, as with the previous embodiments. While the embodiment of FIG. 25 may result in better efficiency, and may permit use of a smaller diameter waveguide, color mixing of light developed by the light source 60 may be adversely affected, and hence, the embodiment of FIG. 25 is preferably used with a single color light source 60 rather than one that attempts to duplicate a true-white appearance. Also, the embodiment of FIG. 25 may develop enough intensity to obtain a beam angle greater than or equal to 25° and may render the entire lamp simpler and cheaper. However, it may be that the intensity performance of the embodiment of FIG. 25 may be insufficient to permit development of an acceptable beam angle of less than 10°.

Figure 26:
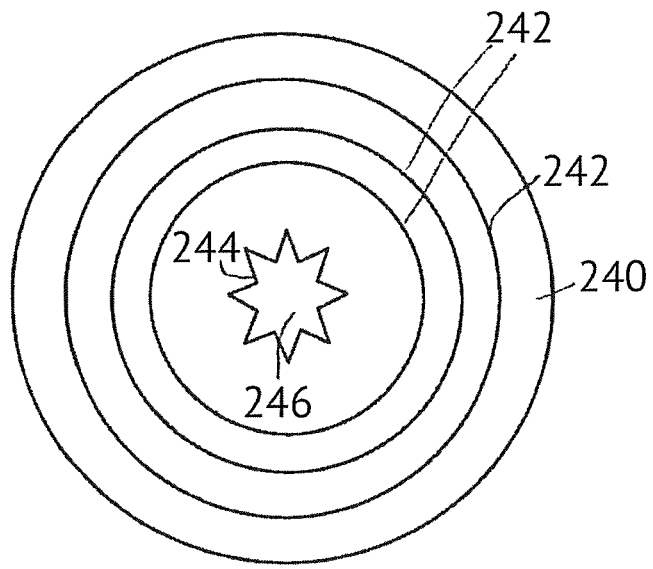
FIGS. 26-29 are elevational views of still further embodiments of waveguides according to the present invention.

Still further alternate configurations of the waveguide are illustrated in FIGS. 26-29. FIG. 26 shows a waveguide 240 having an overall circular configuration having a plurality of extraction elements 242 and a star-shaped central bore 244 that may be substituted for the circular cylindrical bore of the waveguide 70. A complementarily-shaped plug member 246, which may also have a star shape, may be inserted into and retained within the star-shaped central bore 244. The plug number 246 may have a star-shaped tapered (i.e., conical) member that reflects light generated by a light source 60, or may have a circular conical reflective surface, or any other shaped reflective surface, as desired.

Figure 27:
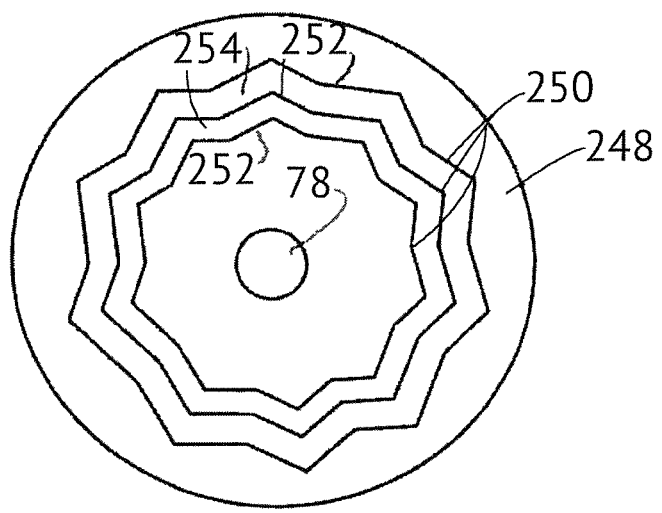

FIG. 27 illustrates an embodiment wherein a generally circular waveguide 248 includes a plurality of waveguide features 250 that surround a central axial bore 252 of circular cylindrical shape. The extraction features 250 may comprise a series of ridges 252 and troughs 254 wherein the ridges and troughs 252, 254 are approximately or substantially flower-shaped or comprise some other shape. The waveguide 248 may be used with the plug member 78, or another plug member as desired.

Figure 28:
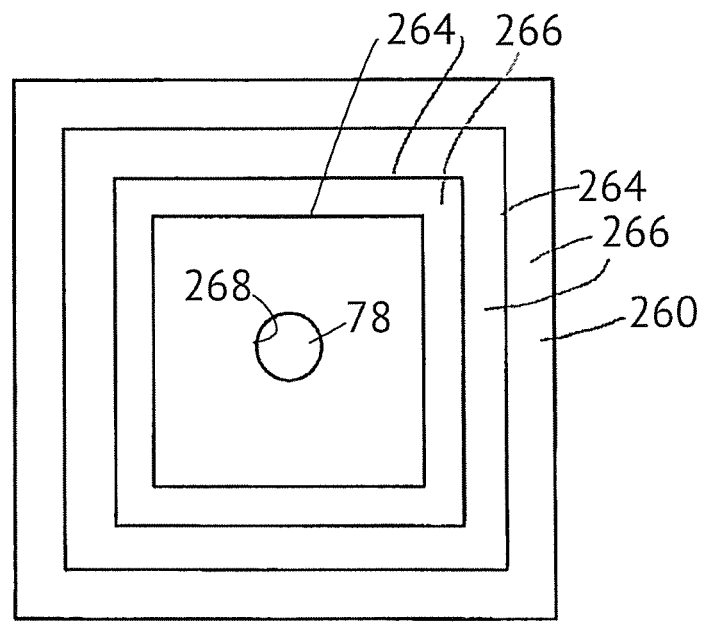
Figure 29:
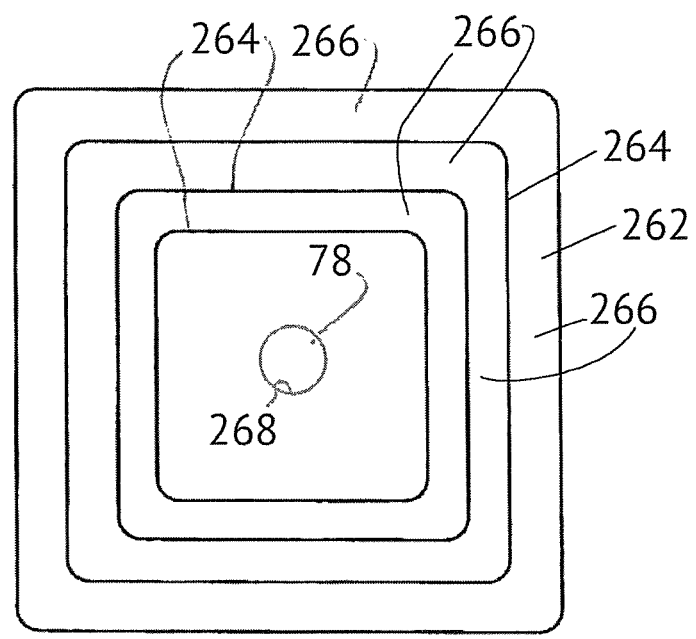

FIGS. 28 and 29 illustrate waveguides 260, 262, respectively, which are approximately or substantially rectangular or square. In the case of the waveguide 260 the extraction features 264 comprise ridges separated by intervening troughs 266 and the ridges and troughs are rectangular or square. Also in the illustrated embodiment of FIG. 28, corners between the sections of the ridges and troughs are sharp and the ridges and troughs surround a circular cylindrical central bore 268. The plug member 78 may be used with the embodiment of FIG. 28, if desired.

FIG. 29 illustrates an embodiment identical to FIG. 28, with the exception that the corners between adjacent sections of the ridges and troughs 264, 266 are rounded. Again, a circular cylindrical central bore may be provided and the plug number 78 may be used with the embodiment of FIG. 29.

Figure 30:
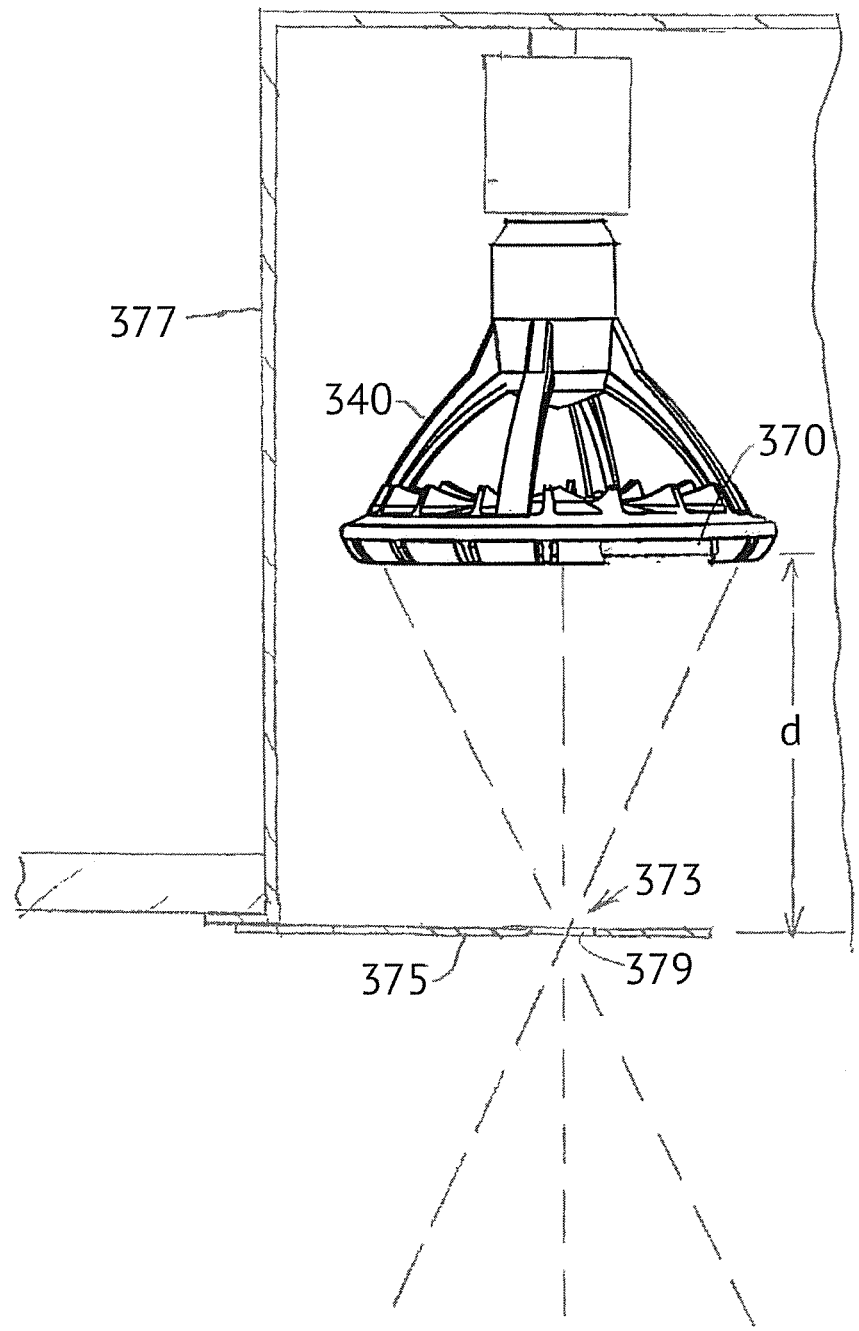
FIG. 30 is a side elevational view, partly in section, of yet another embodiment of a luminaire including a waveguide according to the present invention.
Figure 31:
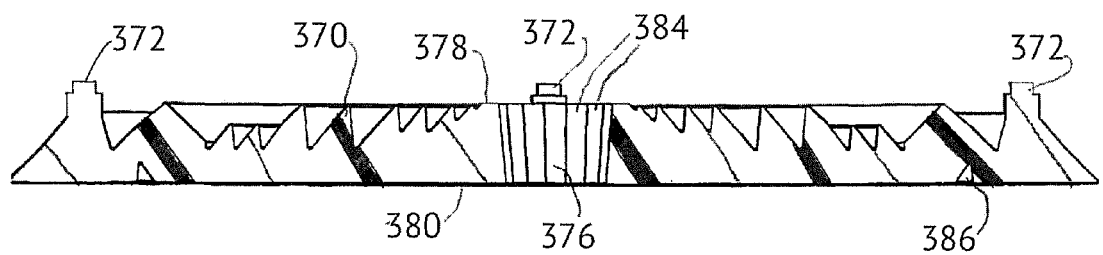
FIG. 31 is a view identical to FIG. 11 of a further waveguide according to the present invention.

It should be noted that, in an alternative embodiment, the waveguide can be designed to provide a beam angle that has a minimum transverse spread at a particular distance from the waveguide and larger transverse spreads at lesser and greater distances from the waveguide. More particularly, referring to FIG. 30, a lamp 340 identical to the lamp 40 and having a waveguide 370, which may be similar or identical to any of the waveguides described hereinabove in terms of material composition and overall geometry, may be designed to include extraction features that are preferably, although not necessarily, symmetric about a central axis of the waveguide. The extraction features may be different than the extraction features described above such that light rays emitted at radially outward portions of the waveguide 370 are directed axially inwardly and downwardly (as seen in FIG. 30), with the magnitude of the angle of inward direction being roughly or substantially proportional to the radial distance of emission of the light ray from the center of the waveguide 370. The resulting beam shape is such that a convergence region 373 is formed at a distance d from the outer surface of the waveguide. Light rays diverge at distances greater than d from the waveguide 370. This beam shape permits a trim ring 375 of an associated luminaire 377 to have a relatively small diameter aperture 379 but still have a significantly large illumination area beyond the distance d. The result is a reduction in visible glare because of the shielding effect provided by the trim ring 375 and a pleasing aesthetic appearance. In general, the size of the aperture 379 is preferably equal to or smaller than the size of the waveguide of the lamp 340, and, more preferably, the cross sectional size of the aperture 379 relative to the cross sectional size of the waveguide is between about 1:2 to about 1:4. The design of a waveguide that effectuates the foregoing is within the abilities of one of ordinary skill in the art given the disclosure herein.

FIGS. 31-35 illustrate yet another embodiment of a waveguide 370 in accordance with the present invention. The waveguide 370 may be used in place of any of the waveguides disclosed herein, such as the waveguide 170. The waveguide 370 includes four location pins 372 that are identical to the pins 72. In the illustrated embodiment, the light source 60 extends into a central bore 376 of the waveguide 370 from a second side 378 thereof. Also in the illustrated embodiment, a conical plug member (such as the plug member 78) is secured to the waveguide 370 by any suitable means, such as adhesive, and extends into the central bore 376 from a first side 380 thereof, as in the embodiment of FIGS. 1-8. Also as noted above, the conical plug member 78 may be integral with the waveguide 370 rather than being separate therefrom. Further, the light source 60 may be integral with the waveguide 370, if desired.

Figure 32:
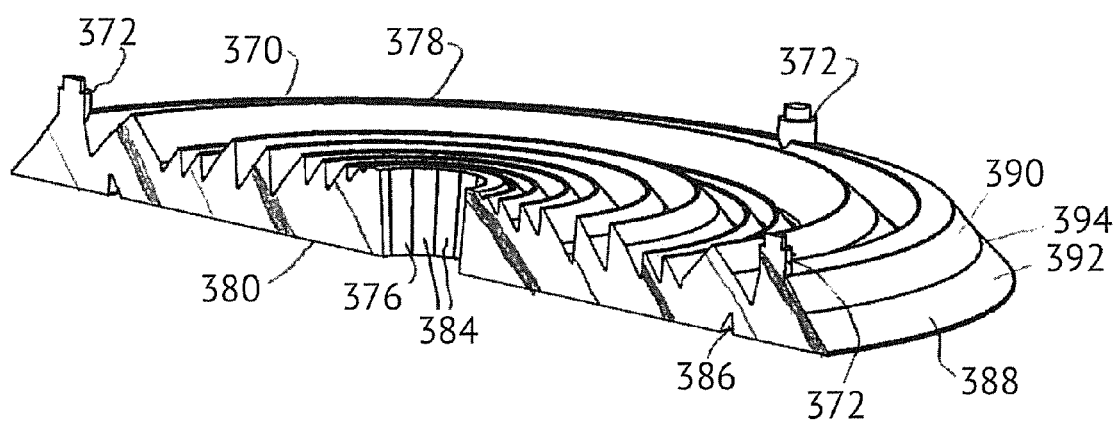
FIG. 32 is a sectional and first side isometric view of the waveguide of FIG. 31.
Figure 33:
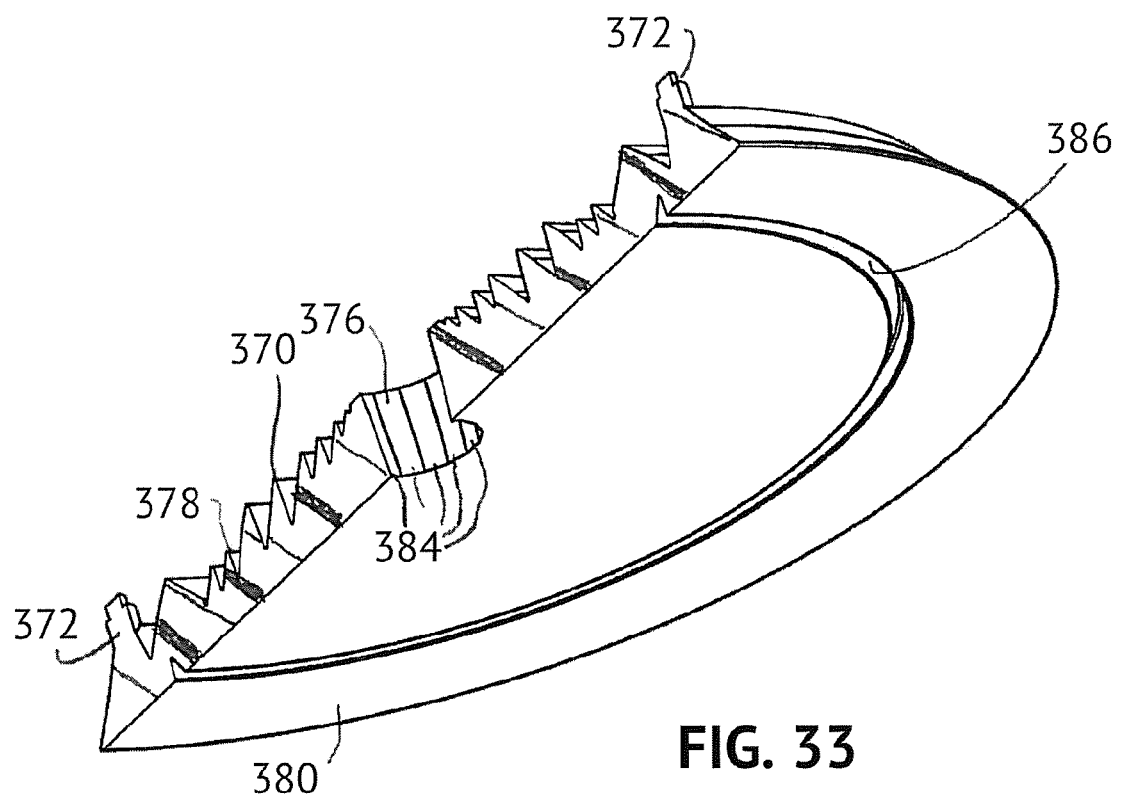
FIG. 33 is a sectional and second side isometric view of the waveguide of FIG. 31.

Also in the illustrated embodiment, the central bore 376 is not cylindrical, but instead comprises a tapered bore defined by twelve equally-sized facets 384. In the illustrated embodiment in which the waveguide 370 is made of an acrylic, the taper may be at an angle between about zero degrees and about 8 degrees. In other embodiments in which the waveguide is made of another material, such as polycarbonate or glass, the taper angle maximum may be other than 8 degrees without significantly adversely affecting efficiency. An extraction feature in the form of a groove 386 extends into the waveguide 370 from the first side 380. An outer tapered portion 388 includes first and second sections 390, 392 that meet at a junction 394 (FIG. 32). As in the previous embodiments, the waveguide 370 is made of optical grade acrylic and/or silicone and, in one example, has the dimensions noted in the following table and as seen in FIG. 34. It should be noted that the dimensions in the following table as exemplary only and not limiting (the dimension CB is the distance of the junction 394 from the center line 396 (FIG. 34) of the waveguide 370):

TABLE 2

| REFERENCE (FIG. 34) | NOMINAL DIMENSION (Millimeters - unless otherwise specified) |
|---|---|
| CA | 47.431 |
| CB | 44.789 |
| CC | 42.500 |
| CD | 39.500 |
| CE | 38.763 |
| CF | 34.105 |
| CG | 30.547 |
| CH | 28.475 |
| CI | 26.155 |
| CJ | 22.171 |
| CK | 18.203 |
| CL | 14.042 |
| CM | 11.658 |
| CN | 9.032 |
| CO | 7.348 |
| CP | 6.5000 |

TABLE 2-continued

| REFERENCE (FIG. 34) | NOMINAL DIMENSION (Millimeters - unless otherwise specified) |
|---|---|
| CQ | 5.000 |
| CR | 36.648 |
| CS | 34.922 |
| CT | 4.388 |
| CU | 7.000 |
| CV | 4.018 |
| CW | 3.365 |
| CX | 1.707 |
| CY | 2.926 |
| CZ | 3.000 |
| DA | 2.926 |
| DB | 2.926 |
| DC | 4.582 |
| DD | 5.525 |
| DE | 6.500 |
| DF | 47.4° |
| DG | 45° |
| DH | 45° |
| DI | 47.3° |
| DJ | 45.7° |
| DK | 51.3° |
| DL | 43.9° |
| DM | 45.6° |
| DN | 95° |
| DO | 45° |
| DP | 55.8° |
| DQ | 134.1° |
| DR | 49° |
| DS | 55° |

From the foregoing dimensions one can calculate extraction feature aspect ratios AR4, AR5, and AR6 at least approximately using the same equation (1) above for extraction features EF4, EF5, and EF6 in FIGS. 34 and 35 as follows:

$$AR4 = (CE-CG)/(CU-CY) = (38.763-30.547)/(7.000-2.926) = 8.216/4.074 = 2.02 \tag{5}$$

$$AR5 = (CI-CJ)/(CU-DB) = (26.155-22.171)/(7.000-2.926) = 3.984/4.074 = 0.98 \tag{6}$$

$$AR6 = (CN-CP)/(CU-DE) = (9.032-6.500)/(7.000-6.500) = 2.532/0.500 = 5.064 \tag{7}$$

As seen in the FIGS. and as calculated above in the equations (2)-(7), the extraction features EF1-EF6 range between aspect ratios of about 0.98 to about 5.064. Preferably, although not necessarily, the present invention contemplates the use of extraction features having aspect ratios that vary between about 0.25 and about 20, and more preferably between about 0.5 and about 10, and most preferably between about 0.75 and about 7.5.

An inspection of tables 1 and 2 above also indicates that, overall, the waveguides include extraction features that are deeper with distance from the center line of the waveguide. Thus, for example, as seen in FIG. 11A, the extraction feature dimension AI is less than the dimensions AK-AF, and the latter dimensions are less than the dimensions AE and AB. The same holds true for the extraction features of FIG. 34. In the illustrated embodiments, the depth of the extraction features varies between a minimum in FIG. 34 of 0.5 mm to a maximum in FIG. 11A of 5 mm. Extraction feature depths are preferably expressed as a percentage of overall thickness because, in general, the maximum depth of the extraction features is only limited by the structural integrity of the remaining material. Each extraction feature preferably has a depth between about 5% to about 75% of the overall thickness of the waveguide 70 (the overall thickness is the top to bottom dimension as seen in FIGS. 11A and 34 at the wall defining the central bore) and, more preferably, a depth between about 7% and 67% of the overall thickness of the waveguide. Greater extraction feature depths might be achievable using stronger material(s) for the waveguide.

Still further, the spacings (i.e., pitch) between adjacent extraction features overall increases with distance from the center line (although not necessarily in every circumstance between adjacent extraction features having small or approximately equal aspect ratios). For example, the distances between ridges of the extraction features of FIGS. 11A and 34 are as follows:

TABLE 3

| REFERENCE (FIG. 11A) | NOMINAL DIMENSION (Millimeters) |
|---|---|
| L-M | 2.000 |
| K-L | 4.700 |
| J-K | 4.300 |
| I-J | 4.000 |
| H-I | 4.500 |
| F-H | 4.200 |
| D-F | 5.400 |
| B-D | 8.500 |

TABLE 4

| REFERENCE (FIG. 34) | NOMINAL DIMENSION (Millimeters) |
|---|---|
| CO-CP | 0.848 |
| CN-CO | 1.684 |
| CM-CN | 2.626 |
| CL-CM | 2.384 |
| CK-CL | 4.161 |
| CJ-CK | 3.968 |
| CI-CJ | 3.984 |
| CH-CI | 2.320 |
| CF-CH | 5.630 |
| CD-CF | 5.395 |

The spacing between adjacent extraction features may be as small as about 0.7 mm (or less) near the center line of the waveguide and may be 9 mm (or more) at the outer edges of the waveguide.

Figure 9:
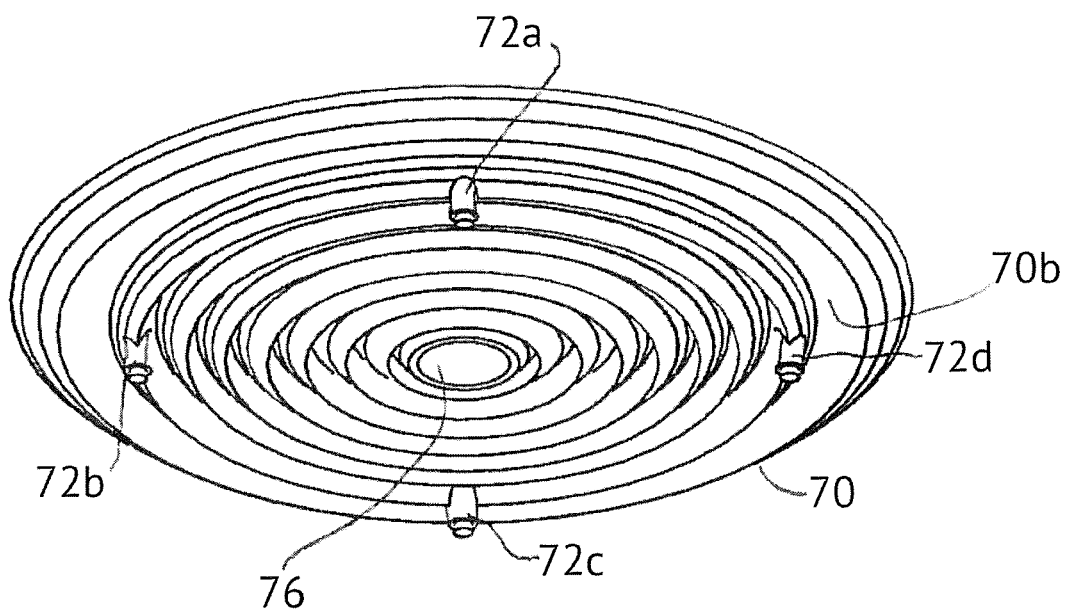
FIG. 9 is an interior isometric view of the waveguide of FIG. 1.
Figure 10:
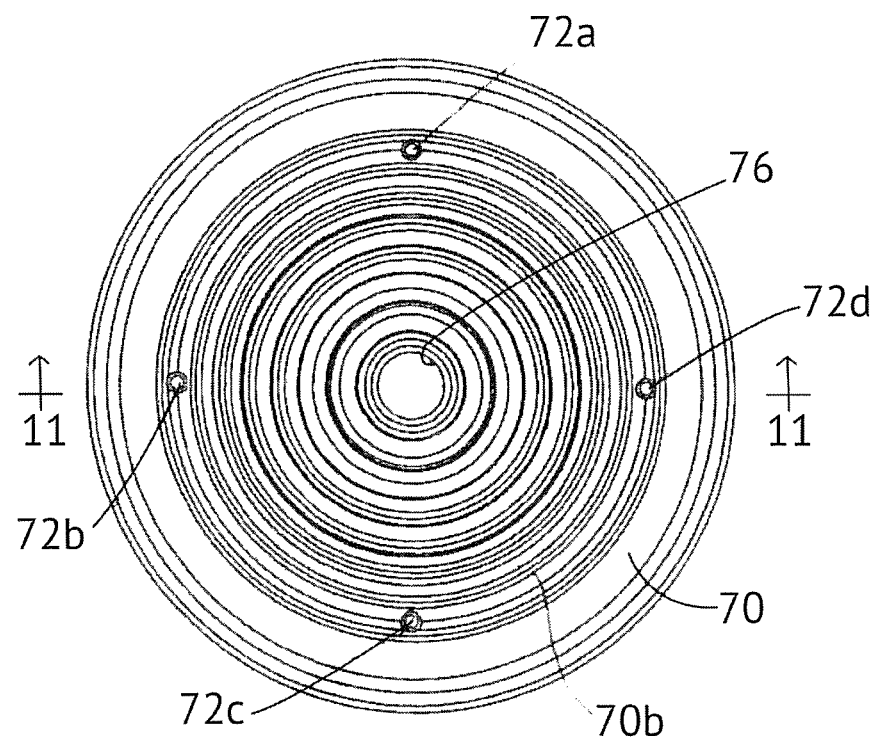
FIG. 10 is an interior elevational view of the waveguide of FIG. 1.

As in the embodiment of the waveguide shown in FIGS. 9-11, the waveguide 370 of FIG. 34 tapers from the center thereof to the edges in the sense that less material is disposed at the edges of the waveguide 70 than at the center. This fact, in combination with the particular design of the extraction features and the efficient coupling of light into the waveguide result in the improved color mixing, minimized thickness, and excellent control advantages noted above.

Figure 40:
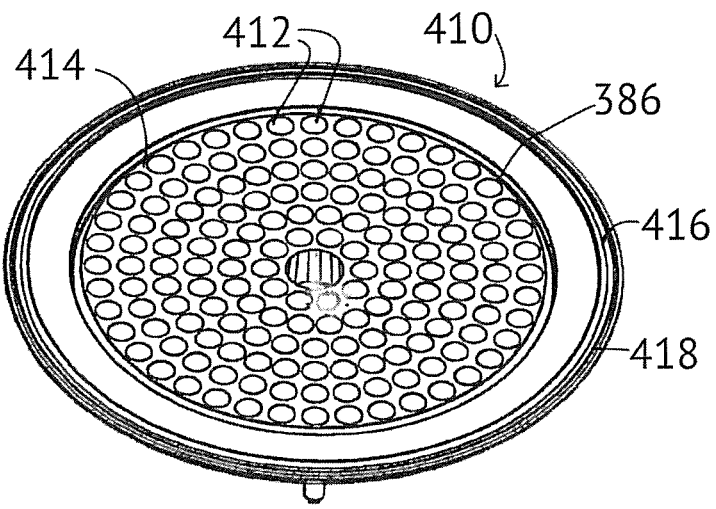
FIGS. 40-42 are isometric, plan, and fragmentary sectional views, respectively, of yet another optical waveguide.
Figure 41:
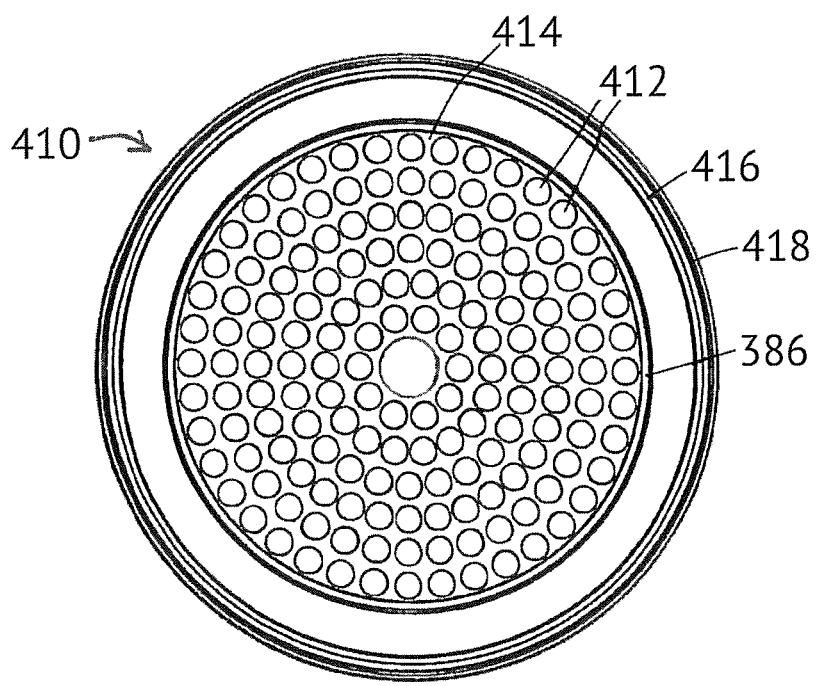
Figure 42:
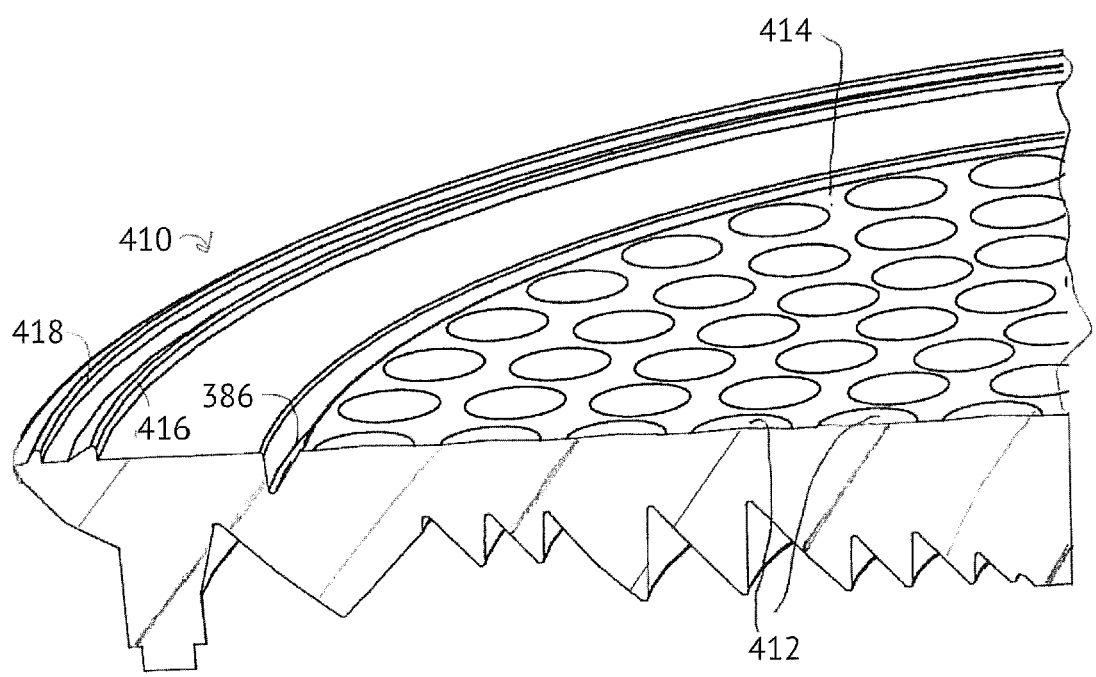

Referring next to FIGS. 40-42, a waveguide 410 is identical to the waveguide 370 with the following exceptions. Multiple lenslets 412 are arrayed across a surface 414. The lenslets 412 are identical in size and shape and are substantially equally spaced across the surface 414 inside the extraction feature 386, although this not need to be the case. Specifically, the lenslets could be unequally sized and/or spaced and/or shaped. In the illustrated embodiment, the lenslets 412 are circular in shape (although other shapes could be used, such as a polygonal shape) and convex (as seen in FIG. 41). Some or all of the lenslets 412 may be concave, if desired. In the preferred embodiment, each lenslet has a preferred range of aspect ratio of diameter to height of at least about 5:1 to about 60:1. In the illustrated embodiment, each lenslet is 0.1 mm in height and 4 mm in diameter and has a smooth exterior surface. In addition, two additional extraction features 416, 418 are provided radially outside the extraction feature 386.

In the illustrated embodiment, the extraction features 416, 418 extend fully and continuously about the waveguide 410 and comprise upstanding annular ribs having smooth outer surfaces. The lenslets 412 and the extraction features 416, 418 contribute to desirable mixing of light and control over the emitted light while not contributing substantially to waveguide thickness.

Figure 43:
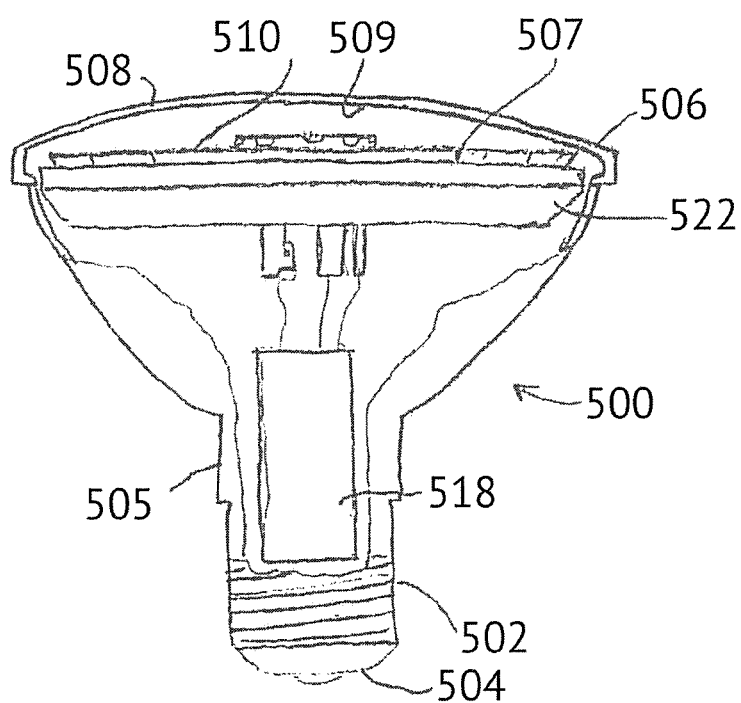
FIG. 43 is a side elevational view with portions broken away of a lamp incorporating a waveguide.
Figure 44A:
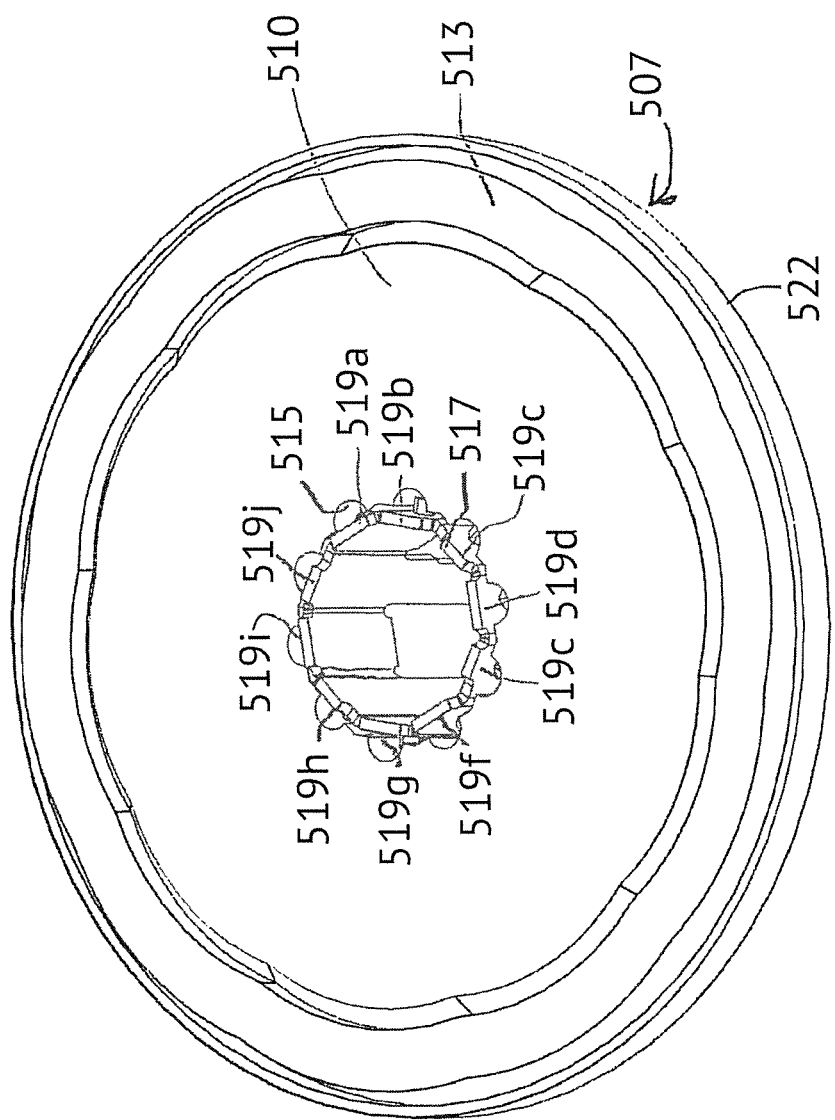
FIGS. 44A-44D are a top isometric view, a bottom isometric view, a side elevational view, and a plan view, respectively, of the light assembly of FIG. 43.
Figure 44B:
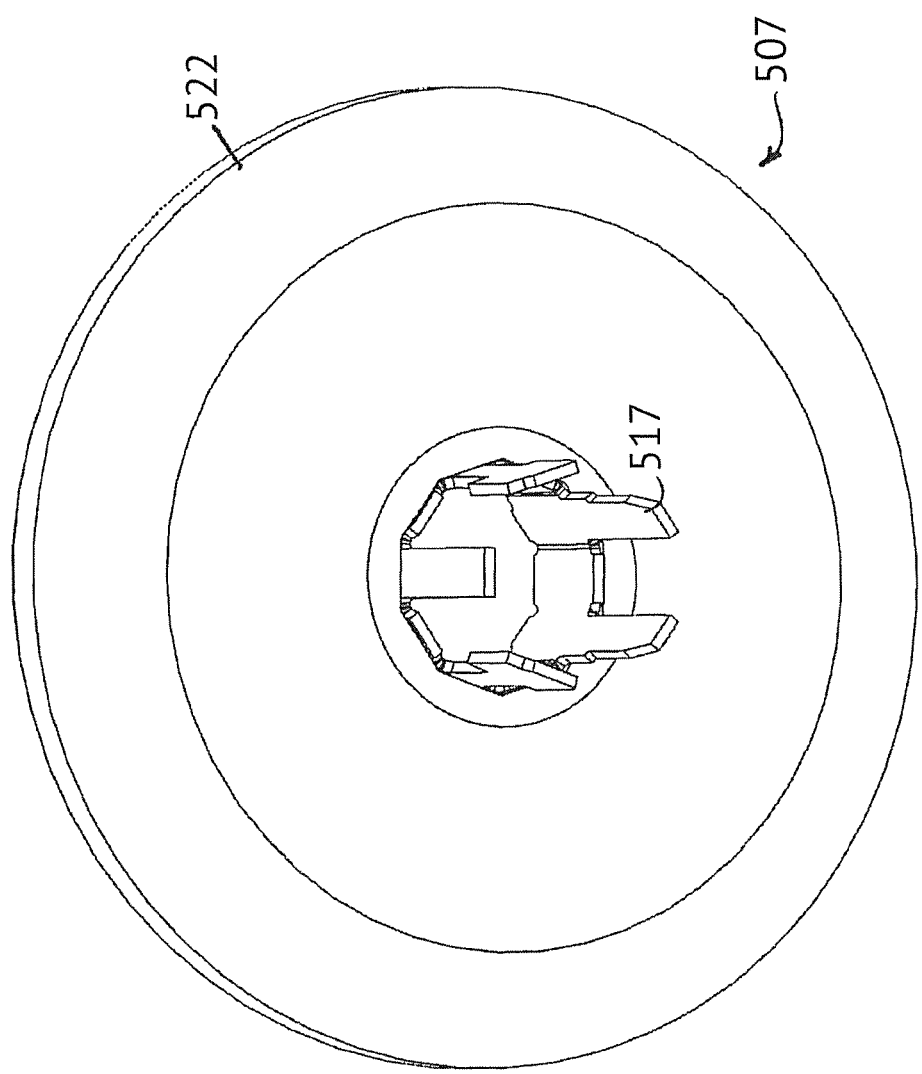
Figure 44C:
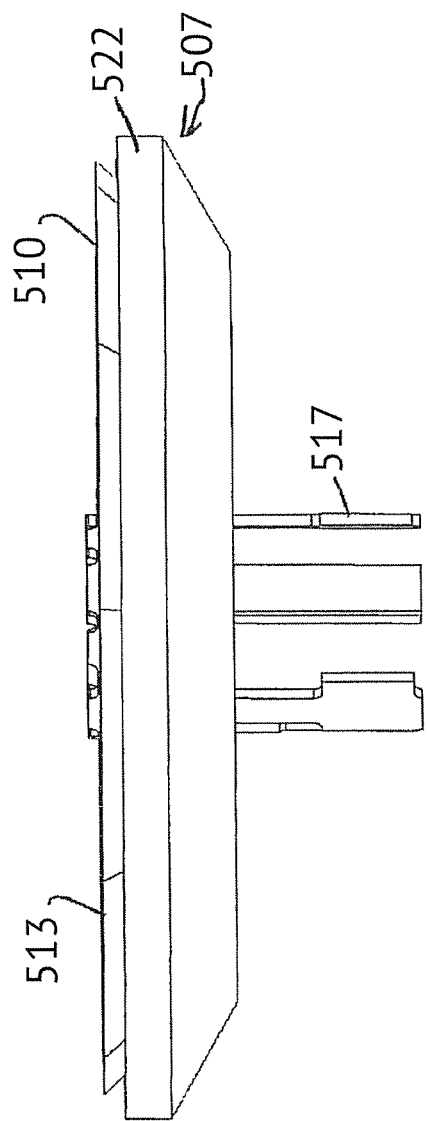
Figure 44D:
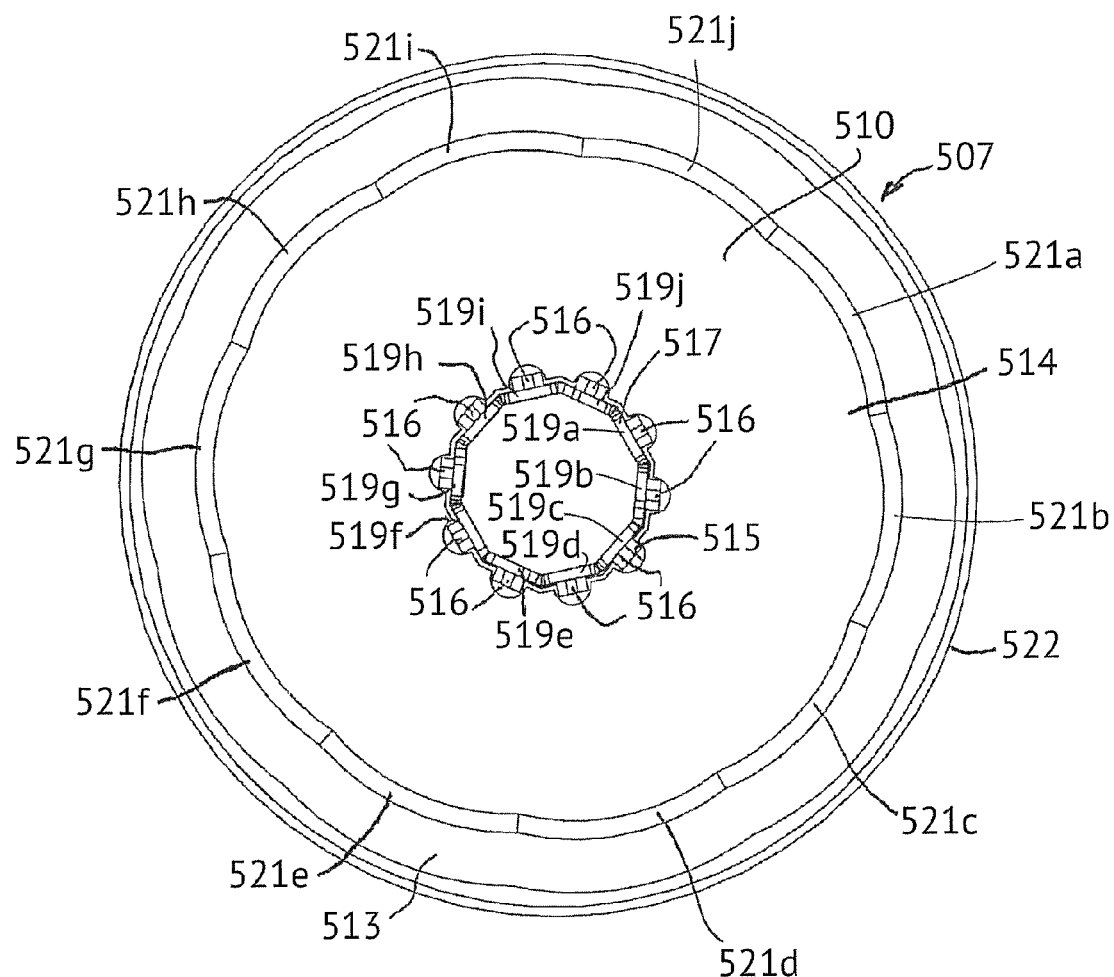
Figure 45C:
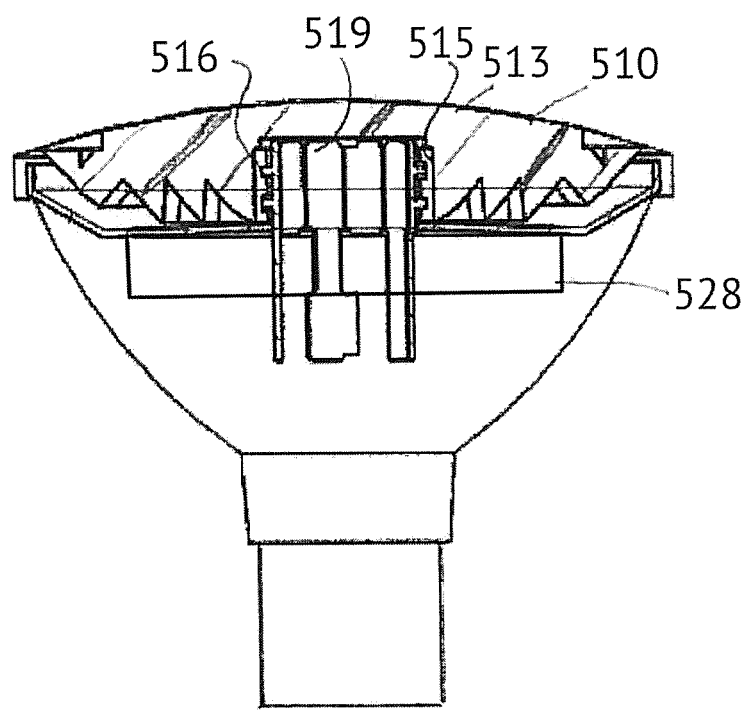
FIG. 45C is a view similar to FIG. 43 illustrating an alternative lamp incorporating a waveguide.

A further lamp 500 that is shaped externally similar to a standard incandescent PAR 30 spotlight is illustrated in FIGS. 43-45. As seen in FIG. 43, the lamp 500 includes a base 502 including an Edison-style plug 504, a central body 505, and a cap member 506 made of light transmissive material, such as optical grade acrylic, polycarbonate, or silicone. A light assembly 507 is mounted in any suitable fashion within the central body 505 and is covered by the cap member 506. The cap member 506 is secured to the central body 505 in any suitable manner, such as adhesive, ultrasonic welding, or the like. The cap member 506 includes a smooth, curved outer surface 508. The outer surface 508 and/or an inner surface 509 of the cap member 506 are preferably, although not necessarily, coated with a material that diffuses light. Referring also to FIGS. 44A-44D, 45A, and 45B, the light assembly 507 includes a waveguide body 510 having extraction features 511 formed in one or both of inner and outer surfaces 512, 513, respectively, to obtain a waveguide 514, as in the previous embodiments. The inner surface 510 further includes an interior coupling cavity 515. Multiple light sources, such as multiple LEDs 516, are arranged on a cylindrical carrier 517 and are inserted into the coupling cavity 515. The LEDs receive power via the Edison-style plug 504 and a driver circuit mounted on one or more circuit boards 518 disposed in the central body 505 such that the LEDs 516 develop light that is directed radially outwardly into the waveguide body 510. Because the light developed by the LEDs is directed outwardly in the first instance, there is no need for a light diverter. Further, as seen in FIG. 45C, the waveguide body 510 may have a curved outer surface 513, if desired, to further mimic a conventional incandescent spotlight. The curved outer surface may be coated with a light-diffusing material, although this need not be the case. As also seen in FIG. 45C, the carrier 519 and the LEDs 516 may be disposed in a blind bore comprising the coupling cavity 515 in the waveguide body 510, as opposed to the through bore comprising the coupling cavity 515 of FIGS. 43-45B.

Referring again to FIGS. 44A-44D, 45A, and 45B, the lamp 500 advantageously utilizes the waveguide 514 to obtain a beam spread of a desired magnitude, for example, 10 degrees to mimic a narrow-beam incandescent spotlight, if desired. Specifically, the cylindrical carrier 517 includes multiple (in the illustrated embodiment ten) facets 519a-519j (FIGS. 44A and 44D) wherein two or another number of LEDs are mounted in each of the facets 519. The extraction features 511 in the inner surface 512 of the waveguide body 510 arrayed in an overall flower-shaped pattern including multiple sections 511a-511j each associated with one of the facets 519a-519j, respectively. Each section 511a-511j is disposed outside of the associated facet 519a-519j and includes nested curved extraction subsections (see, for example, subsections 551f-1, 511fa-2, ... 511f-N in FIG. 45B). The extraction subsections meet adjacent extraction subsections at inflection regions (see, e.g., inflection regions 520a, 520b, ..., 520N in FIG. 45B). Also in the illustrated embodiment, a light extraction feature 521 comprising groove sections 521a-521j (FIG. 44D) are disposed in the outer surface 513. In the illustrated embodiment, each extraction subsection of each section 511 is coaxial with the LEDs carried by the associated facet 519. Light is extracted efficiently out of the waveguide body 510 by the curved subsections and the groove sections.

The waveguide body 510 and the carrier 517 with LEDs 516 are disposed within a reflecting backplane member 522 having a tapered surface 524 and a planar base surface 526. One or both of the interior surfaces are coated/covered with a reflective material, such as a specular reflective material or film or a white material or film. Light that escapes the inner surface 511 of the waveguide body 510 is thus reflected back into the waveguide body so that light is efficiently extracted out the outer surface 513. By suitably designing the extraction features that results in a tapered waveguide body 510 similar to the previous embodiments, one can obtain color mixing and light emission control as in the previous embodiments without utilizing a light diverter, such as the plug member 78.

It should be noted that any of the embodiments disclosed herein may utilize a reflective backplane member like the member 522, if desired. Also, the backplane 522 may have other than a planar base surface 526, such as a curved surface.

As seen in FIG. 45C, a heat exchanger 528 (diagrammatically shown) may be provided in thermal contact with the LEDs and may be disposed immediately below the backplane 522. The heat exchanger 528 can be arranged to eliminate thermal crosstalk between the LEDs and the driver circuit.

If desired, the waveguide body 510 can be modified to obtain a different beam spread, such as greater than 10 degrees. For example, the lamp may achieve a beam spread of 15 degrees, 25 degrees, or even up to 60 degrees, or any value in between.

While a uniform distribution of light may be desired in certain embodiments, other distributions of light may be contemplated and obtained using different arrays of extraction features.

Another embodiment of a waveguide body 670 comprised of an optically transmissive material 671 is shown in FIGS. 46-48B and 50-54. A number of LEDs of the same color together comprising an LED element may be used with the waveguide body 670. Alternatively, a number of LEDs not all of the same color and together comprising a multi-color LED element may be used in order to achieve a desired lighting effect, such as a particular color temperature. In the former case, a non-uniform intensity of light may be produced. In the latter case, a multi-color LED element may be subject to non-uniform color distribution at high angles, leading to non-uniformity in the color and intensity of output luminance. A non-uniform color distribution also may result from a multi-color LED element having different color LEDs with varying heights. For example, a multi-color LED element may include one or more red LEDs surrounded by a plurality of blue-shifted yellow LEDs. Each red LED has a height that is less than a height of the surrounding blue-shifted yellow LEDs. The light emitted from the red LED, therefore, is obstructed at least in part by the blue-shifted yellow LED, such that the light emanating from the LED element is not uniform. In addition to height differences, differences in the nature of the red and blue-shifted yellow LEDs affect the way the light is emitted from the respective LED.

The waveguide body 670 is identical to the waveguide body 170, discussed above with respect to FIGS. 12-18, with the exception that the waveguide body 670 includes light redirection feature(s) in the form of one or more cavities 602 to promote luminance uniformity and, if multi-colored LEDs are used, color mixing. According to an aspect of the present invention, the cavities 602 may have any of a number of geometries defined by surfaces that promote redirection of the light rays (e.g., through refraction) to improve luminance uniformity and to mix the light rays developed by the LEDs in an improved manner.

Figure 46:
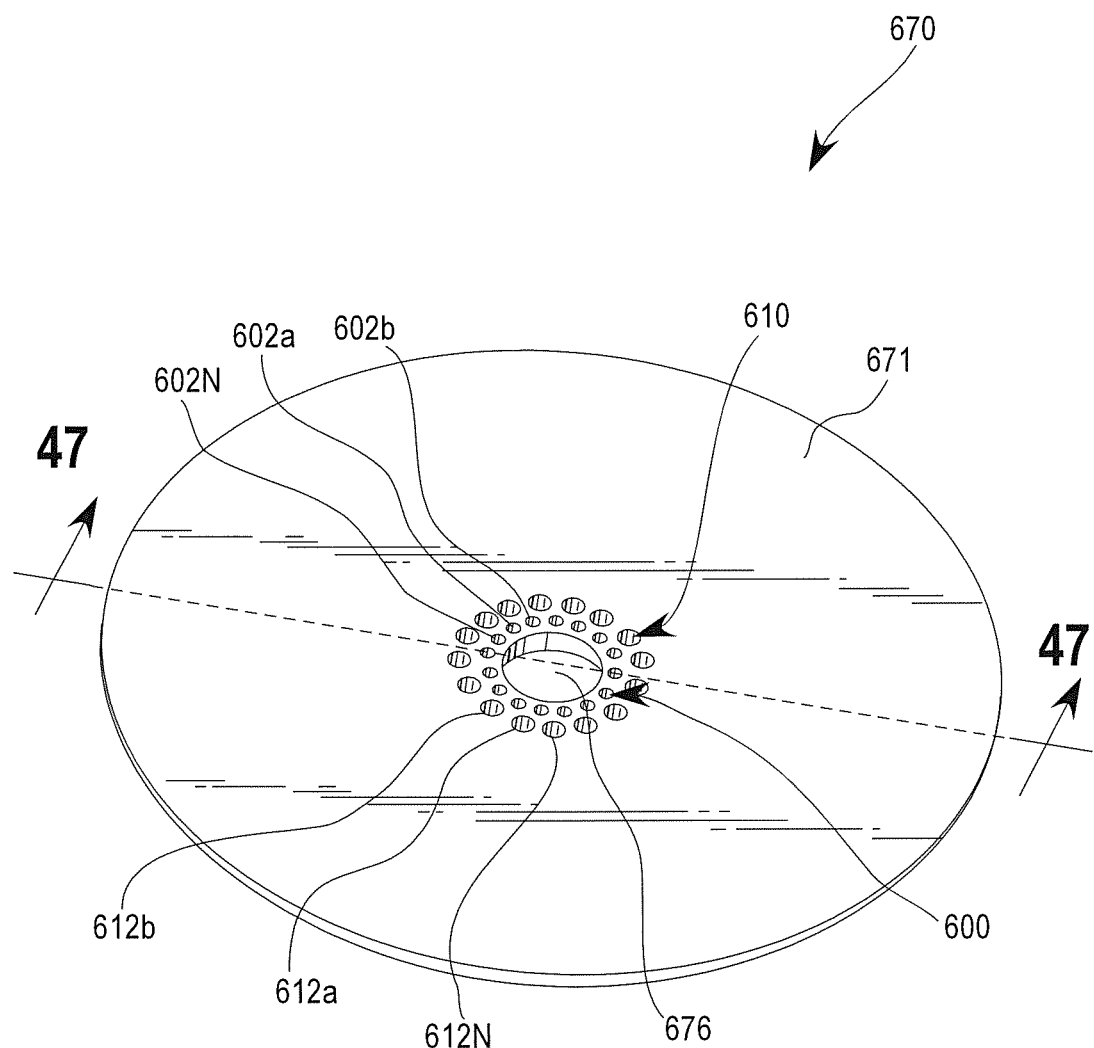
FIG. 46 is trimetric view of a further embodiment of an optical waveguide of the present invention.
Figure 46A:
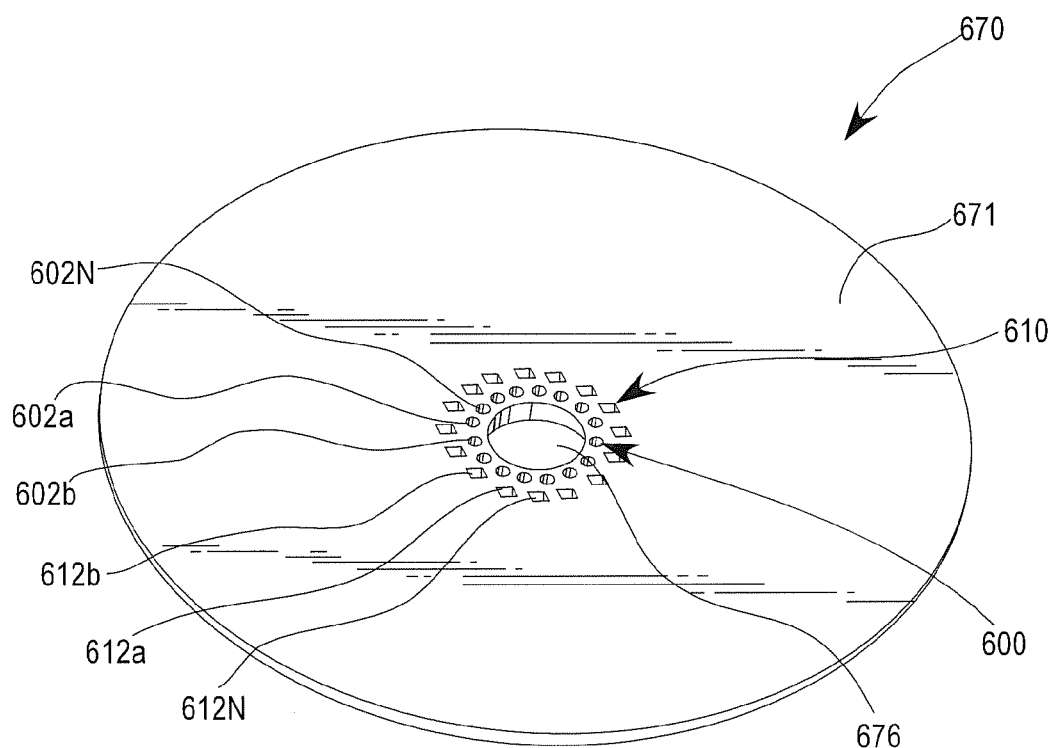
FIG. 46A is a trimetric view of another embodiment of the waveguide of FIG. 46.
Figure 46B:
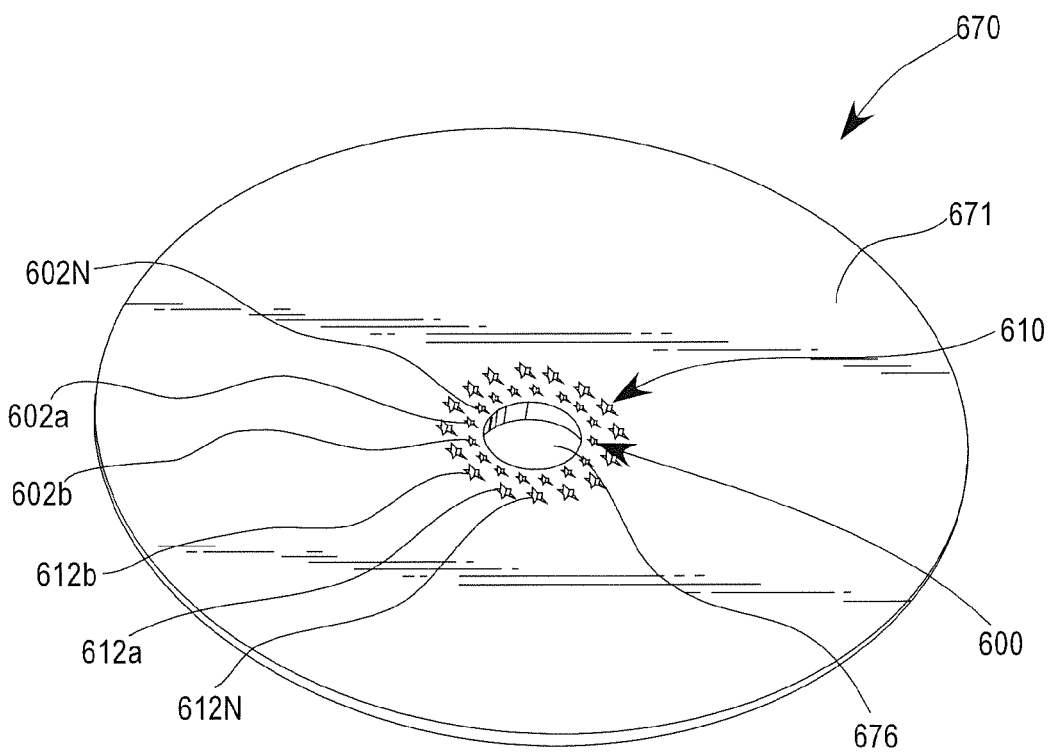
FIG. 46B is a trimetric view of another embodiment of the waveguide of FIG. 46.
Figure 47A:
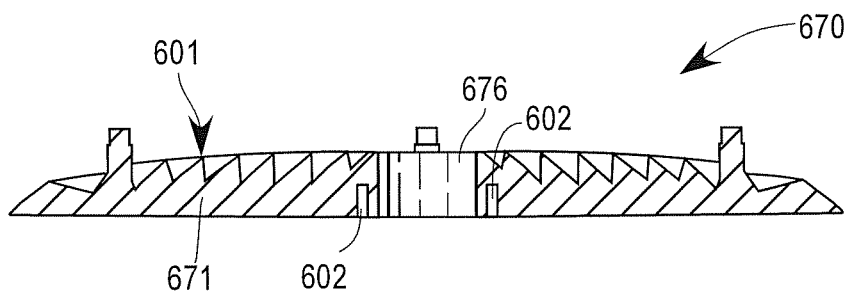
FIG. 47A is a cross sectional view of an alternate embodiment of the waveguide of FIG. 47.
Figure 48:
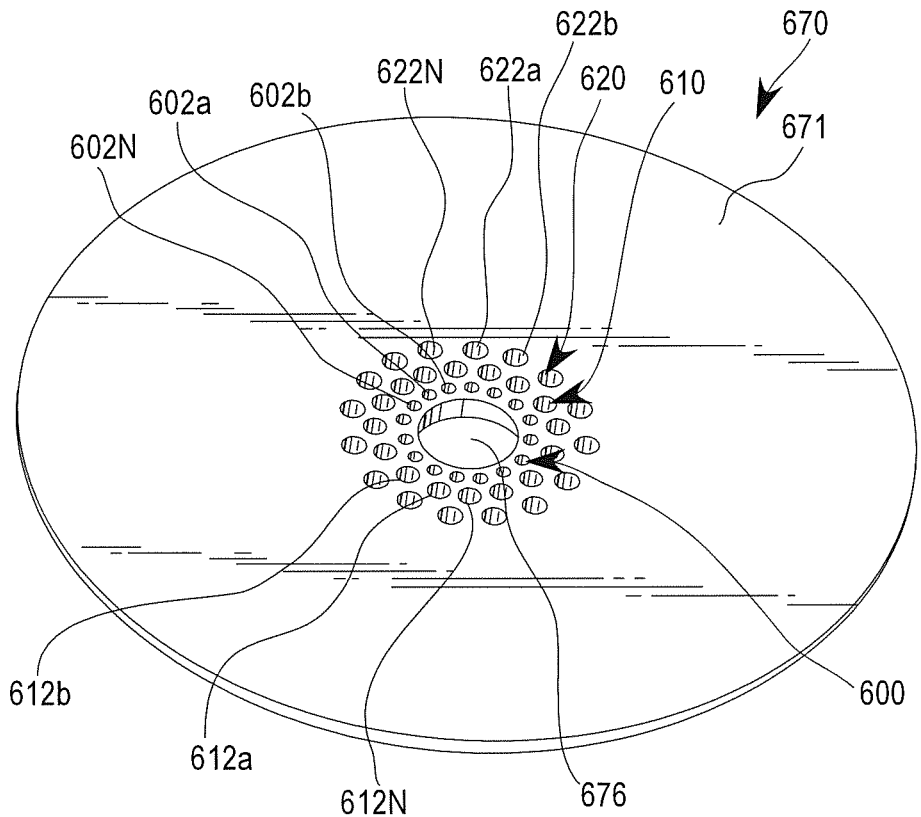
FIG. 48 is trimetric view of a further embodiment of the optical waveguide of FIG. 46.
Figure 48A:
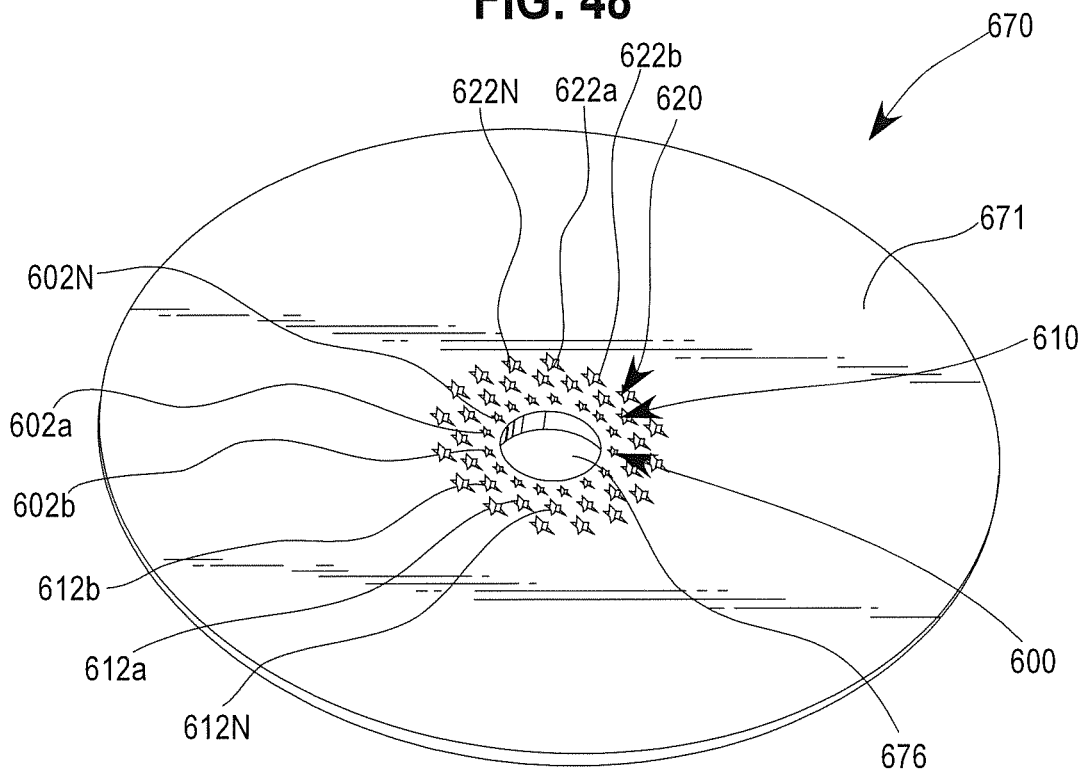
FIG. 48A is a trimetric view of another embodiment of the waveguide of FIG. 48.
Figure 48B:
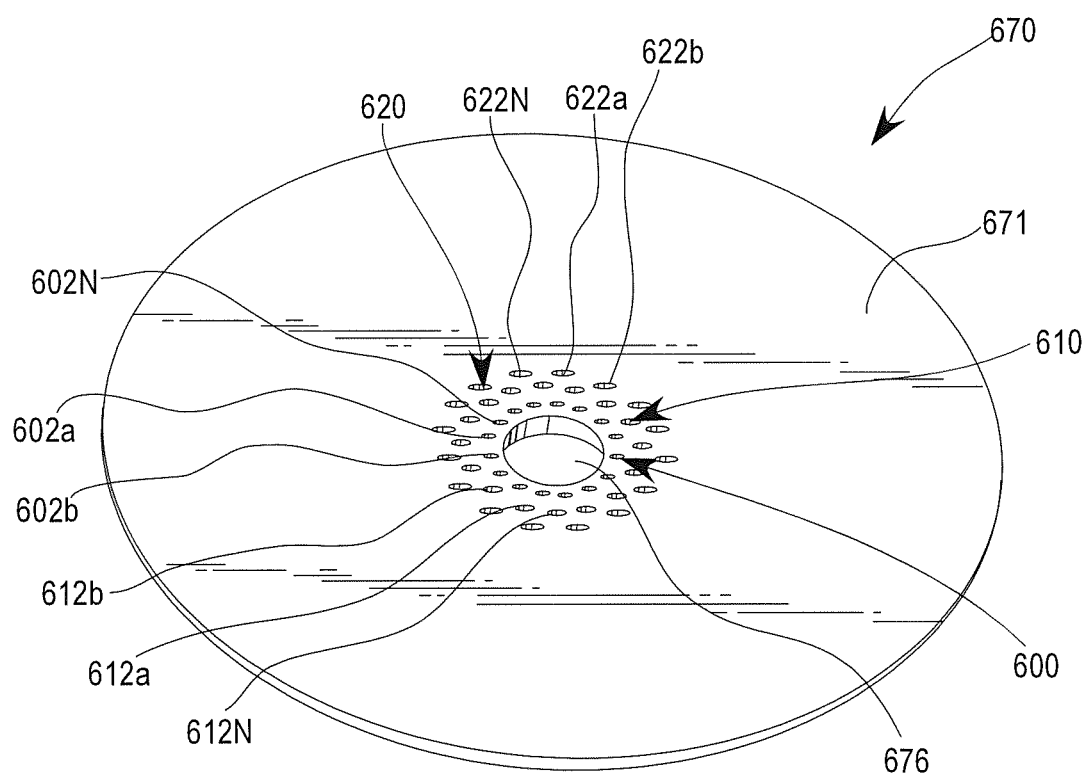
FIG. 48B is a trimetric view of another embodiment of the waveguide of FIG. 48.

As shown in FIG. 46, waveguide body 670 includes a first array of cavities 600 and a second array of cavities 610. As used herein, the term cavity may mean a void that is filled with air or a void that is partially or fully filled with another optically transmissive material such as acrylic, polycarbonate, molded silicone, glass, or cyclic olefin copolymers and/or combinations thereof. The waveguide body 670 includes an interior coupling cavity 676 and may include an extraction feature, for example, the extraction feature 601 (see FIG. 47A). The first array of cavities 600 surrounds the interior coupling cavity 676 such that the interior coupling cavity 676 is disposed, for example, in the center of the first array of cavities 600 or may be disposed off-center. Although two arrays are shown, in the example embodiments of FIGS. 46, 46A, 46B, and 46C, either a single or more than two arrays of cavities are contemplated. For example, FIGS. 48, 48A, and 48B show an embodiment of waveguide 670 having a third array of cavities 620. Also, each array may partially surround the interior coupling cavity 676, as opposed to fully surrounding the interior coupling cavity 676. Each array may include as little as one cavity or as many cavities as desired, and the cavities of an array may be equally spaced about the interior coupling cavity 676 or may be unequally spaced. Still further, the cavities of each array may all have the same shape (e.g., circular cylindrical) or may be of two or more different shapes, and may all be of the same size (e.g., diameter) or may be of two or more different sizes.

Figure 46C:
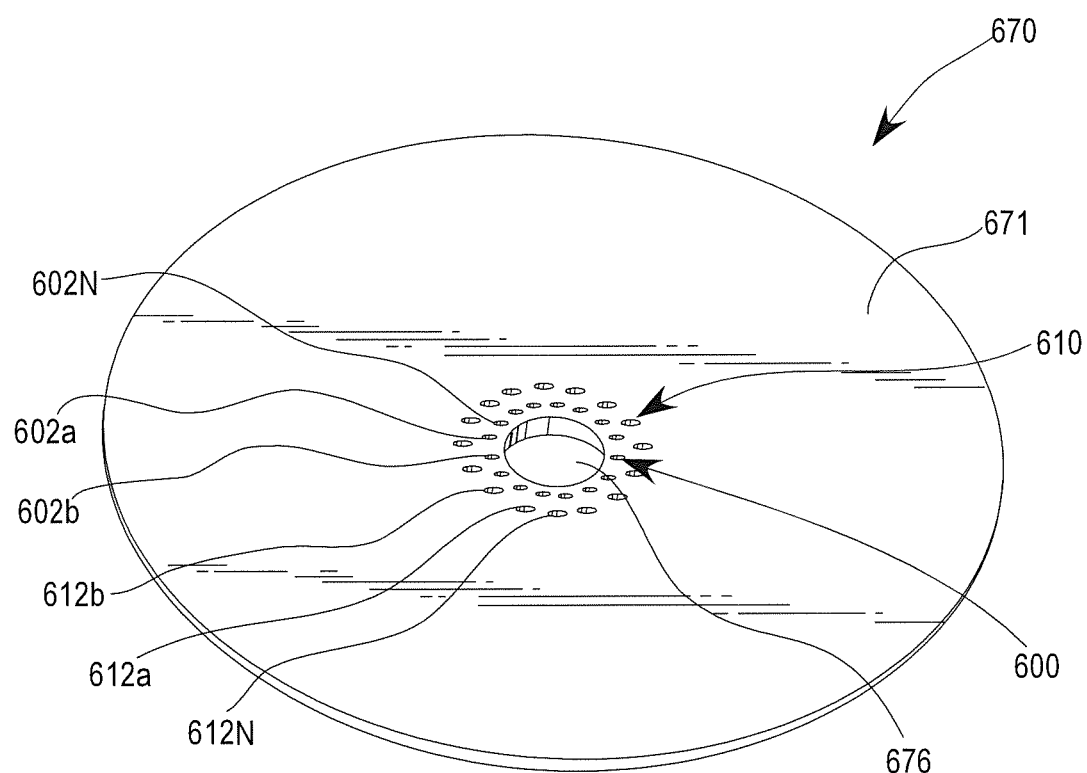
FIG. 46C is a trimetric view of another embodiment of the waveguide of FIG. 46.
Figure 47:
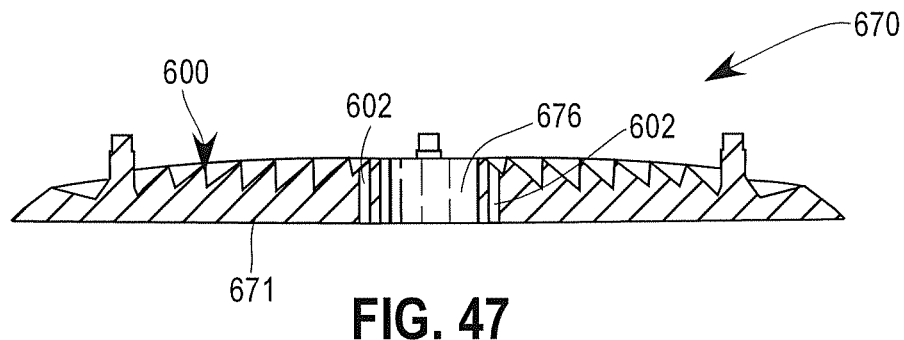
FIG. 47 is a cross sectional view of the waveguide of FIG. 46 taken generally along the line 47-47 of FIG. 46.

The first array of cavities 600 includes a plurality of cavities 602a, 602b, . . . , 602N. The first array of cavities 600 may have between 2 and 200 cavities 602. Preferably, the first array of cavities 600 includes between 4 and 60 cavities 602, for example. In the illustrated embodiment of FIG. 46, each cavity 602 of the first array of cavities 600 preferably is circular-cylindrical in shape and each preferably has a diameter or other cross-sectional dimension of between about 0.3 mm and about 6 mm, for example. More preferably, the diameter or other cross-sectional dimension of each of the cavities 602 of the first array of cavities 600 is between about 0.4 mm and about 5 mm and most preferably is between about 0.4 mm and about 4 mm. Each of the cavities 602 may have a symmetric or asymmetric shape, and may be a shape other than circular-cylindrical, such as star-shaped (FIG. 46B) or elliptical (FIG. 46C). The cavities 602 may extend fully through the material 671 of the waveguide body 670 as shown in FIG. 47. Alternatively, the cavities 602 may be blind cavities as shown in FIG. 47A such that they only pass partially through the waveguide material 671. Further, the cavities 602 may be arranged in a symmetric circular pattern around the interior cavity as shown in FIGS. 46-46C, 50, and 51, or they may be arranged in a different pattern (not shown), for example, a pattern that is rectangular, triangular, or flower-shaped. Further, the cavities 602 may be arranged in a symmetric or asymmetric pattern.

The second array of cavities 610 surrounds the first array of cavities 600 as shown in FIG. 46. The second array of cavities 610 includes a plurality of cavities 612a, 612b, . . . , 612N. The second array of cavities 610 may have between 2 and 200 cavities 602. Preferably, the second array of cavities 610 includes between 6 and 100 cavities 612, for example. The cavities 612 of the second array of cavities 610 may be angularly offset from the cavities 602 of the first array of cavities 600 such that each cavity 612 is disposed midway between adjacent cavities 602 of the first array of cavities 600. As before, the cavities 612 may extend fully through the material 671 of the waveguide body 670 or may be blind cavities such that they do not pass fully through the waveguide material 671.

In the illustrated embodiment of FIG. 46, each cavity 612 is circular-cylindrical in shape. Again, the cavities 612 may be a shape other than circular-cylindrical, such as star-shaped (FIG. 46B) or elliptical (FIG. 46C). Preferably, although not necessarily, each cavity 612 of the second array of cavities 610 has a size (i.e., diameter or other cross-sectional dimension) that is larger than the size of the cavities 602 of the first array of cavities 600. The cavities 612 of the second array of cavities 610 may have a diameter or other cross-sectional dimension of between about 0.4 mm and about 10 mm. More preferably, the diameter or other cross-sectional dimension of each of the cavities 612 of the second array of cavities 610 is, for example, between about 0.4 mm and about 8 mm and most preferably each diameter or other cross-sectional dimension is between about 0.4 mm and about 10 mm. While the cavities 612 of the second array of cavities 610 in the illustrated embodiment have the same shape as the cavities 602 of the first array of cavities 600, e.g., a circular-cylindrical shape (FIG. 46), the cavities 612 may have a different shape such as a square or rectangular-cylindrical shape as shown in FIG. 46A. Further, the cavities 612 of the second array of cavities 610 may be arranged in the same pattern, e.g., the circular pattern as shown in FIGS. 46-46C, 50, and 51, as the cavities 602 of the first array of cavities 600, and/or may be coaxial therewith or they may be arranged in a pattern that is different from and/or not coaxial with respect to the first array of cavities.

Another embodiment of the waveguide body 670 is shown in FIGS. 48, 48A, and 48B. In the illustrated embodiments, the waveguide body includes a third array of cavities 620. The third array of cavities 620 surrounds the second array of cavities 610. The third array of cavities 620 includes a plurality of cavities 622a, 622b, . . . , 622N. The third array of cavities 620 may have between 2 and 200 cavities 622. The cavities 622 of the third array of cavities 620 are angularly offset from the cavities 612 of the second array of cavities 610 such that each cavity 622 is disposed midway between adjacent cavities 612 of the second array of cavities 610. The cavities 622 may extend fully through the material 671 of the waveguide body 670 or may be blind cavities such that they do not pass fully through the waveguide material 671.

As illustrated in FIG. 48, each cavity 622 of the third array of cavities 620 may be circular-cylindrical in shape and may have a size that is larger than the size of the cavities 602 and 612 of the first and second array of cavities 600 and 610, respectively. The cavities 622 also may be a shape other than circular-cylindrical, such as star-shaped (FIG. 48A) or elliptical (FIG. 48B). The cavities 622 of the third array of cavities 620 preferably have a diameter or other cross-sectional dimension of between about 0.4 mm and about 10 mm, and more preferably have a diameter or other cross-sectional dimension of between about 1 mm and about 10 mm, and most preferably have a diameter or other cross-sectional dimension between about 2 mm and about 10 mm. While the cavities 622 of the third array of cavities 620 in the illustrated embodiment may have the same shape as the cavities 602 and 612 of the first and second arrays of cavities 600 and 610, respectively, e.g., a circular-cylindrical shape (FIG. 48), the cavities 622 of the third array 620 may also have a different shape, such as a square or rectangular-cylindrical shape (similar or identical to the second array of the embodiment of FIG. 46A). Further, the cavities 622 of the third array of cavities 620 may be arranged in the same pattern, e.g., the circular pattern shown in FIGS. 48, 48A, and 48B, as the cavities 602 and 612 of the first and second array of cavities 600 and 610, respectively, and/or may be coaxial therewith, or they may be arranged in a pattern that is different from and/or not coaxial with respect to the first and second arrays of cavities (not shown). Further arrays of cavities may be disposed anywhere in the waveguide body 670 as desired, for example, disposed radially outwardly from the third array of cavities 620 in any array shape and with cavity shapes and sizes as described hereinabove, or any other shape(s) and/or size(s).

Figure 54:
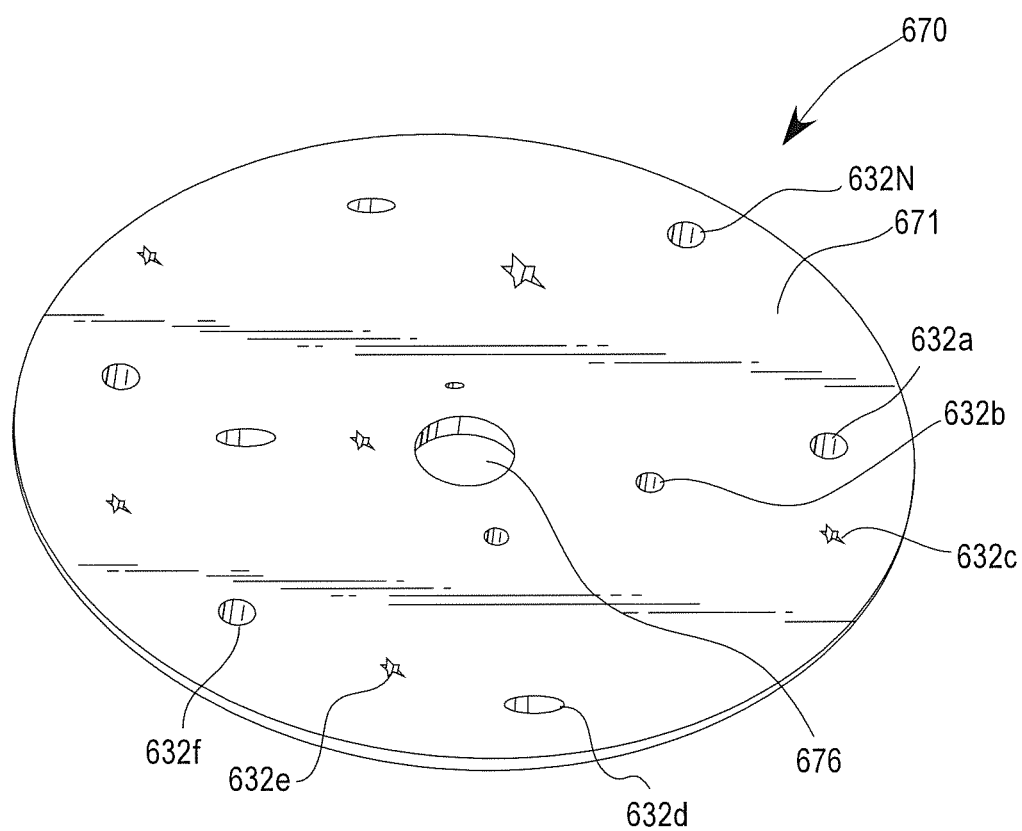
FIG. 54 is trimetric view of another embodiment of the waveguide of FIG. 46; and, FIG. 55 is a partial diagrammatic elevational view of another embodiment of the asymmetric waveguide of FIG. 11D.

Another embodiment of the waveguide body 670 is shown in FIG. 54. In this embodiment, the waveguide body includes at least one cavity 632a. Additional cavities 632b, 632c, . . . , 632N may also be included. The cavities 632 may be of the same shape (e.g., 632a and 632b) or they may be different shapes (e.g., 632b and 632c). The shapes of the cavities 632 may be, for example, circular-cylindrical (i.e., 632a), elliptical (i.e., 632d), star-shaped (i.e., 632c), or any other shape. The cavities 632 may extend all the way through the material 671 or may extend only partially through the material 671. The cavities may also be of the same or similar size (e.g., 632a and 632f) or they may be of different sizes (e.g., 632a and 632b). The cavities 632 may be disposed in the waveguide 670 in a pattern or they may be disposed in the waveguide at random positions as shown in FIG. 54.

Figure 49:
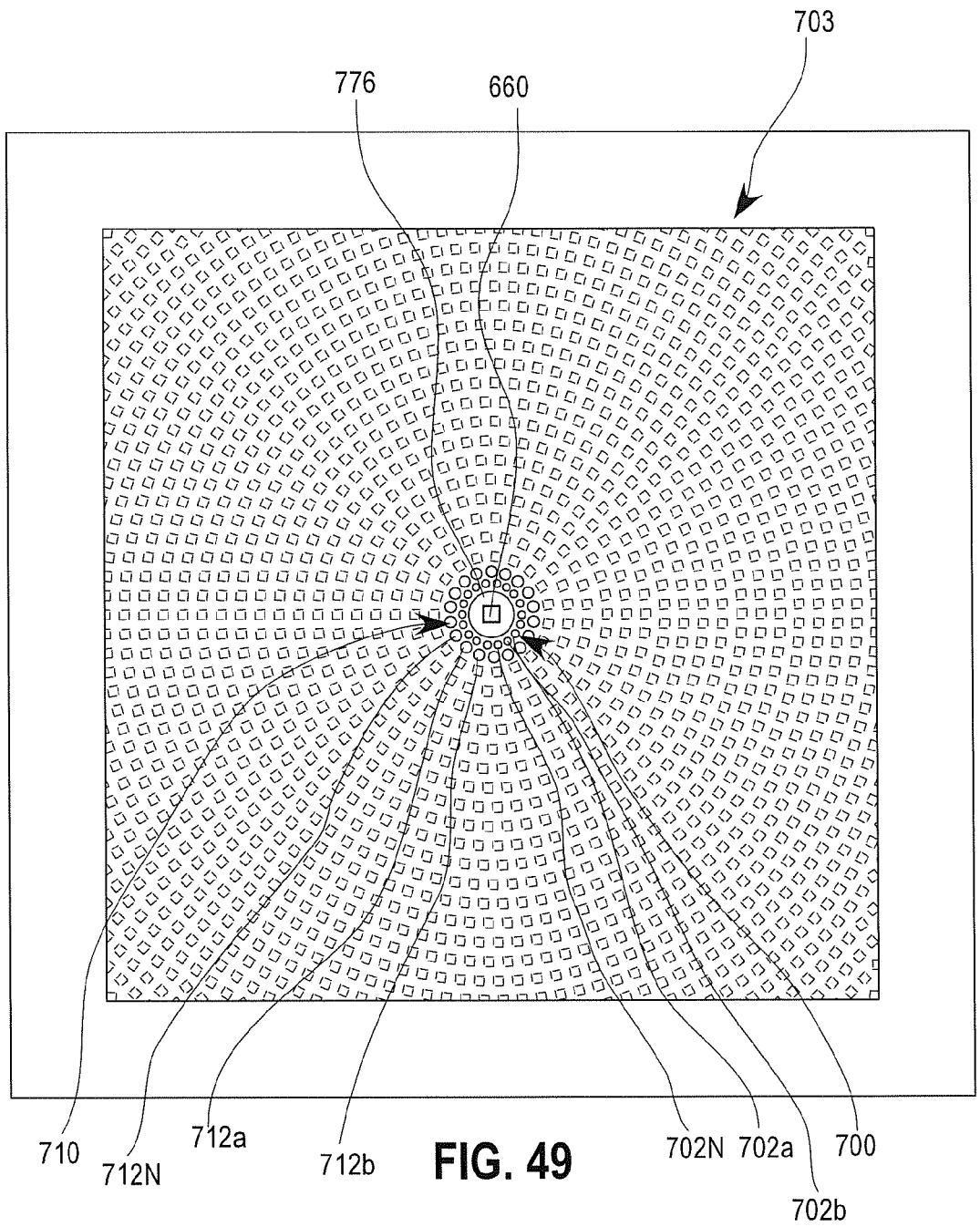
FIG. 49 is a plan view of a further embodiment of an optical waveguide.

Another embodiment of a waveguide body 703 is shown in FIG. 49. In this embodiment, the waveguide body 703 is rectangular in shape as compared to the waveguide body 670, which is circular in shape. The waveguide body 703 is identical to waveguide body 103 as discussed above with respect to FIGS. 36-39, with the exception that waveguide body 703 includes light redirection feature(s) in the form of one or more cavities 702. As shown in FIG. 49, the waveguide body 703 includes a first array of cavities 700 and a second array of cavities 710. In the illustrated embodiment, the first array of cavities 700 surrounds an interior coupling cavity 776, such that the interior coupling cavity 776 is disposed in the center of the first array of cavities 700.

The first array of cavities 700 includes a plurality of cavities 702a, 702b, . . . , 702N, and the second array of cavities 710 includes a plurality of cavities 712a, 712b, . . . , 712N. The second array of cavities 710 surrounds the first array of cavities 700. The cavities 712 of the second array of cavities 710 are angularly offset from the cavities 702 of the first array of cavities 700 such that each cavity 712 is disposed midway between adjacent cavities 702, although this need not be the case. Further, the cavities 702 of the first array of cavities 700 may be of the same or different size, shape, pattern, number, and material as discussed with respect to cavities 602 discussed above. Similarly, the cavities 712 of the second array of cavities 710 may be of the same or different size, shape, pattern, number, and material as cavities 612 discussed above.

Figure 55:
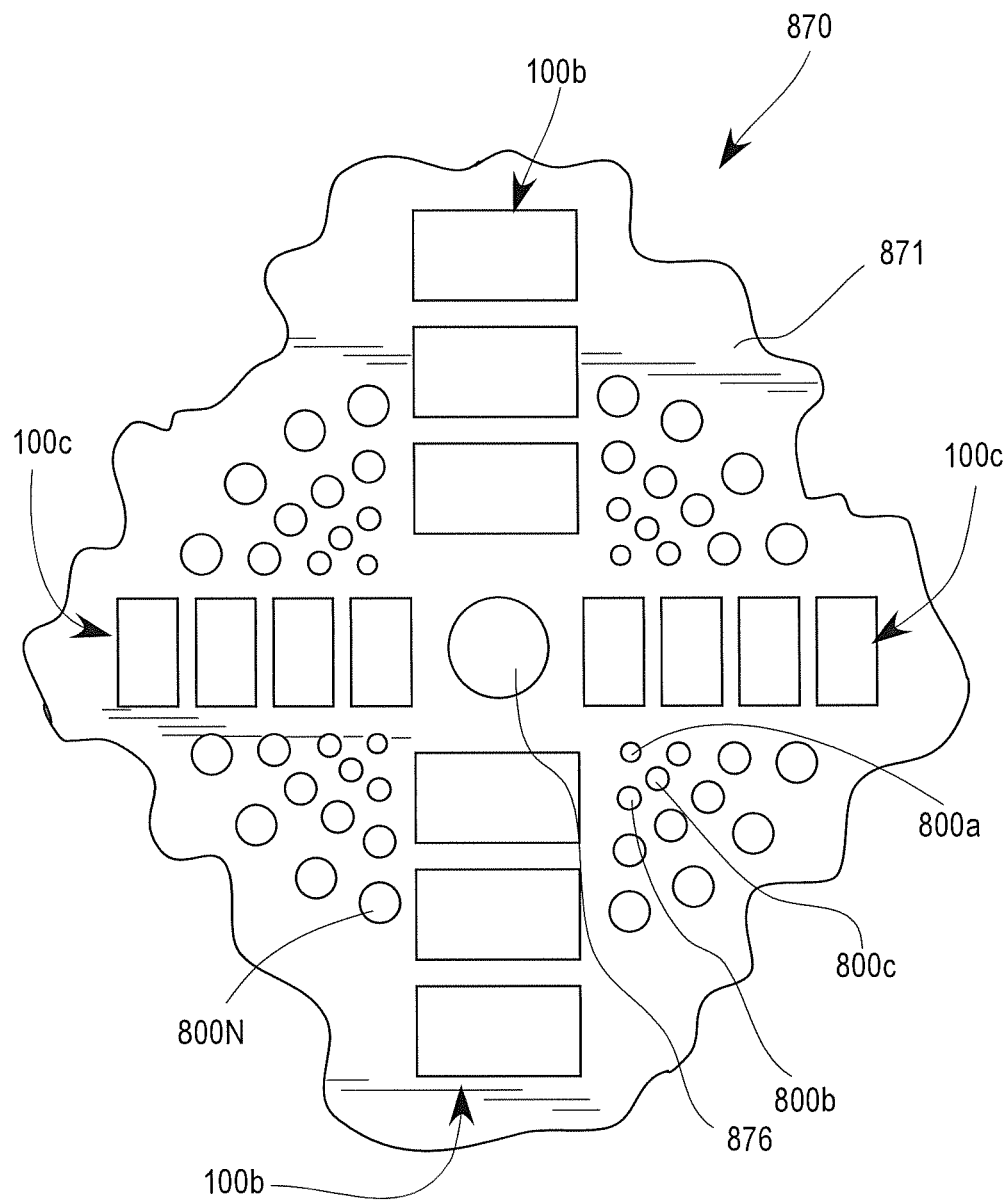

Another embodiment of a waveguide body 870 comprised of an optically transmissive material 871 is shown in FIG. 55. As shown in FIG. 55, the waveguide body 870 is identical to the waveguide discussed above with respect to FIGS. 11D-11F, with the exception that the waveguide body 870 includes an interior coupling cavity 876 and one or more light redirection feature(s) in the form of at least one cavity 800a. Additional cavities 800b, 800c, . . . , 800N may also be included. The cavities 800 may be of the same shape (e.g., 800a and 800b) or they may be of different shapes. The shapes of the cavities 800 may be, for example, circular-cylindrical (i.e., 800a), elliptical, or star-shaped. The cavities may also be of the same or similar size (e.g., 800b and 800c) or they may be of different sizes (e.g., 800a and 800b). The cavities 800 may extend all the way through the material 871 or they may extend only partially through the material 871. The cavities 800 may be disposed on the waveguide 870 in a specific pattern as shown in FIG. 55 or they may be disposed on the waveguide 870 at random positions.

Figure 51:
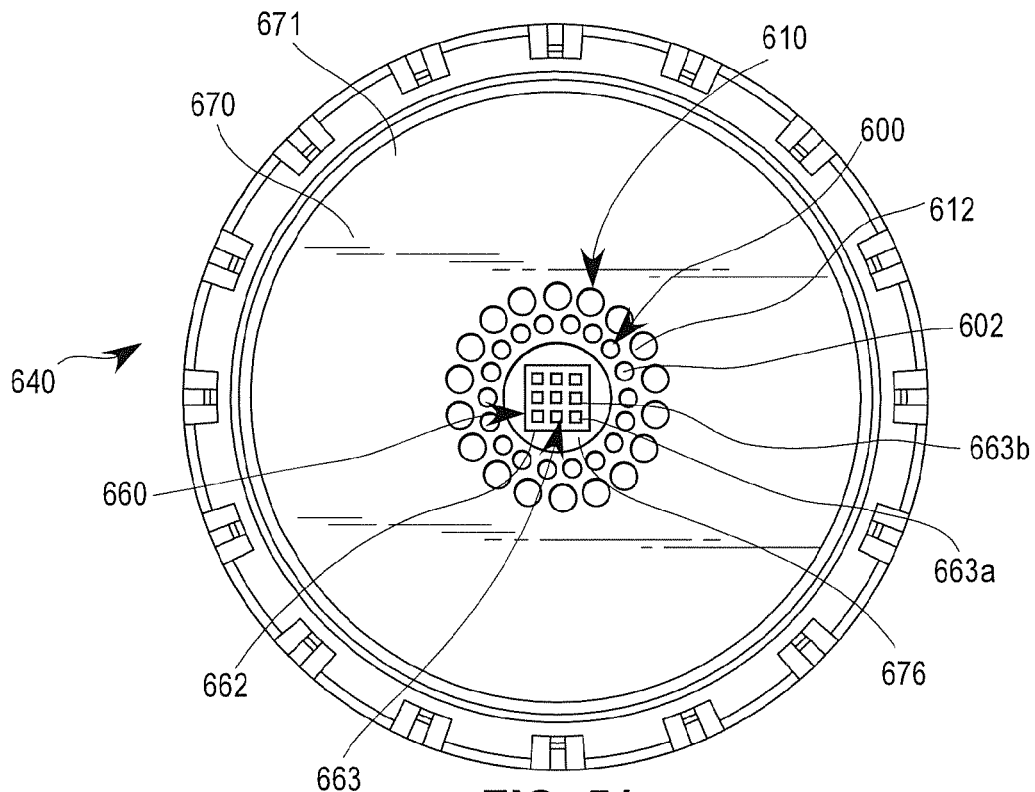
FIG. 51 is a plan view of the lamp of FIG. 50 without a plug member.
Figure 52:
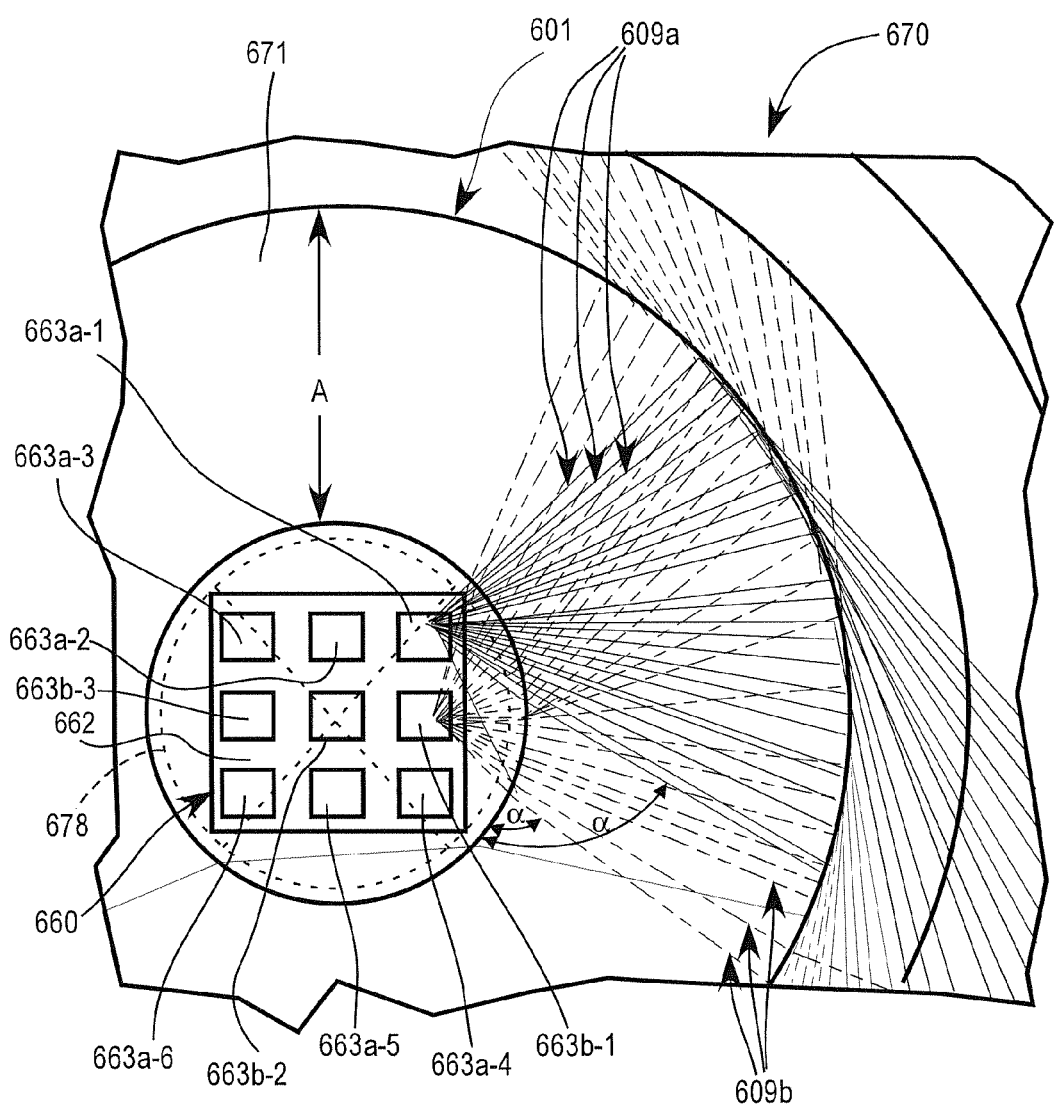
FIG. 52 is a partial fragmentary diagrammatic view of the waveguide of FIG. 12 illustrating the general path light beams emitted from two different light sources travel as the light beams pass through the waveguide.

As best shown in FIGS. 49 and 51, the interior coupling cavities 676 and 776 of the waveguide bodies 670 and 703, respectively, are configured to receive a light source 660. As noted above, the light source 660 may be an LED module 662 that includes a number of individual LEDs 663. For example, there may be anywhere from one to nine or more individual LEDs 663 on the LED module 662, and the LEDs 663 may be arranged in any configuration. The LED module 662, for example, may include nine individual LEDs 663 arranged in a 3×3 array as shown in FIGS. 51-53. The LED's 663 may be blue-shifted yellow LEDs 663a, red LEDs 663b, and/or green LEDs (not shown). The LED module 662 may include six blue-shifted yellow LEDs 663a and three red LEDs 663b as shown in FIG. 52 or the LED module 662 may include five blue-shifted yellow LEDs 663a and four red LEDs 663b arranged in a checkerboard pattern as shown in FIG. 52A.

Figure 50:
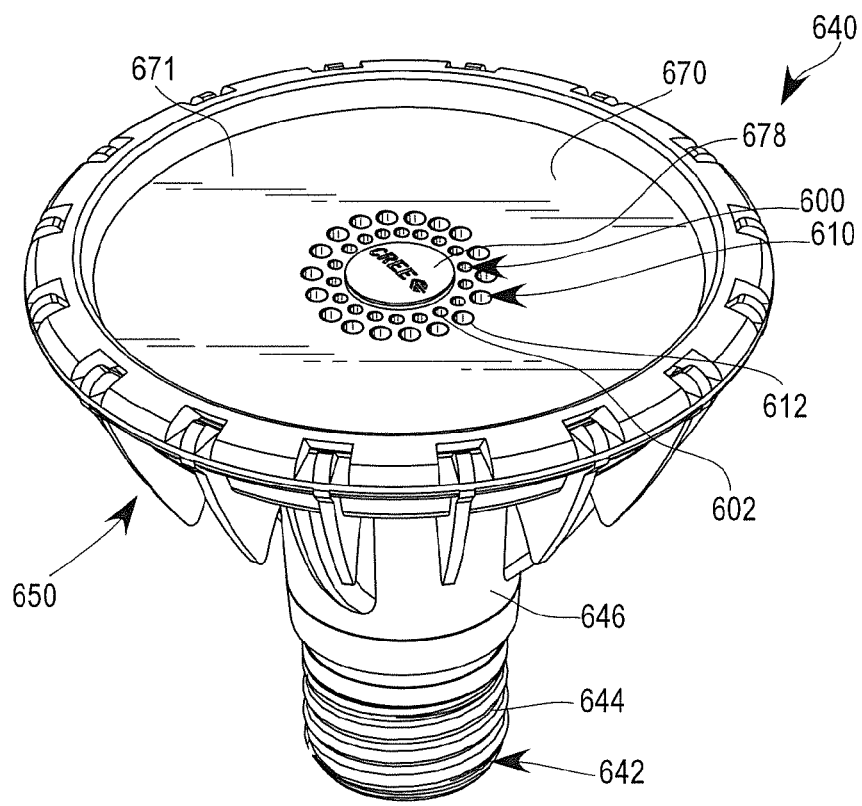
FIG. 50 is a trimetric view of an end of a lamp incorporating the waveguide illustrated in FIG. 46.

Referring next to FIGS. 50 and 51, an embodiment of a lamp 640 is shown. The lamp 640 is identical to the lamp 140 except that the lamp 640 includes the waveguide 670. As shown in FIG. 50, the lamp 640 includes a base 642 at which an Edison-style plug 644 is disposed. Extending away from the base 642 is a central body 646 to which a light assembly 650 is secured. The light assembly 650 includes the light source 660 (discussed above and similar or identical to the light source 60) disposed in the interior coupling cavity 676 of the waveguide 670 (FIG. 51). A plug member 678 identical to plug member 68 may be inserted into the interior coupling cavity 676. The remaining components of lamp 140 are present but not shown in FIGS. 50 and 51.

In FIG. 52, an example of a waveguide 670 is shown having LED module 662 with six blue-shifted yellow LEDs 663a-1 through 663a-6 arranged in two rows of three LEDs and three red LEDs 663b-1 through 663b-3 arranged in a single row between the two rows of blue-shifted yellow LEDs on a substrate. The blue-shifted yellow LED 663a-1 emits light beams 609a and the red LED 663b-1 emits light beams 609b. The light beams 609a and 609b strike the reflective surface of the plug member 678 and are reflected transversely toward the waveguide 670. Alternatively, light from the LEDs 663a-1 and 663b-1 (and other LEDs) directly enter the waveguide 670. When the light beams 609a and 609b strike the material 671 of the waveguide 670, the light beams 609a and 609b refract at an angle α. The light beams 609a and 609b travel at the angle α in a Section A until the light beams 609a and 609b reach an extraction element such as the extraction feature 601. As shown diagrammatically in FIG. 52, as the light beams 609a and 609b travel through Section A, the light beams 609a of the blue-shifted yellow LED 663a-1 cross paths or "mix" with the light beams 609b of the red LED 663b-1. However, when the light beams strike the extraction feature 601, the directional paths of the light beams 609a and 609b change such that a high degree of color separation results.

In FIG. 53, a waveguide 670 having first and second arrays of cavities 600 and 610, respectively, is shown. The same LED module 662 with blue-shifted yellow LEDs 663a and red LEDs 663b that is shown in FIG. 52 is included in FIG. 53. Similar to the example shown in FIG. 52, when the light beams 609a of the blue-shifted yellow LED 633a-1 and the light beams 609b of the red LED 663b-1 strike the material 671 of the waveguide 670, the light beams initially refract at angle α. However, when either the light beams 609a or the light beams 609b strike the cavity 602 of the first array of cavities 600, the light beams 609 either reflect away from cavity 602 or refract at an angle β. The light beams 609a or 609b that are not reflected travel through the cavity 602 at the angle β until the light beams reach a point X. When the light beams 609a or 609b reach a point X of the cavity 602, the light beams either reflect back into the cavity 602 or refract at an angle θ as the light beams 609a or 609b reenter the waveguide material 671. Similarly, when either the light beams 609a or the light beams 609b strike the cavity 612 of the second array of cavities 610, the light beams either reflect away from cavity 612 or refract at an angle $β_1$. If the light beams 609a or 609b are not initially reflected, then the light beams pass through cavity 612 until the light beams 609a or 609b reach a point Y. When the light beams 609a or 609b reach the point Y of the cavity 612, the light beams either reflect back into the cavity 612 or refract at an angle $θ_1$ as the light beams reenter the waveguide material 671.

By changing the refraction angles of a light beam over the same area, e.g., Section A, of the waveguide, the light beams are scattered to promote overall luminance uniformity and such that a larger number of blue-shifted yellow light beams 609a and red light beams 609b mix in Section A and continue to mix after the light beams 609a and 609b strike the extraction feature 601. Increasing the amount of luminance uniformity and, in the case of multi-color LED elements, color mixing is desirable because such mixing reduces the appearance of the individual colors of the LEDs 663a and 663b and produces a more uniform resultant color, e.g., a warm white light. Further, by providing different sized cavities 602 and 612, the angles at which the light beams 609a and 609b of the blue-shifted yellow LEDs 663a and the red LEDs 633b, respectively, enter and exit the cavities 602 and 612 are greatly varied. This increases the amount of light beam scattering, which further promotes luminance uniformity and color mixing.

Each light redirection feature preferably has an overall length in the direction extending radially away from the center of the coupling cavity of no less than about 0.5 mm, and more preferably such overall length is between about 1 mm and about 10 mm, and most preferably between about 2 mm and about 8 mm. Further, each light redirection feature preferably has an overall circumferential extent (or peripheral extent in the event the light redirection feature is noncircular) of no less than about 1 mm, and more preferably between about 4 mm and about 30 mm, and most preferably between about 5 mm and about 20 mm.

It should be noted that the placement of LEDs on the substrate can be modified to enhance color mixing. For example, the red LEDs 663b may be reduced in number to two LEDs while maintaining the same number and arrangement of blue-shifted yellow LEDs. Alternatively, the blue shifted yellow LEDs 663a may be rearranged to comprise first and second single LEDs disposed adjacent first and second edges or sides of the substrate and first and second pairs of LEDs disposed adjacent the third and fourth sides of the substrate. Two red LEDs 663b are disposed between the LEDs 663a optionally remote from the edges of the substrate. Such designs are disclosed in co-pending U.S. patent application Ser. No. 14/101,147, entitled "Luminaires Using Waveguide Bodies and Optical Elements" by Bernd Keller et al., filed Dec. 9, 2013, the disclosure of which is incorporated herein.

In addition to the foregoing, a primary or secondary lens of the LED element may be used in conjunction with the LED light source 60 or 660 to further improve the luminance and/or color uniformity of the light emitted from the surface of the waveguide. In particular, the shape of the primary LED light source lens may be varied and optimized to use refraction or scattering to direct light into preferred directions prior to entering the coupling cavity, thereby improving uniformity. The orientation and/or shape of the LED element relative to the surface(s) defining the coupling cavity may also be varied and optimized to improve light mixing. The lens and/or any of the waveguides disclosed herein may be formed with one or more materials in accordance with the teachings of either U.S. patent application Ser. No. 13/843,928, filed Mar. 15, 2013, entitled "Multi-Layer Polymeric Lens and Unitary Optic Member for LED Light Fixtures and Method of Manufacture" by Craig Raleigh et al., or U.S. patent application Ser. No. 13/843,649, filed Mar. 15, 2013, entitled "One-Piece Multi-Lens Optical Member and Method of Manufacture" by Craig Raleigh et al., the disclosures of which are hereby incorporated by reference herein. If desired, a scatterer, which may be effectuated by scattering particles coated on or formed within the lens, may be provided to further mix the light developed by the LEDs.

Other embodiments of the disclosure including all of the possible different and various combinations of the individual features of each of the foregoing embodiments and examples are specifically included herein. Thus, for example, a waveguide of one of the disclosed shapes may include extraction features of the same or a different shape, and the extraction features may be symmetric or asymmetric, the extraction features may have differing or the same geometry, spacing, size, etc. without departing from the scope of the invention. Also, any of the light redirection features disclosed herein may also function as a light extraction feature, if desired.

In any of the embodiments disclosed herein, gaps or interfaces between waveguide elements (such as between the waveguide body and material disposed in a cavity or cavities) may be filled with an optical coupling gel or a different optical element or material, such as an air gap or any of the other materials disclosed herein, or an index matching material. Further, one or more other light redirection feature shapes oriented in any desired direction could be used, wherein the shapes include, for example, V-shaped, elliptical, circular, diamond-shaped, kite-shaped (i.e., a diamond shape with different angles at opposing ends of the shape), rectangular, polygonal, curved, flat, tapered, segmented, continuous, discontinuous, symmetric, asymmetric, etc. The light redirection feature preferably has an overall radial length of no less than about 1 um, and more preferably the overall radial length is between about 10 um and about 10 mm, and most preferably between about 1 mm and about 10 mm. Further the light redirection feature preferably has an overall circumferential (or other overall) extent of no less than about 1 um, and more preferably the overall extent is between about 10 um and about 10 mm, and most preferably between about 1 mm and about 10 mm. Any or all of the surfaces partially or fully defining any or all of the features disclosed herein, including the light redirection features disclosed herein, or any portion thereof, may be coated or otherwise formed with optically reflective materials, such as a specular material, such as a metallized coating, a scattering material, a white material, or the like, if desired.

It should be noted that the number, size, and arrangement of the light redirection features may be such as to gradually collimate light over the extent of the waveguide body and/or could cause redirection of light for another purpose, for example, to cause the light to avoid features that would otherwise absorb or scatter such light.

INDUSTRIAL APPLICABILITY

In summary, it has been found that when using a single color or multicolor LED element in a luminaire, it is desirable to mix the light output developed by the LEDs thoroughly so that the intensity and/or color appearance emitted by the luminaire is uniform. When the LED element is used with a waveguide, opportunities have been found to exist to accomplish such mixing during the light coupling and light guiding or distributing functions. Specifically, bending the light rays by diffraction can result in improvement in mixing. In such a case, this refractive bending can be accomplished by providing interfaces in the waveguide between materials having different indices of refraction. These interfaces may define light redirection features at portions intermediate light coupling features and waveguide extraction features or areas where light is otherwise extracted (such as by bends) from the waveguide. It has further been found that directing light into a wide range of refraction angles enhances light mixing. Because the angle $A_r$ of a refracted light ray is a function of the angle $A_i$ between the incident light ray and the interface surface struck by the incident light ray (with refractive angle $A_r$ increasing as $A_i$ approaches zero, i.e., when the incident light ray approaches a parallel condition with respect to the interface surface), a wide range of refracted light ray angles can be obtained by configuring the interface surfaces to include a wide range of angles relative to the incident light rays. This, in turn, means that the interfaces could include a significant extent of interface surfaces that are nearly parallel to the incident light rays, as well as other surfaces disposed at other angles to the incident light rays. Overall waveguide shapes and coupling feature and redirection feature shapes such as curved (including convex, concave, and combinations of convex and concave surfaces), planar, non-planar, tapered, segmented, continuous or discontinuous surfaces, regular or irregular shaped surfaces, symmetric or asymmetric shapes, etc. can be used, it being understood that, in general, light mixing (consistent with the necessary control over light extraction) may be further improved by providing an increased number of interface surfaces and/or more complex interface shapes in the light path. Also, the spacing of coupling features and light redirection features may affect the degree of mixing. In some embodiments a single light coupling feature and/or a single light redirection feature may be sufficient to accomplish a desired degree of light mixing. In other embodiments, multiple coupling features and/or multiple light redirection features might be used to realize a desired degree of mixing. In either event, the shapes of multiple coupling features or multiple redirection features may be simple or complex, they may be the same shape or of different shapes, they may be equally or unequally spaced, or distributed randomly or in one or more arrays (which may themselves be equally or unequally spaced, the same or different size and/or shape, etc.). Further, the interfaces may be disposed in a symmetric or asymmetric pattern in the waveguide, the waveguide itself may be symmetric or asymmetric, the waveguide may develop a light distribution that is symmetric, asymmetric, centered or non-centered with respect to the waveguide, the light distribution may be on-axis (i.e., normal to a face of the waveguide) or off-axis (i.e., other than normal with respect to the waveguide face), single or split-beam, etc.

Still further, one or more coupling features or redirection features, or both, may be disposed anywhere inside the waveguide, at any outside surface of the waveguide, such as an edge surface or major face of the waveguide, and/or at locations extending over more than one surface or portion of the waveguide. Where a coupling or light redirection feature is disposed inside the waveguide, the feature may be disposed in or be defined by a cavity extending fully through the waveguide or in or by a cavity that does not extend fully through the waveguide (e.g., in a blind bore or in a cavity fully enclosed by the material of the waveguide). Also, the waveguide of any of the embodiments disclosed herein may be planar, non-planar, irregular-shaped, curved, other shapes, suspended, a lay-in or surface mount waveguide, etc.

While specific coupling feature and light redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Thus, any one of the coupling cavities, plug members, LED elements, masking element(s), redirection features, extraction features, etc. as described herein may be used in a luminaire, either alone or in combination with one or more additional elements, or in varying combination(s) to obtain light mixing and/or a desired light output distribution. More specifically, any of the features described and/or claimed in U.S. patent application Ser. No. 13/842,521, filed Mar. 15, 2013, entitled "Optical Waveguides" by Kurt S. Wilcox et al., U.S. patent application Ser. No. 13/839,949, filed Mar. 15, 2013, entitled "Optical Waveguide and Lamp Including Same" by Zongjie Yuan et al., U.S. patent application Ser. No. 13/841,074, filed Mar. 15, 2013, entitled "Optical Waveguide Body" by John W. Durkee, U.S. patent application Ser. No. 13/840,563, filed Mar. 15, 2013, entitled "Optical Waveguide and Luminaire Incorporating Same" by Zongjie Yuan et al., U.S. patent application Ser. No. 14/101,086, filed Dec. 9, 2013, entitled "Optical Waveguides and Luminaires Incorporating Same" by Bernd P. Keller et al., U.S. patent application Ser. No. 14/101,132, filed Dec. 9, 2013, entitled "Waveguide Bodies Including Redirection Features and Methods of Producing Same", U.S. patent application Ser. No. 14/101,147, filed Dec. 9, 2013, entitled "Luminaires Using Waveguide Bodies and Optical Elements" by Bernd P. Keller et al., and U.S. patent application Ser. No. 14/101,129, filed Dec. 9, 2013, entitled "Simplified Low Profile Module with Light Guide For Pendant, Surface Mount, Wall Mount and Stand Alone Luminaires" by Eric J. Tarsa et al., incorporated by reference herein and owned by the assignee of the present application may be used in the devices disclosed herein. Thus, for example, any of the waveguides or luminaires disclosed herein may include one or more coupling features or optics, a modified LED arrangement, one or more light redirection features, one or more light extraction features, and/or particular waveguide or overall luminaire shapes and/or configurations as disclosed in such applications, as necessary or desirable. Other luminaire and waveguide form factors than those disclosed herein are also contemplated.

The coupling features disclosed herein efficiently couple light into the waveguide, and the redirection features uniformly mix light within the waveguide and the light is thus conditioned for uniform extraction out of the waveguide. At least some of the luminaires disclosed herein are particularly adapted for use in installations, such as, replacement or retrofit lamps (e.g., LED PAR bulbs), outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, more preferably, a total luminaire output of at least about 3000 lumens, and most preferably a total lumen output of about 10,000 lumens. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably about 2700 degrees Kelvin. Also, at least some of the luminaires disclosed herein preferably exhibit an efficacy of at least about 100 lumens per watt, and more preferably at least about 120 lumens per watt, and further exhibit a coupling efficiency of at least about 92 percent. Further, at least some of the luminaires disclosed herein preferably exhibit an overall efficiency (i.e., light extracted out of the waveguide divided by light injected into the waveguide) of at least about 85 percent. A color rendition index (CRI) of at least about 80 is preferably attained by at least some of the luminaires disclosed herein, with a CRI of at least about 88 being more preferable. A gamut area index (GAI) of at least about 65 is achievable as is a thermal loss of less than about 10%. Any desired form factor and particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

|  | State of the Art Standards | Improved Standards Achievable by Present Embodiments |
| --- | --- | --- |
| Input coupling efficiency (coupling + waveguide) | 90% | About 95% plus improvements through color mixing, source mixing, and control within the waveguide |
| Output efficiency (extraction) | 90% | About 95%: improved through extraction efficiency plus controlled distribution of light from the waveguide |
| Total system | ~80% | About 90%: great control, many choices of output distribution |

In at least some of the present embodiments the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. An optical waveguide, comprising:
a body of optically transmissive material defined by outer edges and comprising a width substantially greater than an overall thickness thereof and further comprising a first side, a second side opposite the first side, an interior coupling cavity defined by a surface intersecting the second side and extending from the second side toward the first side, wherein the interior coupling cavity is disposed remote from edges of the body and is configured to receive an LED element, the body of optically transmissive material further comprising a first array of light mixing cavities surrounding the interior coupling cavity and an extraction feature disposed on one of the first and second sides, wherein the light extraction feature at least partially surrounds the interior coupling cavity; and wherein the optical waveguide further comprises a total internal reflectance optical member disposed in the interior coupling cavity.

2. The optical waveguide of claim 1, wherein first array of cavities comprises between 2 and 200 cavities.

3. The optical waveguide of claim 1, wherein each cavity of the first array of cavities comprises a diameter of between 0.3 mm and 6 mm and a shape that is one of circular cylindrical, elliptical, and star-shaped.

4. The optical waveguide of claim 2, wherein the cavities of the first array of cavities extend fully through the body of optically transmissive material.

5. The optical waveguide of claim 2, wherein the cavities of the first array of cavities are blind cavities such that the cavities do not extend through the body of optically transmissive material.

6. The optical waveguide of claim 2, wherein the cavities of the first array of cavities contain an optically transmissive second material selected from the group comprising air, acrylic, polycarbonate, molded silicone, a cyclic olefin copolymer, glass, and combinations thereof.

7. The optical waveguide of claim 1, further comprising a second array of cavities, wherein the cavities of the second array of cavities are offset from and surround the first array of cavities.

8. The optical waveguide of claim 7, wherein the second array of cavities comprises between 2 and 200 cavities.

9. The optical waveguide of claim 7, wherein each cavity of the second array of cavities comprises a diameter of between 0.4 mm and 10 mm and a shape that is one of circular-cylindrical, elliptical, and star-shaped.

10. The optical waveguide of claim 7, wherein the cavities of the second array of cavities comprise a different shape than the cavities of the first array of cavities.

11. The optical waveguide of claim 1, wherein the body of optically transmissive material is non-circular in shape.

12. The optical waveguide of claim 1, further comprising a third array of cavities,
wherein the cavities of the third array of cavities are offset from and surround the cavities of the second array of cavities,
wherein the third array of cavities comprises between 2 and 200 cavities, and wherein each cavity of the third array of cavities comprises a diameter of between 0.4 mm and 10 mm and a shape that is one of circular-cylindrical, elliptical, and star-shaped.

13. A luminaire, comprising:
a base comprising an electrical connector;
a central body disposed on the base;
a light assembly joined to the central body wherein the light assembly comprises a lightguide body comprising an interior coupling cavity, an LED element disposed in the coupling cavity, and a first array of cavities surrounding the coupling cavity;
wherein the lightguide body utilizes total internal reflection; and
a reflective surface disposed in the interior coupling cavity, wherein the lightguide body is comprised of a material; wherein the LED element directs light onto the reflective surface and the light is diverted transversely into the material of the lightguide body; and
wherein the light passes through a cavity of the first array of cavities at an angle that is different from an angle at which the light passes through the material of the lightguide body.

14. The luminaire of claim 13, wherein the LED module comprises a combination of blue-shifted yellow LEDs and red LEDs.

15. The luminaire of claim 13, further comprising a second array of cavities surrounding the first array of cavities,
wherein the light passes through a cavity of the second array of cavities an angle that is different from the angle at which the light passes through the material of the lightguide body.

16. The luminaire of claim 13, further comprising a second array of cavities surrounding the first array of cavities, wherein the first array of cavities comprises a first plurality of cavities of a first size and the second array of cavities contains a second plurality of cavities of a second size, wherein the second size is larger than the first size.

17. The luminaire of claim 13, wherein the coupling cavity is disposed in the center of the first array of cavities.

18. An optical waveguide, comprising:
a body of optically transmissive material comprising a width substantially greater than an overall thickness thereof and comprising a first side, a second side opposite the first side, and an interior coupling cavity extending between the first and second sides, wherein the interior coupling cavity is configured to receive an LED element, the body of optically transmissive material further comprising at least one array of color mixing cavities each extending at least partially through a waveguide body and the array of color mixing cavities surrounding the interior coupling cavity, and wherein the waveguide body utilizes total internal reflection, and wherein the body of optically transmissive material comprises light mixing features in the interior coupling cavity.

19. The optical waveguide of claim 18, wherein the body comprises a plurality of arrays of color mixing cavities extending at least partially through the waveguide and offset from the interior coupling cavity.

20. The optical waveguide of claim 18, wherein the color mixing cavities comprise different sizes.

21. The optical waveguide of claim 18, wherein the color mixing cavities comprise different shapes.

22. The optical waveguide of claim 18, wherein the color mixing cavities are disposed in a repeating pattern around the interior coupling cavity.

23. The optical waveguide of claim 18, wherein the color mixing cavities are disposed randomly around the interior coupling cavity.

* * * * *